US011394996B2

(12) United States Patent
Chen et al.

(10) Patent No.: US 11,394,996 B2
(45) Date of Patent: Jul. 19, 2022

(54) VIDEO CODING METHOD AND APPARATUS

(71) Applicant: HUAWEI TECHNOLOGIES CO., LTD., Shenzhen (CN)

(72) Inventors: Xu Chen, Shenzhen (CN); Jianhua Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 14 days.

(21) Appl. No.: 17/037,570

(22) Filed: Sep. 29, 2020

(65) Prior Publication Data
US 2021/0014526 A1 Jan. 14, 2021

Related U.S. Application Data

(63) Continuation of application No. PCT/CN2018/081584, filed on Apr. 2, 2018.

(51) Int. Cl.
*H04N 19/513* (2014.01)
*H04N 19/52* (2014.01)

(52) U.S. Cl.
CPC ........... *H04N 19/521* (2014.11); *H04N 19/52* (2014.11)

(58) Field of Classification Search
None
See application file for complete search history.

(56) References Cited

U.S. PATENT DOCUMENTS

| | | | |
|---|---|---|---|
| 2008/0247465 A1 | 10/2008 | Xin et al. | |
| 2009/0028243 A1 | 1/2009 | Suzuki et al. | |
| 2013/0114717 A1* | 5/2013 | Zheng | H04N 19/52 375/240.14 |
| 2017/0085906 A1* | 3/2017 | Chen | H04N 19/70 |

FOREIGN PATENT DOCUMENTS

| | | |
|---|---|---|
| CN | 1630374 A | 6/2005 |
| CN | 101534447 A | 9/2009 |
| CN | 102215387 A | 10/2011 |
| CN | 102227132 A | 10/2011 |
| CN | 102595110 A | 7/2012 |
| CN | 104661031 A | 5/2015 |
| KR | 20130057020 A | 5/2013 |

OTHER PUBLICATIONS

Gary J. Sullivan et al., Overview of the High Efficiency Video Coding(HEVC) Standard. in IEEE Transactions on Circuits and Systems for Video Technology, vol. 22, No. 12, Dec. 2012, 20 pages.

* cited by examiner

*Primary Examiner* — Lindsay J Uhl

(74) *Attorney, Agent, or Firm* — Rimon PC

(57) ABSTRACT

A method and an apparatus are provided for obtaining a motion vector, and disclose application of the method and the apparatus for obtaining a motion vector in a video coding method and apparatus. The method includes: obtaining a first motion vector from a first motion vector set corresponding to a to-be-processed picture block; obtaining a second motion vector through calculation based on the first motion vector, where there is a preset vector difference between the first motion vector and the second motion vector, and the first motion vector and the second motion vector are different; adding the second motion vector to the first motion vector set to constitute a second motion vector set; and obtaining a target motion vector from the second motion vector set.

20 Claims, 19 Drawing Sheets

Original merge candidate predictive motion vector list

| Merge_idx | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | - | - |
| 4 | - | - |

Add a zero motion vector

Candidate predictive motion vector list to which a "zero" motion vector is added

| Merge_idx | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | (0, 0), ref0 | (0, 0), ref0 |
| 4 | (0, 0), ref1 | (0, 0), ref1 |

VIDEO CODING METHOD AND APPARATUS

CROSS-REFERENCE TO RELATED APPLICATIONS

This application is a continuation of International Application No. PCT/CN2018/081584, filed on Apr. 2, 2018, the disclosure of which is hereby incorporated by reference in its entirety.

TECHNICAL FIELD

This application relates to the field of video coding technologies, and in particular, to a video coding method and apparatus.

BACKGROUND

A digital video technology may be widely applied to various apparatuses, including a digital television, a digital live broadcast system, a wireless broadcast system, a personal digital assistant (PDA), a notebook computer, a tablet computer, an e-book reader, a digital camera, a digital recording apparatus, a digital media player, a video game apparatus, a video game console, a cellular or satellite radio telephone, a video conference call apparatus, a video streaming transmission apparatus, and the like. A digital video apparatus implements video coding technologies, for example, video coding technologies described in standards and extensions to these standards described in advanced video coding (AVC) in clause 10 of MPEG-2, MPEG-4, ITU-T H.263, ITU-T H.264/MPEG-4, and ITU-T H.265 (also referred to as high efficiency video coding (HEVC). The digital video apparatus may send, receive, encode, decode, and/or store digital video information more effectively by implementing these video coding technologies.

In a video compression technology, spatial (intra-picture) prediction and/or temporal (inter-picture) prediction are/is performed to reduce or remove inherent redundant information in a video sequence. For block-based video coding, a video block may be partitioned into smaller video blocks, where the video block may also be referred to as a tree block, a coding unit (coding unit, CU), or a coding node. A video block in a to-be-intra-decoded (I) slice of a picture is coded through spatial prediction based on a reference sample in an adjacent block in the same picture. A video block in a to-be-inter-decoded (P or B) slice of a picture may be coded through spatial prediction based on a reference sample in an adjacent block in the same picture or may be coded through temporal prediction based on a reference sample in another reference picture. The picture may be referred to as a frame, and the reference picture may be referred to as a reference frame.

SUMMARY

Embodiments of this application provide a video coding method and a related device, and mainly relate to obtaining of a motion vector. According to the embodiments of this application, an optimal reference picture block of a to-be-processed block is obtained in a coding process, and further an accurate reconstructed block of the to-be-processed block is constructed, thereby improving coding efficiency.

A first aspect of this application provides a method for obtaining a motion vector. The method is used for video encoding and includes: obtaining a first motion vector from a first motion vector set corresponding to a to-be-processed picture block; obtaining a second motion vector through calculation based on the first motion vector, where there is a preset vector difference between the first motion vector and the second motion vector, and the first motion vector and the second motion vector are different; adding the second motion vector to the first motion vector set to constitute a second motion vector set; and obtaining a target motion vector from the second motion vector set.

Beneficial effects of this implementation are as follows: A new candidate motion vector is derived based on an original candidate motion vector, so that a candidate motion vector set is enriched, and it is more likely to obtain a more accurate motion vector, thereby improving coding efficiency.

In a first feasible implementation of the first aspect of this application, the obtaining a second motion vector through calculation based on the first motion vector includes: adding the first motion vector and the preset vector difference to obtain the second motion vector.

A beneficial effect of this implementation is follows: A newly generated candidate motion vector is obtained based on an original motion vector by using the preset vector difference as a vector offset. This is equivalent to improving precision of the candidate motion vector.

In a second feasible implementation of the first aspect of this application, when the method is used for bidirectional prediction, the first motion vector includes a first-directional first motion vector and a second-directional first motion vector, the second motion vector includes a first-directional second motion vector and a second-directional second motion vector, and the preset vector difference includes a first-directional preset vector difference and a second-directional preset vector difference; and correspondingly, the adding the first motion vector and the preset vector difference to obtain the second motion vector includes: adding the first-directional first motion vector and the first-directional preset vector difference to obtain the first-directional second motion vector; and adding the second-directional first motion vector and the second-directional preset vector difference to obtain the second-directional second motion vector.

A beneficial effect of this implementation is as follows: The solution in this embodiment of this application is applied to bidirectional prediction, thereby improving coding efficiency for bidirectional prediction.

In a third feasible implementation of the first aspect of this application, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero; or when the first display offset vector and the second display offset vector are the same, the first-directional preset vector difference and the second-directional preset vector difference are the same.

A beneficial effect of this implementation is as follows: The second-directional preset vector difference is derived based on the first-directional preset vector difference, and therefore, space for storing the preset vector difference is reduced, or a bit rate for encoding the second-directional preset vector difference may be decreased in some embodiments.

In a fourth feasible implementation of the first aspect of this application, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and a proportional relationship between the first-directional preset vector difference and the second-directional preset vector difference is the same as a proportional relationship between a magnitude of the first display offset vector and a magnitude of the second display offset vector, or the first-directional preset vector difference is equal to the second-directional preset vector difference.

A beneficial effect of this implementation is as follows: The second-directional preset vector difference is derived based on the first-directional preset vector difference, and therefore, space for storing the preset vector difference is reduced, or a bit rate for encoding the second-directional preset vector difference may be decreased in some embodiments.

In a fifth feasible implementation of the first aspect of this application, when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

A beneficial effect of this implementation is as follows: The second-directional preset vector difference is derived based on the first-directional preset vector difference, and therefore, space for storing the preset vector difference is reduced, or a bit rate for encoding the second-directional preset vector difference may be decreased in some embodiments.

In a sixth feasible implementation of the first aspect of this application, the obtaining a target motion vector from the second motion vector set includes: selecting a motion vector with a minimum coding cost from the second motion vector set according to a rate-distortion criterion as the target motion vector.

A beneficial effect of this implementation is as follows: A candidate motion vector with minimum rate distortion is accurately selected as the target motion vector according to the rate-distortion criterion.

In a seventh feasible implementation of the first aspect of this application, there are a plurality of vector differences different from each other; correspondingly, the adding the first motion vector and the preset vector difference to obtain the second motion vector includes: adding the first motion vector and each of the plurality of preset vector differences to obtain a plurality of second motion vectors; and correspondingly, the adding the second motion vector to the first motion vector set to constitute a second motion vector set includes: adding the plurality of obtained second motion vectors to the first motion vector set to constitute the second motion vector set.

A beneficial effect of this implementation is as follows: Motion vectors in a candidate motion vector set are further enriched, and it is more likely to improve prediction precision.

In an eighth feasible implementation of the first aspect of this application, after the adding the first motion vector and each of the plurality of preset vector differences to obtain a plurality of second motion vectors, the method further includes: selecting a motion vector with a minimum coding cost from the plurality of second motion vectors according to the rate-distortion criterion as a third motion vector; and correspondingly, the adding the second motion vector to the first motion vector set to constitute a second motion vector set includes: adding the third motion vector to the first motion vector set to constitute the second motion vector set.

A beneficial effect of this implementation is as follows: A candidate motion vector with minimum rate distortion is accurately selected as the third motion vector according to the rate-distortion criterion.

In a ninth feasible implementation of the first aspect of this application, the method further includes: encoding first identification information, where the first identification information is used to identify the target motion vector in the second motion vector set.

A beneficial effect of this implementation is as follows: Identification information is encoded, and an encoding result on an encoder side is transferred to a decoder side, so that the decoder side performs decoding correctly.

In a tenth feasible implementation of the first aspect of this application, the method further includes: encoding second identification information, where the second identification information is used to identify the target motion vector in the second motion vector set.

A beneficial effect of this implementation is as follows: Identification information is encoded, and an encoding result on an encoder side is transferred to a decoder side, so that the decoder side performs decoding correctly.

In an eleventh feasible implementation of the first aspect of this application, the method further includes: encoding third identification information, where the third identification information is used to identify the third motion vector in the plurality of second motion vectors.

A beneficial effect of this implementation is as follows: Identification information is encoded, and an encoding result on an encoder side is transferred to a decoder side, so that the decoder side performs decoding correctly.

In a twelfth feasible implementation of the first aspect of this application, a motion vector in the first motion vector set includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

A beneficial effect of this implementation is as follows: A motion vector or a derivation of a motion vector of a reference block having temporal or spatial correlation with the to-be-processed block is used as a candidate motion vector, thereby improving prediction precision.

A second aspect of this application provides a method for obtaining a motion vector. The method is used for video decoding and includes: parsing a bitstream to obtain first identification information; and obtaining a second motion vector from a candidate motion vector set of a to-be-processed picture block based on the first identification information, where the candidate motion vector set includes a first motion vector and the second motion vector, and the second motion vector is obtained by adding the first motion vector and a preset vector difference.

Beneficial effects of this implementation are as follows: A new candidate motion vector is derived based on an original candidate motion vector, so that a candidate motion vector set is enriched, and it is more likely to obtain a more accurate motion vector, thereby improving coding efficiency.

In a first feasible implementation of the second aspect of this application, the first motion vector includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

A beneficial effect of this implementation is as follows: A motion vector or a derivation of a motion vector of a reference block having temporal or spatial correlation with the to-be-processed block is used as a candidate motion vector, thereby improving prediction precision.

In a second feasible implementation of the second aspect of this application, when the method is used for bidirectional prediction, the first motion vector includes a first-directional first motion vector and a second-directional first motion vector, the second motion vector includes a first-directional second motion vector and a second-directional second motion vector, and the preset vector difference includes a first-directional preset vector difference and a second-directional preset vector difference; and correspondingly, that the second motion vector is obtained by adding the first motion vector and a preset vector difference includes: the first-directional second motion vector is obtained by adding the first-directional first motion vector and the first-directional preset vector difference; and the second-directional second motion vector is obtained by adding the second-directional first motion vector and the second-directional preset vector difference.

A beneficial effect of this implementation is as follows: The solution in this embodiment of this application is applied to bidirectional prediction, thereby improving coding efficiency for bidirectional prediction.

In a third feasible implementation of the second aspect of this application, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero; or when the first display offset vector and the second display offset vector are the same, the first-directional preset vector difference and the second-directional preset vector difference are the same.

A beneficial effect of this implementation is as follows: The second-directional preset vector difference is derived based on the first-directional preset vector difference, and therefore, space for storing the preset vector difference is reduced, or a bit rate for encoding the second-directional preset vector difference may be decreased in some embodiments.

In a fourth feasible implementation of the second aspect of this application, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and a proportional relationship between the first-directional preset vector difference and the second-directional preset vector difference is the same as a proportional relationship between a magnitude of the first display offset vector and a magnitude of the second display offset vector, or the first-directional preset vector difference is equal to the second-directional preset vector difference.

A beneficial effect of this implementation is as follows: The second-directional preset vector difference is derived based on the first-directional preset vector difference, and therefore, space for storing the preset vector difference is reduced, or a bit rate for encoding the second-directional preset vector difference may be decreased in some embodiments.

In fifth feasible implementation of the second aspect of this application, when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

A beneficial effect of this implementation is as follows: The second-directional preset vector difference is derived based on the first-directional preset vector difference, and therefore, space for storing the preset vector difference is reduced, or a bit rate for encoding the second-directional preset vector difference may be decreased in some embodiments.

A third aspect of this application provides a method for obtaining a motion vector. The method is used for video decoding and includes: parsing a bitstream to obtain first identification information; obtaining a first motion vector from a first motion vector set of a to-be-processed picture block based on the first identification information; parsing the bitstream to obtain second identification information; and obtaining a second motion vector from a second motion vector set of the to-be-processed picture block based on the second identification information, where the second motion vector set is determined based on the first motion vector, and there are a plurality of different preset vector differences between the first motion vector and the second motion vector.

Beneficial effects of this implementation are as follows: A new candidate motion vector is derived based on an original candidate motion vector, so that a candidate motion vector set is enriched, and it is more likely to obtain a more accurate motion vector, thereby improving coding efficiency.

In a first feasible implementation of the third aspect of this application, the first motion vector includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

A beneficial effect of this implementation is as follows: A motion vector or a derivation of a motion vector of a reference block having temporal or spatial correlation with the to-be-processed block is used as a candidate motion vector, thereby improving prediction precision.

In a second feasible implementation of the third aspect of this application, when the method is used for bidirectional prediction, the first motion vector includes a first-directional first motion vector and a second-directional first motion vector, the second motion vector includes a first-directional second motion vector and a second-directional second motion vector, and the preset vector difference includes a first-directional preset vector difference and a second-directional preset vector difference; and correspondingly, that there is a preset vector difference between the first motion vector and the second motion vector includes: there is the first-directional preset vector difference between the first-directional first motion vector and the first-directional second motion vector; and there is the second-directional preset vector difference between the second-directional first motion vector and the second-directional second motion vector.

A beneficial effect of this implementation is as follows: The solution in this embodiment of this application is applied to bidirectional prediction, thereby improving coding efficiency for bidirectional prediction.

In a third feasible implementation of the third aspect of this application, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero; or when the first display offset vector and the second display offset vector are the same, the first-directional preset vector difference and the second-directional preset vector difference are the same.

A beneficial effect of this implementation is as follows: The second-directional preset vector difference is derived based on the first-directional preset vector difference, and therefore, space for storing the preset vector difference is reduced, or a bit rate for encoding the second-directional preset vector difference may be decreased in some embodiments.

In a fourth feasible implementation of the third aspect of this application, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and a proportional relationship between the first-directional preset vector difference and the second-directional preset vector difference is the same as a proportional relationship between a magnitude of the first display offset vector and a magnitude of the second display offset vector, or the first-directional preset vector difference is equal to the second-directional preset vector difference.

A beneficial effect of this implementation is as follows: The second-directional preset vector difference is derived based on the first-directional preset vector difference, and therefore, space for storing the preset vector difference is reduced, or a bit rate for encoding the second-directional preset vector difference may be decreased in some embodiments.

In a fifth feasible implementation of the third aspect of this application, when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

A beneficial effect of this implementation is as follows: The second-directional preset vector difference is derived based on the first-directional preset vector difference, and therefore, space for storing the preset vector difference is reduced, or a bit rate for encoding the second-directional preset vector difference may be decreased in some embodiments.

In a sixth feasible implementation of the third aspect of this application, before the obtaining a second motion vector from a second motion vector set of the to-be-processed picture block based on the second identification information, the method further includes: adding the first motion vector and each of the plurality of preset vector differences to obtain a plurality of third motion vectors, where the plurality of third motion vectors constitute the second motion vector set.

Beneficial effects of this implementation are as follows: Motion vectors in a candidate motion vector set are further enriched, and it is more likely to improve prediction precision.

In a seventh feasible implementation of the third aspect of this application, the preset vector differences include a zero vector difference.

A beneficial effect of this implementation is as follows: A case in which a motion vector obtained without adding a vector difference is used as an optimal motion vector is included.

A fourth aspect of this application provides a method for constructing a motion vector set. The method is used for video encoding or video decoding and includes: obtaining a first motion vector from a first motion vector set of a to-be-processed picture block; adding the first motion vector and each of one or more preset vector differences to obtain one or more second motion vectors, where the first motion vector is unequal to the second motion vector; and adding the one or more second motion vectors to the first motion vector set, to constitute a second motion vector set of the to-be-processed picture block.

Beneficial effects of this implementation are as follows: A new candidate motion vector is derived based on an original candidate motion vector, so that a candidate motion vector set is enriched, and it is more likely to obtain a more accurate motion vector, thereby improving coding efficiency.

In a first feasible implementation of the fourth aspect of this application, the first motion vector includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

A beneficial effect of this implementation is as follows: A motion vector or a derivation of a motion vector of a reference block having temporal or spatial correlation with the to-be-processed block is used as a candidate motion vector, thereby improving prediction precision.

In a second feasible implementation of the fourth aspect of this application, the one or more second motion vectors include a third motion vector, and the adding the one or more second motion vectors to the first motion vector set includes: when the third motion vector is different from any motion vector in the first motion vector set, adding the third motion vector to the first motion vector set.

A beneficial effect of this implementation is as follows: A case in which an operation is repeatedly performed on a same candidate motion vector is avoided.

A fifth aspect of this application provides an apparatus for obtaining a motion vector. The apparatus is used for video encoding and includes: an obtaining module, configured to obtain a first motion vector from a first motion vector set corresponding to a to-be-processed picture block; a calculation module, configured to obtain a second motion vector through calculation based on the first motion vector, where there is a preset vector difference between the first motion vector and the second motion vector, and the first motion vector and the second motion vector are different; and a combination module, configured to add the second motion vector to the first motion vector set to constitute a second motion vector set; where the obtaining module is configured to obtain a target motion vector from the second motion vector set.

In a first feasible implementation of the fifth aspect of this application, the calculation module is configured to add the first motion vector and the preset vector difference to obtain the second motion vector.

In a second feasible implementation of the fifth aspect of this application, when the apparatus is used for bidirectional prediction, the first motion vector includes a first-directional first motion vector and a second-directional first motion vector, the second motion vector includes a first-directional second motion vector and a second-directional second motion vector, and the preset vector difference includes a first-directional preset vector difference and a second-directional preset vector difference; and correspondingly, the calculation module is configured to: add the first-directional first motion vector and the first-directional preset vector difference to obtain the first-directional second motion vector; and add the second-directional first motion vector and the second-directional preset vector difference to obtain the second-directional second motion vector.

In a third feasible implementation of the fifth aspect of this application, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero; or when the first display offset vector and the second display offset vector are the same, the first-directional preset vector difference and the second-directional preset vector difference are the same.

In a fourth feasible implementation of the fifth aspect of this application, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and a proportional relationship between the first-directional preset vector difference and the second-directional preset vector difference is the same as a proportional relationship between a magnitude of the first display offset vector and a magnitude of the second display offset vector, or the first-directional preset vector difference is equal to the second-directional preset vector difference.

In a fifth feasible implementation of the fifth aspect of this application, when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

In a sixth feasible implementation of the fifth aspect of this application, the obtaining module is configured to select a motion vector with a minimum coding cost from the second motion vector set according to a rate-distortion criterion as the target motion vector.

In a seventh feasible implementation of the fifth aspect of this application, there are a plurality of vector differences different from each other; correspondingly, the calculation module is configured to add the first motion vector and each of the plurality of preset vector differences to obtain a plurality of second motion vectors; and correspondingly, the combination module is configured to add the plurality of obtained second motion vectors to the first motion vector set to constitute the second motion vector set.

In an eighth feasible implementation of the fifth aspect of this application, the obtaining module is configured to select a motion vector with a minimum coding cost from the plurality of second motion vectors according to the rate-distortion criterion as a third motion vector; and correspondingly, the combination module is configured to add the third motion vector to the first motion vector set to constitute the second motion vector set.

In a ninth feasible implementation of the fifth aspect of this application, the apparatus further includes: an encoding module, configured to encode first identification information, where the first identification information is used to identify the target motion vector in the second motion vector set.

In a tenth feasible implementation of the fifth aspect of this application, the encoding module is further configured to encode second identification information, where the second identification information is used to identify the target motion vector in the second motion vector set.

In an eleventh feasible implementation of the fifth aspect of this application, the encoding module is further configured to encode third identification information, where the third identification information is used to identify the third motion vector in the plurality of second motion vectors.

In a twelfth feasible implementation of the fifth aspect of this application, a motion vector in the first motion vector set includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

A sixth aspect of this application provides an apparatus for obtaining a motion vector. The apparatus is used for video decoding and includes: a parsing module, configured to parse a bitstream to obtain first identification information; and an obtaining module, configured to obtain a second motion vector from a candidate motion vector set of a to-be-processed picture block based on the first identification information, where the candidate motion vector set includes a first motion vector and the second motion vector, and the second motion vector is obtained by adding the first motion vector and a preset vector difference.

In a first feasible implementation of the sixth aspect of this application, the first motion vector includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

In a second feasible implementation of the sixth aspect of this application, when the apparatus is used for bidirectional prediction, the first motion vector includes a first-directional first motion vector and a second-directional first motion vector, the second motion vector includes a first-directional second motion vector and a second-directional second motion vector, and the preset vector differences include a first-directional preset vector difference and a second-directional preset vector difference; and correspondingly, that the second motion vector is obtained by adding the first motion vector and a preset vector difference includes: the first-directional second motion vector is obtained by adding the first-directional first motion vector and the first-directional preset vector difference, and the second-directional second motion vector is obtained by adding the second-directional first motion vector and the second-directional preset vector difference.

In a third feasible implementation of the sixth aspect of this application, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero; or when the first display offset vector and the second display offset vector are the same, the first-directional preset vector difference and the second-directional preset vector difference are the same.

In a fourth feasible implementation of the sixth aspect of this application, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and a proportional relationship between the first-directional preset vector difference and the second-directional preset vector difference is the same as a proportional relationship between a magnitude of the first display offset vector and a magnitude of the second display offset vector, or the first-directional preset vector difference is equal to the second-directional preset vector difference.

In a fifth feasible implementation of the sixth aspect of this application, when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

A seventh aspect of this application provides an apparatus for obtaining a motion vector. The apparatus is used for video decoding and includes: a parsing module, configured to parse a bitstream to obtain first identification information; and an obtaining module, configured to obtain a first motion vector from a first motion vector set of a to-be-processed picture block based on the first identification information; where the parsing module is further configured to parse the bitstream to obtain second identification information; and the obtaining module is further configured to obtain a second motion vector from a second motion vector set of the to-be-processed picture block based on the second identification information, where the second motion vector set is determined based on the first motion vector, and there are a plurality of different preset vector differences between the first motion vector and the second motion vector.

In a first feasible implementation of the seventh aspect of this application, the first motion vector includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

In a second feasible implementation of the seventh aspect of this application, when the apparatus is used for bidirectional prediction, the first motion vector includes a first-directional first motion vector and a second-directional first motion vector, the second motion vector includes a first-directional second motion vector and a second-directional second motion vector, and the preset vector difference includes a first-directional preset vector difference and a second-directional preset vector difference; and correspondingly, that there is a preset vector difference between the first motion vector and the second motion vector includes: there is the first-directional preset vector difference between the first-directional first motion vector and the first-directional second motion vector; and there is the second-directional preset vector difference between the second-directional first motion vector and the second-directional second motion vector.

In a third feasible implementation of the seventh aspect of this application, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero; or when the first display offset vector and the second display offset vector are the same, the first-directional preset vector difference and the second-directional preset vector difference are the same.

In a fourth feasible implementation of the seventh aspect of this application, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and a proportional relationship between the first-directional preset vector difference and the second-directional preset vector difference is the same as a proportional relationship between a magnitude of the first display offset vector and a magnitude of the second display offset vector, or the first-directional preset vector difference is equal to the second-directional preset vector difference.

In a fifth feasible implementation of the seventh aspect of this application, when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

In a sixth feasible implementation of the seventh aspect of this application, the apparatus further includes a calculation module, where the calculation module is configured to add the first motion vector and each of the plurality of preset vector differences to obtain a plurality of third motion vectors, where the plurality of third motion vectors constitute the second motion vector set.

In a seventh feasible implementation of the seventh aspect of this application, the preset vector differences include a zero vector difference.

An eighth aspect of this application provides an apparatus for constructing a motion vector set. The apparatus is used for video encoding or video decoding and includes: an obtaining module, configured to obtain a first motion vector from a first motion vector set of a to-be-processed picture block; a calculation module, configured to add the first motion vector and each of one or more preset vector differences to obtain one or more second motion vectors, where the first motion vector is unequal to the second motion vector; and a combination module, configured to add the one or more second motion vectors to the first motion vector set, to constitute a second motion vector set of the to-be-processed picture block.

In a first feasible implementation of the eighth aspect of this application, the first motion vector includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

In a second feasible implementation of the eighth aspect of this application, the combination module is configured to: when the third motion vector is different from any motion vector in the first motion vector set, add the third motion vector to the first motion vector set.

A ninth aspect of this application provides a device for obtaining a motion vector. The device may be applied to an encoder side or a decoder side. The device includes a processor and a memory. The processor and the memory are connected to each other (for example, connected to each other through a bus). In a possible implementation, the device may further include a transceiver, where the transceiver is connected to the processor and the memory, and is configured to receive/send data. The memory is configured to store program code and video data. The processor is configured to read the program code stored in the memory, to perform the method described in any one of the first aspect to the fourth aspect.

A tenth aspect of this application provides a video coding system. The video coding system includes a source apparatus and a destination apparatus. The source apparatus and the destination apparatus may be communicatively connected. The source apparatus generates encoded video data. Therefore, the source apparatus may be referred to as a video encoding apparatus or a video encoding device. The destination apparatus may decode the encoded video data generated by the source apparatus. Therefore, the destination apparatus may be referred to as a video decoding apparatus or a video decoding device. The source apparatus may be an instance of the video encoding apparatus or the video encoding device, and the destination apparatus may be an instance of the video decoding apparatus or the video decoding device. The method described in any one of the first aspect to the fourth aspect is applied to the video encoding/decoding apparatus or the video encoding/decoding device.

An eleventh aspect of this application provides a computer-readable storage medium. The computer-readable storage medium stores an instruction, and when the instruction is run on a computer, the computer is enabled to perform the method described in any one of the first aspect to the fourth aspect.

A twelfth aspect of this application provides a computer program product including an instruction. When the computer program product runs on a computer, the computer is enabled to perform the method described in any one of the first aspect to the fourth aspect.

It should be understood that, objectives, technical features, beneficial technical effects in the embodiments corresponding to the fifth aspect to the twelfth aspect of this application are the same as or similar to objectives, technical features, beneficial technical effects in the embodiments corresponding to the first aspect to the fourth aspect of this application. Details are not described again.

DESCRIPTION OF EMBODIMENTS

The following clearly describes the technical solutions in the embodiments of this application with reference to the accompanying drawings in the embodiments of this application.

Figure 1:
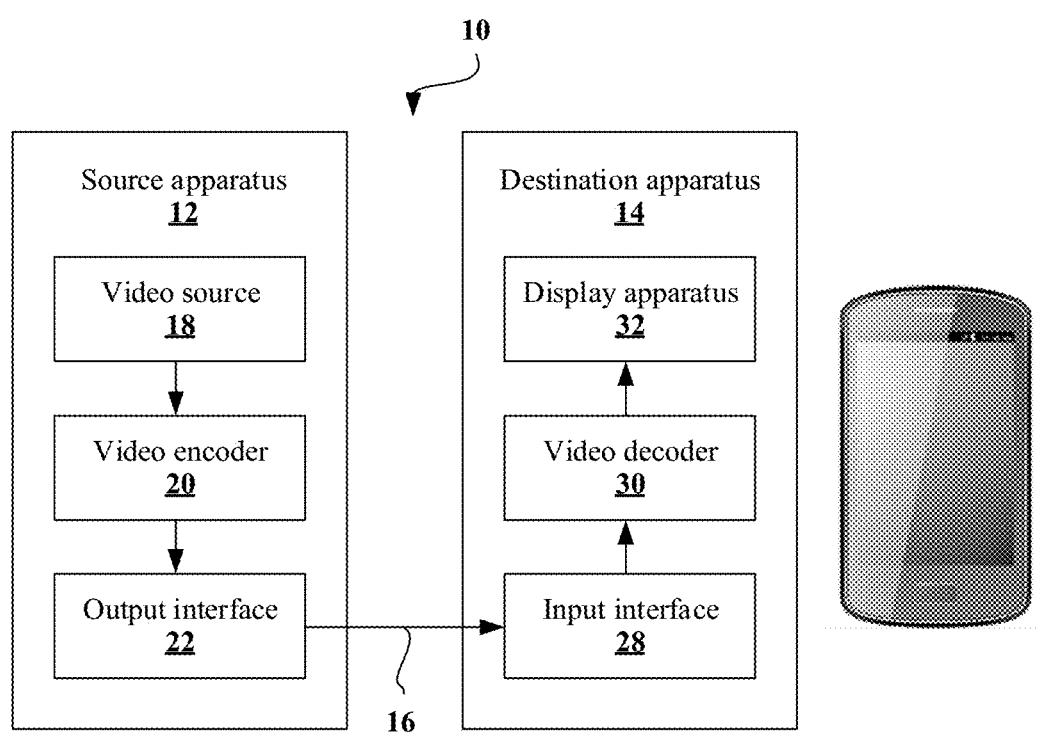
FIG. 1 is a block diagram of an example of a video coding system that may be configured for use in an embodiment of this application.

FIG. 1 is a schematic block diagram of a video coding system 10 according to an embodiment of this application. As shown in FIG. 1, the system 10 includes a source apparatus 12, and the source apparatus 12 generates encoded video data to be decoded by a destination apparatus 14 at a later time. The source apparatus 12 and the destination apparatus 14 may include any one of a wide range of apparatuses, including a desktop computer, a notebook computer, a tablet computer, a set-top box, a telephone handset such as a "smart" phone, a "smart" touchpad, a television, a camera, a display apparatus, a digital media player, a video game console, a video streaming transmission apparatus, or the like. In some applications, the source apparatus 12 and the destination apparatus 14 may be equipped for wireless communication.

The destination apparatus 14 may receive the to-be-decoded encoded video data over a link 16. The link 16 may include any type of medium or apparatus capable of moving the encoded video data from the source apparatus 12 to the destination apparatus 14. In a feasible implementation, the link 16 may include a communications medium that enables the source apparatus 12 to directly transmit the encoded video data to the destination apparatus 14 in real time. The encoded video data may be modulated according to a communications standard (for example, a wireless communications protocol) and then is transmitted to the destination apparatus 14. The communications medium may include any wireless or wired communications medium, for example, a radio spectrum or one or more physical transmission lines. The communications medium may constitute a part of a packet-based network (for example, a local area network, a wide area network, or a global network of the internet). The communications medium may include a router, a switch, a base station, or any other devices that may be used to facilitate communication from the source apparatus 12 to the destination apparatus 14.

Alternatively, the encoded data may be output from an output interface 22 to a storage apparatus 24. Similarly, the encoded data may be accessed from the storage apparatus 24 through an input interface. The storage apparatus 24 may include any one of a plurality of scattered or local data storage media, for example, a hard disk drive, a Blu-ray disc, a DVD, a CD-ROM, a flash memory, a volatile or non-volatile memory, or any other appropriate digital storage medium used for storing the encoded video data. In another feasible implementation, the storage apparatus 24 may correspond to a file server or another intermediate storage apparatus capable of storing an encoded video generated by the source apparatus 12. The destination apparatus 14 may access the stored video data from the storage apparatus 24 through streaming transmission or downloading. The file server may be any type of server capable of storing the encoded video data and transmitting the encoded video data to the destination apparatus 14. In a feasible implementation, the file server includes a website server, a file transfer protocol server, a network-attached storage apparatus, or a local disk drive. The destination apparatus 14 may access the encoded video data through any standard data connection including an internet connection. The data connection may include a wireless channel (for example, a Wi-Fi connection), a wired connection (for example, a cable modem), or a combination thereof that is applicable for accessing the encoded video data stored on the file server. Transmission of the encoded video data from the storage apparatus 24 may be streaming transmission, downloading transmission, or a combination thereof.

Technologies in this application are not necessarily limited to wireless applications or settings. The technologies may be applied to video decoding, to support any one of a plurality of multimedia applications, for example, over-the-air television broadcasting, cable television transmission, satellite television transmission, streaming video transmission (for example, through the internet), digital video encoding for storage on a data storage medium, decoding of a digital video stored on a data storage medium, or another application. In some feasible implementations, the system 10 may be configured to support unidirectional or bidirectional video transmission, to support applications such as streaming video transmission, video playing, video broadcasting, and/or videotelephony.

In a feasible implementation of FIG. 1, the source apparatus 12 may include a video source 18, a video encoder 20, and the output interface 22. In some applications, the output interface 22 may include a modulator/demodulator (a modem) and/or a transmitter. In the source apparatus 12, the video source 18 may include, for example, the following sources: a video capturing apparatus (for example, a video camera), a video archive including a previously captured video, a video feed-in interface for receiving a video from a video content provider, and/or a computer graphics system for generating computer graphics data as a source video, or a combination thereof. In a feasible implementation, if the video source 18 is a video camera, the source apparatus 12 and the destination apparatus 14 can constitute a camera phone or a video phone. For example, the technologies described in this application may be applied to video decoding, and may be applied to wireless and/or wired applications.

The video encoder 20 may encode a video that is captured or pre-captured, or generated by a computer. The encoded video data may be directly transmitted to the destination apparatus 14 through the output interface 22 of the source apparatus 12. The encoded video data may also (or alternatively) be stored on the storage apparatus 24 for subsequent access by the destination apparatus 14 or another apparatus for decoding and/or playing.

The destination apparatus 14 includes an input interface 28, a video decoder 30, and a display apparatus 32. In some applications, the input interface 28 may include a receiver and/or a modem. The input interface 28 of the destination apparatus 14 receives the encoded video data over the link 16. The encoded video data transmitted or provided to the storage apparatus 24 over the link 16 may include a plurality of syntax elements that are generated by the video encoder 20 and that are used by the video decoder 30 to decode the video data. These syntax elements may be included in the encoded video data that is transmitted on the communications medium and that is stored in the storage medium or stored on the file server.

The display apparatus 32 may be integrated with the destination apparatus 14 or disposed outside the destination apparatus 14. In some feasible implementations, the destination apparatus 14 may include an integrated display apparatus and also be configured to connect to an interface of an external display apparatus. In other feasible implementations, the destination apparatus 14 may be a display apparatus. Generally, the display apparatus 32 displays decoded video data to a user, and may include any one of a plurality of display apparatuses, such as a liquid crystal display, a plasma display, an organic light-emitting diode display, or another type of display apparatus.

The video encoder 20 and the video decoder 30 may operate according to, for example, a next-generation video coding compression standard (H.266) that is currently being developed, and may comply with an H.266 test model (JEM). Alternatively, the video encoder 20 and the video decoder 30 may operate according to, for example, other dedicated or industrial standards of or their extensions to the ITU-TH.265 standard or the ITU-TH.264 standard, where the ITU-TH.265 standard is also referred to as a high efficiency video coding standard. Alternatively, the ITU-TH.264 standard is referred to as MPEG-4 Part 10, or advanced video coding (advanced video coding, AVC). However, the technologies in this application are not limited to any specific coding standard. Other feasible implementations of a video compression standard include MPEG-2 and ITU-TH.263.

Although not shown in FIG. 1, in some aspects, the video encoder 20 and the video decoder 30 may be respectively integrated with an audio encoder and an audio decoder, and may include an appropriate multiplexer-demultiplexer (MUX-DEMUX) unit or other hardware and software to encode both audio and video in a same data stream or separate data streams. If applicable, in some feasible implementations, the MUX-DEMUX unit may comply with the ITUH.223 multiplexer protocol or another protocol such as the user datagram protocol (UDP).

The video encoder 20 and the video decoder 30 each may be implemented as any one of a plurality of appropriate encoder circuits, for example, one or more microprocessors, digital signal processors (DSP), application-specific integrated circuits (ASIC), field-programmable gate arrays (FPGA), discrete logic, software, hardware, firmware, or any combination thereof. When the technologies are implemented partially as software, an apparatus may store an instruction for the software in an appropriate non-transitory computer-readable medium, and execute the instruction in a form of hardware by using one or more processors, to implement the technologies in this application. The video encoder 20 and the video decoder 30 each may be included in one or more encoders or decoders, and any one of the one or more encoders or decoders may be integrated as a part of a combined encoder/decoder (CODEC) in a corresponding apparatus.

This application may, for example, relate to another apparatus in which the video encoder 20 "signals" specific information to, for example, the video decoder 30. However, it should be understood that the video encoder 20 may associate specific syntax elements with encoded parts of video data, to signal information. That is, the video encoder 20 may store the specific syntax elements into header information of the encoded parts of the video data, to signal the data. In some applications, these syntax elements may be encoded and stored (for example, stored in a storage system 34 or on a file server 36) before being received and decoded by the video decoder 30. Therefore, the term "signal" may mean, for example, transmission of a syntax or transmission of other data used for decoding compressed video data, regardless of whether the transmission is performed in real time, nearly in real time, or within a time span. For example, the transmission may be performed when a syntax element is stored in a medium during encoding, and then the syntax element may be retrieved by a decoding apparatus at any time after being stored in the medium.

The JCT-VC has developed the H.265 (HEVC) standard. HEVC standardization is based on an evolved model of a video decoding apparatus, and the model is referred to as an HEVC test model (HM). A latest H.265 standard document is available at http://www.itu.int/rec/T-REC-H.265. A latest version of the standard document is H.265 (12/16), and the standard document is incorporated herein by reference in its entirety. In the HM, it is assumed that the video decoding apparatus has several additional capabilities in comparison with an existing algorithm of ITU-TH.264/AVC. For example, H.264 provides nine intra prediction coding modes, whereas the HM can provide up to 35 intra prediction coding modes.

The JVET is committed to developing the H.266 standard. An H.266 standardization process is based on an evolved model of a video decoding apparatus, and the model is referred to as an H.266 test model. H.266 algorithm descriptions are available at http://phenix.int-evry.fr/jvet, and latest algorithm descriptions are included in JVET-G1001-v1. This algorithm description document is incorporated herein by reference in its entirety. In addition, reference software for the JEM test model is available at https://jvet.hhi.fraunhofer.de/svn/svn_HMJEMSoftware/, and is also incorporated herein by reference in its entirety.

Generally, as described in an HM working model, a video frame or picture may be divided into a sequence of tree blocks or largest coding units (largest coding unit, LCU) including both luma and chroma samples. The LCU is also referred to as a CTU. The tree block has a function similar to a macroblock in the H.264 standard. A slice includes several consecutive tree blocks in a decoding order. A video frame or picture may be partitioned into one or more slices. Each tree block may be split into coding units based on a quadtree. For example, a tree block serving as a root node of the quadtree may be split into four child nodes, and each child node may serve as a parent node and be split into four other child nodes. A final non-splittable child node serving as a leaf node of the quadtree includes a decoding node, for example, a decoded video block. In syntactic data associated with a decoded bitstream, a maximum quantity of splittable times of a tree block and a minimum size of a decoding node may be defined.

A coding unit includes a decoding node, a prediction unit (prediction unit, PU), and a transform unit (transform unit, TU) associated with the decoding node. A size of the CU corresponds to a size of the decoding node, and a shape of the CU needs to be square. The size of the CU may range from 8×8 samples up to at most 64×64 samples, or be a larger tree block size. Each CU may include one or more PUs and one or more TUs. For example, syntactic data associated with the CU may describe partitioning of one CU into one or more PUs. Partition patterns may vary when the CU is encoded in a skip or direct mode, encoded in an intra prediction mode, or encoded in an inter prediction mode. The PU obtained through partitioning may be in a non-square shape. For example, the syntactic data associated with the CU may also describe partitioning of one CU into one or more TUs based on the quadtree. The TU may be in a square or non-square shape.

The HEVC standard allows TU-based transform, and TUs may be different for different CUs. A size of a TU is usually set based on a size of a PU within a given CU defined for a partitioned LCU. However, this may not always be the case. The size of the TU is generally the same as or less than the size of the PU. In some feasible implementations, a quadtree structure that is referred to as a "residual quadtree" (residual quadtree, RQT) may be used to divide a residual sample of the CU into smaller units. A leaf node of the RQT may be referred to as a TU. A sample difference associated with the TU may be transformed to generate a transform coefficient, and the transform coefficient may be quantized.

Generally, the PU includes data related to a prediction process. For example, when the PU is encoded in an intra mode, the PU may include data describing the intra prediction mode of the PU. In another feasible implementation, when the PU is encoded in an inter mode, the PU may include data defining a motion vector for the PU. For example, the data defining the motion vector for the PU may describe a horizontal component of the motion vector, a vertical component of the motion vector, a resolution (for example, one-quarter sample precision or one-eighth sample precision) of the motion vector, a reference picture to which the motion vector points, and/or a reference picture list (for example, a list 0, a list 1, or a list C) of the motion vector.

Generally, transform and quantization processes are used for the TU. A given CU including one or more PUs may also include one or more TUs. After prediction, the video encoder 20 may calculate a residual value of the PU. The residual value includes a sample difference, and the sample difference may be transformed into a transform coefficient, and the transform coefficient is quantized, and undergoes TU scanning to generate a serialized transform coefficient for entropy decoding. In this application, the term "video block" is usually used to indicate a decoding node of a CU. In some specified applications, in this application, the term "video block" may also be used to indicate a tree block including a decoding node, a PU, and a TU. For example, the tree block is an LCU or a CU.

A video sequence usually includes a series of video frames or pictures. For example, a group of pictures (group of picture, GOP) includes a series of video pictures, one video picture, or a plurality of video pictures. The GOP may include syntactic data in header information of the GOP, in header information of one or more of the pictures, or elsewhere. The syntactic data describes a quantity of pictures included in the GOP. Each slice of a picture may include slice syntactic data describing a coding mode of the corresponding picture. The video encoder 20 usually performs an operation on a video block in a video slice, to encode video data. The video block may correspond to the decoding node in the CU. A size of the video block may be fixed or changeable, and may vary according to a specified decoding standard.

In a feasible implementation, the HM supports prediction for a variety of PU sizes. Assuming that a size of a given CU is 2N×2N, the HM supports intra prediction for a PU size of 2N×2N or N×N, and supports inter prediction for a symmetric PU size of 2N×2N, 2N×N, N×2N, or N×N. The HM also supports asymmetric partitioning for inter prediction for PU sizes of 2N×nU, 2N×nD, nL×2N, and nR×2N. In asymmetric partitioning, the CU is not partitioned in one direction, and is partitioned into two parts in the other direction, where one part occupies 25% of the CU and the other part occupies 75% of the CU. The part occupying 25% of the CU is indicated by an indicator including "n" followed by "U (Up)", "D (Down)", "L (Left)" or "R (Right)". Therefore, for example, "2N×nU" refers to a horizontally partitioned 2N×2N CU, with a 2N×0.5N PU at the top and a 2N×1.5N PU at the bottom.

In this application, "N×N" and "N multiplied by N" may be used interchangeably to indicate a sample size of a video block in a vertical dimension and a horizontal dimension, for example, 16×16 samples or 16 multiplied by 16 samples. Generally, a 16×16 block has 16 samples (y=16) in a vertical direction and 16 samples (x=16) in a horizontal direction. Similarly, an N×N block generally has N samples in the vertical direction and N samples in the horizontal direction, where N indicates a non-negative integer. Samples in a block may be arranged in rows and columns. In addition, in a block, a quantity of samples in the horizontal direction and a quantity of samples in the vertical direction may be not necessarily the same. For example, a block may include N×M samples, where M is not necessarily equal to N.

After intra or inter predictive decoding of a PU in a CU, the video encoder 20 may calculate residual data of a TU in the CU. The PU may include sample data in spatial domain (also referred to as sample domain), and the TU may include a coefficient in transform domain after transform (for example, discrete cosine transform (discrete cosine transform, DCT), integer transform, wavelet transform, or conceptually similar transform) is performed on residual video data. The residual data may correspond to differences between sample values of an unencoded picture and predicted sample values of the PU. The video encoder 20 may generate a TU including residual data of the CU, and then transform the TU to generate a transform coefficient of the CU.

After performing any transform to generate a transform coefficient, the video encoder 20 may quantize the transform coefficient. Quantization refers to, for example, a process of quantizing a coefficient, to reduce an amount of data used for representing the coefficient and implement further compression. The quantization process can reduce a bit depth associated with some or all coefficients. For example, during quantization, an n-bit value may be reduced to an m-bit value, where n is greater than m.

The JEM model further improves a video picture coding structure. A block coding structure referred to as a "quadtree plus binary tree" (QTBT) is introduced. Without using such concepts as CU, PU, and TU in HEVC, the QTBT structure supports a more flexible CU partitioning shape. One CU may be in a square or rectangular shape. Quadtree partitioning is first performed on a CTU, and binary tree partitioning is further performed on a leaf node of the quadtree. In addition, there are two binary tree partition patterns: symmetric horizontal partitioning and symmetric vertical partitioning. A leaf node of a binary tree is referred to as a CU. A CU in the JEM cannot be further partitioned during prediction and transform. In other words, a CU, a PU, and a TU in the JEM have a same block size. In the existing JEM, a maximum CTU size is 256×256 luma samples.

In some feasible implementations, the video encoder 20 may scan a quantized transform coefficient in a predefined scanning order to generate a serialized vector that can be entropy encoded. In other feasible implementations, the video encoder 20 may perform adaptive scanning. After scanning the quantized transform coefficient to form a one-dimensional vector, the video encoder 20 may perform entropy decoding on the one-dimensional vector by using context-based adaptive variable length coding (CAVLC), context-based adaptive binary arithmetic coding (CABAC), syntax-based context-adaptive binary arithmetic coding (SBAC), probability interval partitioning entropy (PIPE) coding, or another entropy coding method. The video encoder 20 may further perform entropy coding on a syntax element associated with the encoded video data, for the video decoder 30 to decode the video data.

To perform CABAC, the video encoder 20 may assign a context in a context model to a to-be-transmitted symbol. The context may be related to whether an adjacent value of the symbol is non-zero. To perform CAVLC, the video encoder 20 may select a variable-length code of the to-be-transmitted symbol. A codeword in the variable-length code (VLC) may be constructed, so that a shorter code corresponds to a more probable symbol and a longer code corresponds to a less probable symbol. In this way, in comparison with using equal-length codewords for all to-be-transmitted symbols, using VLC can reduce a bit rate. A probability in CABAC can be determined based on the context assigned to the symbol.

In the embodiments of this application, the video encoder may perform inter prediction to reduce temporal redundancy between pictures. As described above, a CU may have one or more prediction units PUs depending on stipulations of different video compression coding standards. In other words, a plurality of PUs may belong to a CU, or a PU and a CU have a same size. In this specification, when the PU and the CU have a same size, a partition pattern of the CU is no partition, or the CU is partitioned into one PU, and the PU is uniformly used for description. When the video encoder performs inter prediction, the video encoder may signal motion information for the PU to the video decoder. For example, the motion information for the PU may include: a reference picture index, a motion vector, and a prediction direction identifier. The motion vector may indicate displacement between a picture block (also referred to as a video block, a sample block, a sample set, or the like) for the PU and a reference block for the PU. The reference block for the PU may be a part similar to a reference picture of a picture block of the PU. The reference block may be located in a reference picture indicated by the reference picture index and the prediction direction identifier.

To reduce a quantity of coding bits required to represent the motion information for the PU, the video encoder may generate a candidate predictive motion vector (Motion Vector, MV) list for each PU in a merge prediction mode or an advanced motion vector prediction mode. Each candidate predictive motion vector in the candidate predictive motion vector list for the PU may indicate motion information. Motion information indicated by some candidate predictive motion vectors in the candidate predictive motion vector list may be based on motion information for other PUs. If the candidate predictive motion vector indicates motion information that specifies one of a spatial candidate predictive motion vector position or a temporal candidate predictive motion vector position, the candidate predictive motion vector may be referred to as an "original" candidate predictive motion vector in this application. For example, for a merge mode, also referred to as the merge prediction mode in this specification, there may be five original spatial candidate predictive motion vector positions and one original temporal candidate predictive motion vector position. In some examples, the video encoder may generate an additional candidate predictive motion vector by combining some motion vectors from different original candidate predictive motion vectors, modifying an original candidate predictive motion vector, or inserting only a zero motion vector as a candidate predictive motion vector. These additional candidate predictive motion vectors are not considered as original candidate predictive motion vectors and may be referred to as artificially generated candidate predictive motion vectors in this application.

The technologies in this application generally include a technology for generating a candidate predictive motion vector list on the video encoder and a technology for generating the same candidate predictive motion vector list on the video decoder. The video encoder and the video decoder may generate the same candidate predictive motion vector list by implementing a same technology for constructing the candidate predictive motion vector list. For example, the video encoder and the video decoder may construct lists with a same quantity of candidate predictive motion vectors (for example, five candidate predictive motion vectors). The video encoder and the video decoder may first consider spatial candidate predictive motion vectors (for example, adjacent blocks in a same picture) and then consider temporal candidate predictive motion vectors (for example, candidate predictive motion vectors in different pictures), and finally may consider artificially generated candidate predictive motion vectors, until a required quantity of candidate predictive motion vectors are added to the lists. According to the technologies in this application, during construction of candidate predictive motion vector lists, pruning operations may be performed for some types of candidate predictive motion vectors to remove repeated candidate motion information from the candidate predictive motion vector list, while pruning operations may not be performed for other types of candidate predictive motion vectors to reduce decoder complexity. For example, for a set of spatial candidate predictive motion vectors and for a temporal candidate predictive motion vector, a pruning operation may be performed to remove candidate predictive motion vectors with repeated motion information from the candidate predictive motion vector list. However, when an artificially generated candidate predictive motion vector is to be added to the candidate predictive motion vector list, the artificially generated candidate predictive motion vector on which no pruning operation is not performed may be added to the candidate predictive motion vector list.

After generating the candidate predictive motion vector list for the PU of the CU, the video encoder may select a candidate predictive motion vector from the candidate predictive motion vector list and output a candidate predictive motion vector index in a bitstream. The selected candidate predictive motion vector may be a candidate predictive motion vector having a motion vector for generating a predictor that most closely matches a target PU that is being decoded. The candidate predictive motion vector index may indicate a position of the selected candidate predictive motion vector in the candidate predictive motion vector list. The video encoder may further generate, based on a reference block indicated by the motion information for the PU, a prediction picture block for the PU. The motion information for the PU may be determined based on motion information indicated by the selected candidate predictive motion vector. For example, in the merge mode, the motion information for the PU may be the same as the motion information indicated by the selected candidate predictive motion vector. In an AMVP mode, the motion information for the PU may be determined based on a motion vector difference for the PU and the motion information indicated by the selected candidate predictive motion vector. The video encoder may generate, based on the prediction picture block for the PU of the CU and an original picture block for the CU, one or more residual picture blocks for the CU. Then, the video encoder may encode the one or more residual picture blocks and output the one or more residual picture blocks in the bitstream.

The bitstream may include data for identifying the selected candidate predictive motion vector for the PU in the candidate predictive motion vector list. The video decoder may determine the motion information for the PU based on the motion information indicated by the selected candidate predictive motion vector in the candidate predictive motion vector list for the PU. The video decoder may identify, based on the motion information for the PU, one or more reference blocks for the PU. After identifying the one or more reference blocks for the PU, the video decoder may generate, based on the one or more reference blocks for the PU, the prediction picture block for the PU. The video decoder may reconstruct a picture block for the CU based on the prediction picture block for the PU of the CU and the one or more residual picture blocks for the CU.

For ease of explanation, in this application, it may be described as that the position or the picture block has various spatial relationships with the CU or the PU. Such a description may be explained as follows: The position or the picture block has various spatial relationships with the picture block associated with the CU or the PU. In addition, in this application, a PU that is being decoded by the video decoder may be referred to as a current PU, and may also be referred to as a current to-be-processed picture block. In this application, a CU that is being decoded by the video decoder may be referred to as a current CU. In this application, a picture that is being decoded by the video decoder may be referred to as a current picture. It should be understood that this application is applicable to a case in which a PU and a CU have a same size, or a case in which a PU is a CU and a PU and a CU is uniformly represented by a PU.

As described briefly above, the video encoder 20 may generate a prediction picture block and motion information for a PU of a CU through inter prediction. In many examples, motion information for a given PU may be the same as or similar to motion information for one or more adjacent PUs (that is, a PU whose picture block is spatially or temporally adjacent to a picture block of the given PU). Because the adjacent PU often has similar motion information, the video encoder 20 may encode the motion information for the given PU based on the motion information for the adjacent PU. Encoding the motion information for the given PU based on the motion information for the adjacent PU may reduce a quantity of coded bits, required in the bitstream, for indicating the motion information for the given PU.

The video encoder 20 may encode the motion information for the given PU based on the motion information for the adjacent PU in various manners. For example, the video encoder 20 may indicate that the motion information for the given PU is the same as the motion information for the adjacent PU. In this application, the merge mode may be used to indicate that the motion information for the given PU is the same as or may be derived from the motion information for the adjacent PU. In another feasible implementation, the video encoder 20 may calculate a motion vector difference (Motion Vector Difference, MVD) used for the given PU. The MVD indicates a difference between a motion vector for the given PU and a motion vector for the adjacent PU. The video encoder 20 may include the MVD instead of the motion vector for the given PU in the motion information for the given PU. In the bitstream, a quantity of coded bits required for representing the MVD is less than a quantity of coded bits required for representing the motion vector for the given PU. In this application, the advanced motion vector prediction mode may be used to indicate that the motion information for the given PU is notified to a decoder side by using the MVD and an index value that is used for identifying a candidate motion vector.

To signal the motion information for the given PU to the decoder side in the merge mode or the AMVP mode, the video encoder 20 may generate a candidate predictive motion vector list for the given PU. The candidate predictive motion vector list may include one or more candidate predictive motion vectors. Each of the candidate predictive motion vectors in the candidate predictive motion vector list for the given PU may specify motion information. The motion information indicated by each candidate predictive motion vector may include a motion vector, a reference picture index, and a prediction direction identifier. The candidate predictive motion vector in the candidate predictive motion vector list may include an "original" candidate predictive motion vector, and each candidate predictive motion vector indicates motion information for one of specified candidate predictive motion vector positions within a PU different from the given PU.

After generating the candidate predictive motion vector list for the PU, the video encoder 20 may select one candidate predictive motion vector from the candidate predictive motion vector list for the PU. For example, the video encoder may compare each candidate predictive motion vector with a PU being decoded and may select a candidate predictive motion vector having a desired bit rate-distortion cost. The video encoder 20 may output a candidate predictive motion vector index for the PU. The candidate predictive motion vector index may identify a position of the selected candidate predictive motion vector in the candidate predictive motion vector list.

In addition, the video encoder 20 may generate, based on a reference block indicated by the motion information for the PU, a prediction picture block for the PU. The video encoder 20 may determine the motion information for the PU based on motion information indicated by the selected candidate predictive motion vector in the candidate predictive motion vector list for the PU. For example, in the merge mode, the motion information for the PU may be the same as the motion information indicated by the selected candidate predictive motion vector. In the AMVP mode, the motion information for the PU may be determined based on a motion vector difference for the PU and the motion information indicated by the selected candidate predictive motion vector. The video encoder 20 may process the prediction picture block for the PU as described above.

When the video decoder 30 receives the bitstream, the video decoder 30 may generate a candidate predictive motion vector list for each PU of the CU. A candidate predictive motion vector list generated by the video decoder 30 for the PU may be the same as a candidate predictive motion vector list generated by the video encoder 20 for the PU. A syntax element obtained by parsing the bitstream may indicate a position of the selected candidate predictive motion vector in the candidate predictive motion vector list for the PU. After generating the candidate predictive motion vector list for the PU, the video decoder 30 may generate, based on one or more reference blocks indicated by the motion information for the PU, the prediction picture block for the PU. The video decoder 30 may determine the motion information for the PU based on the motion information indicated by the selected candidate predictive motion vector in the candidate predictive motion vector list for the PU. The video decoder 30 may reconstruct a picture block for the CU based on the prediction picture block for the PU and a residual picture block for the CU.

It should be understood that in a feasible implementation, on the decoder side, construction of the candidate predictive motion vector list and parsing of the bitstream to obtain the position of the selected candidate predictive motion vector in the candidate predictive motion vector list are independent of each other, and may be performed in any order or simultaneously performed.

In another feasible implementation, on the decoder side, the position of the selected candidate predictive motion vector in the candidate predictive motion vector list is first obtained by parsing the bitstream, and the candidate predictive motion vector list is constructed based on the position obtained through parsing. In this implementation, not all candidate predictive motion vector lists need to be constructed, and only a candidate predictive motion vector list in the position obtained through parsing needs to be constructed, to determine the candidate predictive motion vector in the position. For example, when the selected candidate predictive motion vector obtained by parsing the bitstream is a candidate predictive motion vector with an index 3 in the candidate predictive motion vector list, only a candidate predictive motion vector list from an index 0 to the index 3 needs to be constructed, to determine the candidate predictive motion vector with the index 3. This can reduce complexity and improve decoding efficiency.

Figure 2:
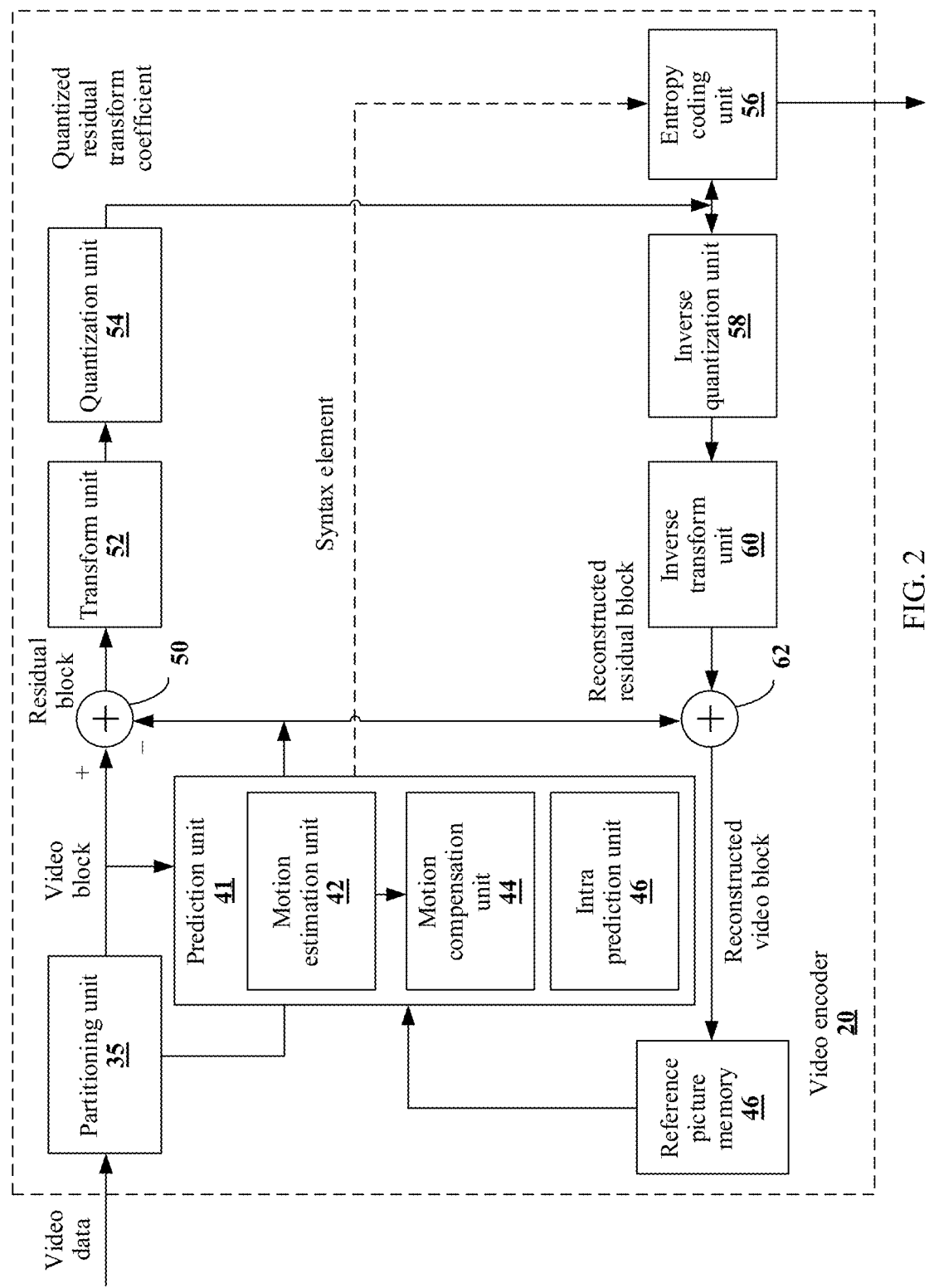
FIG. 2 is a block diagram of an example of a video encoder that may be configured for use in an embodiment of this application.

FIG. 2 is a schematic block diagram of a video encoder 20 according to an embodiment of this application. The video encoder 20 may perform intra decoding and inter decoding on a video block in a video slice. The intra decoding relies on spatial prediction to reduce or remove spatial redundancy of a video in a given video frame or picture. The inter decoding relies on temporal prediction to reduce or remove temporal redundancy of a video in an adjacent frame or picture of a video sequence. An intra mode (I mode) may be any one of several space-based compression modes. An inter mode, such as unidirectional prediction (P mode) or bidirectional prediction (B mode), may be any one of several time-based compression modes.

In a feasible implementation of FIG. 2, the video encoder 20 includes a partitioning unit 35, a prediction unit 41, a reference picture memory 64, a summator 50, a transform processing unit 52, a quantization unit 54, and an entropy coding unit 56. The prediction unit 41 includes a motion estimation unit 42, a motion compensation unit 44, and an intra prediction module 46. For video block reconstruction, the video encoder 20 further includes an inverse quantization unit 58, an inverse transform unit 60, and a summator 62. The video encoder 20 may further include a deblocking filter (not shown in FIG. 2), to filter a block boundary, to remove blocking artifact from a reconstructed video. When necessary, the deblocking filter usually filters an output of the summator 62. In addition to the deblocking filter, an additional loop filter (within or after a loop) may further be used.

As shown in FIG. 2, the video encoder 20 receives video data, and the partitioning unit 35 partitions the data into video blocks. Such partitioning may further include partitioning into slices, picture blocks, or other larger units, and (for example) video block partitioning based on quadtree structures of an LCU and a CU. For example, components of the video encoder 20 for encoding video blocks in a to-be-coded video slice are described. Usually, one slice may be partitioned into a plurality of video blocks (and may be partitioned into a set of video blocks that are referred to as picture blocks).

The prediction unit 41 may select one of a plurality of possible decoding modes, for example, one of a plurality of intra decoding modes or one of a plurality of inter decoding modes, for a current video block based on coding quality and a cost calculation result (for example, a rate-distortion cost, RD cost, or referred to as rate distortion cost). The prediction unit 41 may provide an intra-decoded or inter-decoded block to the summator 50 to generate residual block data, and provide the intra-decoded or inter-decoded block to the summator 62 to reconstruct a coded block and use a reconstructed block as a reference picture.

The motion estimation unit 42 and the motion compensation unit 44 in the prediction unit 41 performs inter prediction decoding on the current video block relative to one or more prediction blocks of one or more reference pictures, to provide temporal compression. The motion estimation unit 42 may be configured to determine an inter prediction mode for a video slice based on a preset mode of a video sequence. In the preset mode, the video slice in the sequence may be specified as a P slice, a B slice, or a GPB slice. The motion estimation unit 42 and the motion compensation unit 44 may be highly integrated, but are described separately to explain concepts. Motion estimation performed by the motion estimation unit 42 is a process of generating a motion vector for estimating a video block. For example, the motion vector may indicate displacement of a PU of a video block in a current video frame or picture relative to a prediction block in a reference picture.

The prediction block is a block in a PU that is found, based on a sample difference, to be closely matched with a to-be-decoded video block, and the sample difference may be determined based on a sum of absolute differences (SAD), a sum of squared differences (SSD), or another difference metric. In some feasible implementations, the video encoder 20 may calculate a value of a sub-integer (sub-integer) sample position of a reference picture stored in the reference picture memory 64. For example, the video encoder 20 may interpolate a value of one-quarter sample position, one-eighth sample position, or another fractional sample position of the reference picture. Therefore, the motion estimation unit 42 may perform a motion search relative to a full sample position and a fractional sample position, and output a motion vector with fractional sample precision.

The motion estimation unit 42 calculates a motion vector of a PU of a video block in an inter-decoded slice by comparing a position of the PU and a position of the prediction block in the reference picture. The reference picture may be selected from a first reference picture list (a list 0) or a second reference picture list (a list 1). Each item in the list identifies one or more reference pictures stored in the reference picture memory 64. The motion estimation unit 42 sends the calculated motion vector to the entropy coding unit 56 and the motion compensation unit 44.

Motion compensation implemented by the motion compensation unit 44 may include abstracting or generating a prediction block based on the motion vector determined through motion estimation, and interpolation at a sub-sample level may be performed. After receiving the motion vector for the PU of the current video block, the motion compensation unit 44 may locate a prediction block pointed to by the motion vector in one of the reference picture lists. The video encoder 20 subtracts a sample value of the prediction block from a sample value of the current video block being decoded, to obtain a residual video block, and obtain a sample difference. The sample difference forms residual data of a block, and may include both a luma difference component and a chroma difference component. The summator 50 is one or more components for performing a subtraction operation. The motion compensation unit 44 may further generate a syntax element associated with the video block and the video slice, for a video decoder 30 to decode the video block in the video slice.

If the PU is located in the B slice, a picture including the PU may be associated with the two reference picture lists referred to as the "list 0" and the "list 1". In some feasible implementations, a picture including the B slice may be associated with a list combination of the list 0 and the list 1.

In addition, if the PU is located in the B slice, the motion estimation unit 42 may perform unidirectional prediction or bidirectional prediction for the PU. In some feasible implementations, bidirectional prediction is prediction separately performed based on pictures in the reference picture lists: the list 0 and the list 1. In some other feasible implementations, bidirectional prediction is prediction separately performed based on a reconstructed future frame and a reconstructed past frame of the current frame in a display order. When the motion estimation unit 42 performs unidirectional prediction for the PU, the motion estimation unit 42 may search a reference picture in the list 0 or the list 1 for a reference block for the PU. Then, the motion estimation unit 42 may generate a reference index indicating a reference picture including the reference block in the list 0 or the list 1, and a motion vector indicating spatial displacement between the PU and the reference block. The motion estimation unit 42 may output the reference index, a prediction direction identifier, and the motion vector as motion information for the PU. The prediction direction identifier may indicate the reference picture indicated by the reference index in the list 0 or the list 1. The motion compensation unit 44 may generate a prediction picture block for the PU based on the reference block indicated by the motion information for the PU.

When the motion estimation unit 42 performs bidirectional prediction for the PU, the motion estimation unit 42 may search the reference picture in the list 0 for a reference block for the PU, and may further search the reference picture in the list 1 for another reference block for the PU. Then, the motion estimation unit 42 may generate reference indexes indicating reference pictures including the reference blocks in the list 0 and the list 1, and motion vectors indicating spatial displacement between the reference blocks and the PU. The motion estimation unit 42 may output the reference indexes and the motion vectors for the PU as motion information for the PU. The motion compensation unit 44 may generate prediction picture blocks for the PU based on the reference blocks indicated by the motion information for the PU.

In some feasible implementations, the motion estimation unit 42 does not output a complete set of the motion information for the PU to the entropy coding module 56. Instead, the motion estimation unit 42 may signal the motion information for the PU based on motion information for another PU. For example, the motion estimation unit 42 may determine that the motion information for the PU is greatly similar to motion information for an adjacent PU. In this implementation, the motion estimation unit 42 may indicate an indicator value in a syntax structure associated with the PU, and the indicator value indicates, to the video decoder 30, that the motion information for the PU is the same as or may be derived from the motion information for the adjacent PU. In another implementation, the motion estimation unit 42 may identify, from the syntax structure associated with the PU, a candidate predictive motion vector associated with the adjacent PU and a motion vector difference (MVD). The MVD indicates a difference between the motion vector for the PU and an indicated candidate predictive motion vector associated with the adjacent PU. The video decoder 30 may determine the motion vector for the PU by using the indicated candidate predictive motion vector and the MVD.

As described above, the prediction module 41 may generate a candidate predictive motion vector list for each PU of the CU. One or more candidate predictive motion vector lists may include one or more original candidate predictive motion vectors and one or more additional candidate predictive motion vectors derived from the one or more original candidate predictive motion vectors.

The intra prediction unit 46 in the prediction unit 41 may perform intra prediction decoding on a current video block relative to one or more adjacent blocks in a picture or slice that is the same as the current to-be-decoded block, to provide spatial compression. Therefore, as an alternative of inter prediction (as described above) performed by the motion estimation unit 42 and the motion compensation unit 44, the intra prediction unit 46 may perform intra prediction on the current block. To be specific, the intra prediction unit 46 may determine an intra prediction mode for encoding the current block. In some feasible implementations, the intra prediction unit 46 may (for example) use various intra prediction modes to encode the current block during separate coding traversal, and the intra prediction unit 46 (or in some feasible implementations, a mode selection unit 40) may select an appropriate intra prediction mode from tested modes.

After the prediction unit 41 generates a prediction block of the current video block through inter prediction or intra prediction, the video encoder 20 generates the residual video block by subtracting the prediction block from the current video block. Residual video data in the residual block may be included in one or more TUs, and is applied to the transform processing unit 52. The transform processing unit 52 transforms the residual video data into a residual transform coefficient by performing, for example, discrete cosine transform (DCT) or conceptually similar transform (for example, discrete sine transform DST). The transform processing unit 52 may transform the residual video data from sample domain data to transform domain (for example, frequency domain) data.

The transform processing unit 52 may send the obtained transform coefficient to the quantization unit 54. The quantization unit 54 quantizes the transform coefficient to further reduce a bit rate. The quantization process can reduce a bit depth associated with some or all coefficients. A quantization degree may be modified by adjusting a quantization parameter. In some feasible implementations, the quantization unit 54 may continue to scan a matrix including a quantized transform coefficient. Alternatively, the entropy coding unit 56 may perform the scanning.

After quantization, the entropy coding unit 56 may perform entropy coding on the quantized transform coefficient. For example, the entropy coding unit 56 may perform context-adaptive variable-length coding (CAVLC), context-adaptive binary arithmetic coding (CABAC), syntax-based context-adaptive binary arithmetic coding (SBAC), probability interval partitioning entropy (PIPE) coding, or another entropy coding method or technology. The entropy coding unit 56 may also perform entropy coding on a motion vector and another syntax element that are of a current video slice being decoded. After the entropy coding unit 56 performs entropy coding, an encoded bitstream may be transmitted to the video decoder 30 or stored for subsequent transmission or search by the video decoder 30.

The entropy coding unit 56 may encode information indicating, according to technologies in this application, the selected intra prediction mode. The video encoder 20 may include, in transmitted bitstream configuration data that may include a plurality of intra prediction mode index tables and a plurality of modified intra prediction mode index tables (also referred to as codeword mapping tables), definitions of coding contexts of various blocks, and indications of an MPM, an intra prediction mode index table, and a modified intra prediction mode index table that are used for each of the contexts.

The inverse quantization unit 58 and the inverse transform unit 60 respectively perform inverse quantization and inverse transform, to reconstruct a residual block in sample domain to be subsequently used as a reference block of a reference picture. The motion compensation unit 44 may calculate the reference block by adding the residual block and a prediction block in one of the reference pictures in one of the reference picture lists. The motion compensation unit 44 may also apply one or more interpolation filters to a reconstructed residual block, to calculate a sub-integer sample value for motion estimation. The summator 62 adds the reconstructed residual block and a motion-compensated prediction block generated by the motion compensation unit 44, to generate the reference block, where the reference block is stored in the reference picture memory 64. The reference block may be used by the motion estimation unit 42 and the motion compensation unit 44 as a reference block for performing inter prediction for a block in a subsequent video frame or picture.

Figure 3:
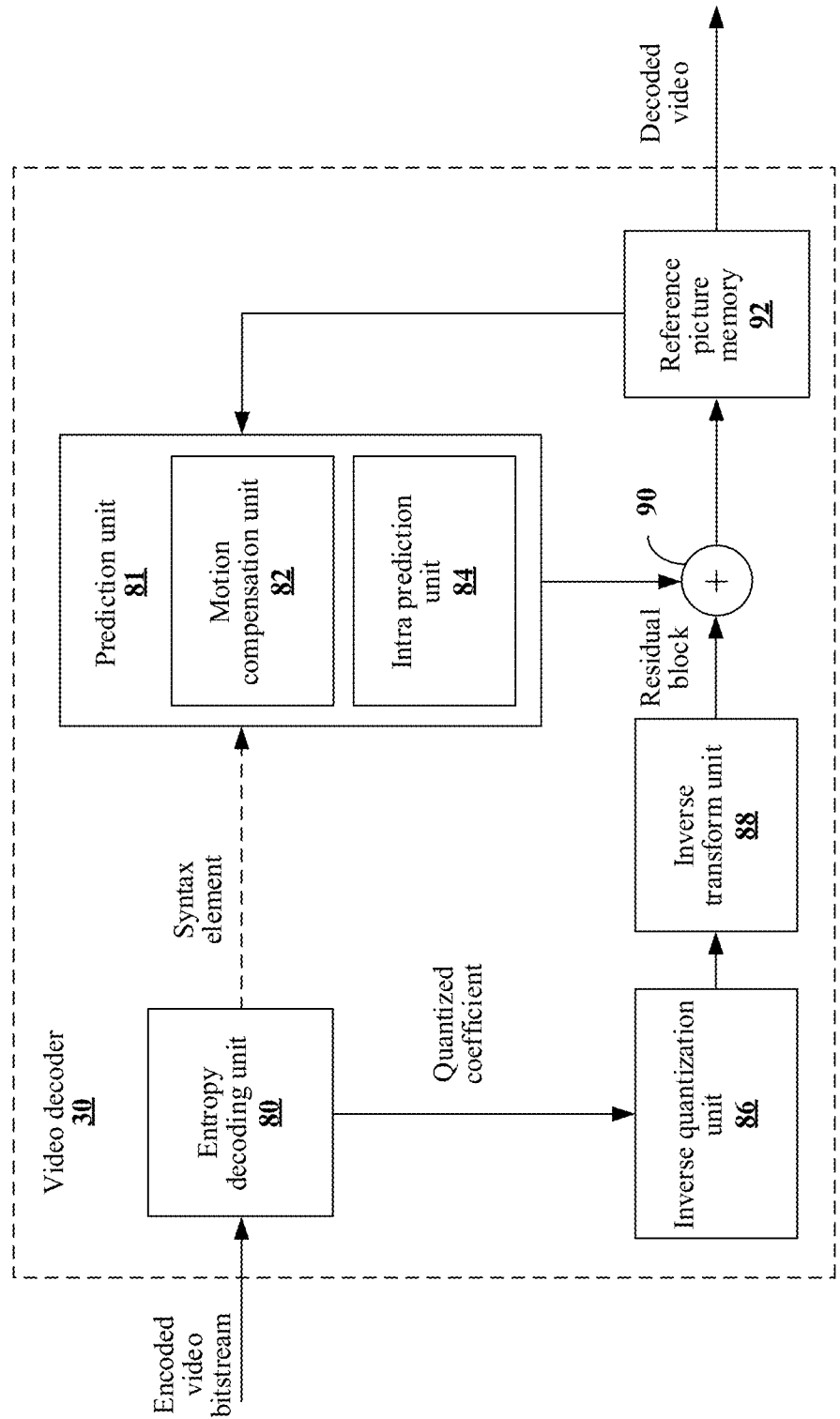
FIG. 3 is a block diagram of an example of a video decoder that may be configured for use in an embodiment of this application.

FIG. 3 is a schematic block diagram of a video decoder 30 according to an embodiment of this application. In a feasible implementation of FIG. 3, the video decoder 30 includes an entropy coding unit 80, a prediction unit 81, an inverse quantization unit 86, an inverse transform unit 88, a summator 90, and a reference picture memory 92. The prediction unit 81 includes a motion compensation unit 82 and an intra prediction unit 84. In some feasible implementations, the video decoder 30 may perform a decoding process inverse to the encoding process of the video encoder 20 shown in FIG. 4.

During decoding, the video decoder 30 receives, from the video encoder 20, an encoded video bitstream indicating a video block of an encoded video slice and associated syntax elements. The entropy coding unit 80 of the video decoder 30 performs entropy decoding on the bitstream, to generate a quantized coefficient, a motion vector, and other syntax elements. The entropy coding unit 80 transfers the motion vector and the other syntax elements to the prediction unit 81. The video decoder 30 may receive the syntax elements at a video slice level and/or a video block level.

When the video slice is decoded into an intra-decoded (I) slice, the intra prediction unit 84 of the prediction unit 81 may generate prediction data of a video block of a current video slice based on a signaled intra prediction mode and data of a previously decoded block of a current frame or picture.

When a video picture is decoded into an inter-decoded slice (for example, a B slice, a P slice, or a GPB slice), the motion compensation unit 82 of the prediction unit 81 generates a prediction block of a video block of a current video picture based on the motion vector and the other syntax elements that are received from the entropy coding unit 80. The prediction block may be generated from one of reference pictures in one of reference picture lists. The video decoder 30 may use a default construction technology to construct the reference picture lists (a list 0 and a list 1) based on a reference picture stored in the reference picture memory 92.

The motion compensation unit 82 determines prediction information of the video block of the current video slice by parsing the motion vector and the other syntax elements, and uses the prediction information to generate the prediction block of the video block being decoded. For example, the motion compensation unit 82 uses some of the received syntax elements to determine a prediction mode (for example, intra prediction or inter prediction) for decoding the video block of the video slice, an inter prediction slice type (for example, a B slice, a P slice, or a GPB slice), construction information of one or more of the reference picture lists for the slice, a motion vector of each inter-coded video block of the slice, an inter prediction status of each inter-decoded video block of the slice, and other information for decoding the video block in the current video slice.

The motion compensation unit 82 may further perform interpolation by using an interpolation filter. The motion compensation unit 82 may use the interpolation filter used by the video encoder 20 during video block coding, to calculate an interpolation value of a sub-integer sample of a reference block. In this application, the motion compensation unit 82 may determine, based on the received syntax elements, the interpolation filter used by the video encoder 20, and use the interpolation filter to generate the prediction block.

If a PU is encoded through inter prediction, the motion compensation unit 82 may generate a candidate predictive motion vector list for the PU. The bitstream may include data for identifying a position of a selected candidate predictive motion vector in the candidate predictive motion vector list for the PU. After generating the candidate predictive motion vector list for the PU, the motion compensation unit 82 may generate, based on one or more reference blocks indicated by motion information for the PU, a prediction picture block for the PU. The reference block for the PU may be located in a time picture different from a time picture of the PU. The motion compensation unit 82 may determine the motion information for the PU based on motion information selected from the candidate predictive motion vector list for the PU.

The inverse quantization unit 86 performs inverse quantization (for example, de-quantization) on a quantized transform coefficient provided in the bitstream and decoded by the entropy coding unit 80. The inverse quantization process may include: determining a quantization degree by using a quantization parameter calculated by the video encoder 20 for each video block in the video slice, and similarly determining a to-be-applied inverse quantization degree. The inverse transform unit 88 performs inverse transform (for example, inverse DCT, inverse integer transform, or a conceptually similar inverse transform process) to the transform coefficient to generate a residual block in sample domain.

After the motion compensation unit 82 generates the prediction block of the current video block based on the motion vector and the other syntax elements, the video decoder 30 adds the residual block from the inverse transform unit 88 and the corresponding prediction block generated by the motion compensation unit 82, to constitute a decoded video block. The summator 90 is one or more components for performing a summation operation. When necessary, a deblocking filter may further be used to filter the decoded block to remove blocking artifact. Another loop filter (in a decoding loop or after a decoding loop) may further be used to smooth sample transform, or video quality may be improved in another manner. Then, a decoded video block in a given frame or picture is stored in the reference picture memory 92. The reference picture memory 92 stores a reference picture used for subsequent motion compensation. The reference picture memory 92 further stores a decoded video to be displayed subsequently on a display apparatus such as the display apparatus 32 in FIG. 1.

As described above, the technologies in this application relate to, for example, inter decoding. It should be understood that the technologies in this application may be implemented by any video decoder described in this application, and the video decoder includes (for example) the video encoder 20 and the video decoder 30 shown in FIG. 1 to FIG. 3. To be specific, in a feasible implementation, the prediction unit 41 shown in FIG. 2 may perform a specified technology described below when inter prediction is performed during encoding of a block of video data. In another feasible implementation, the prediction unit 81 shown in FIG. 3 may perform a specified technology described below when inter prediction is performed during decoding of a block of video data. Therefore, a reference to a general "video encoder" or "video decoder" may include the video encoder 20, the video decoder 30, or another video encoding unit or encoding unit.

Figure 4:
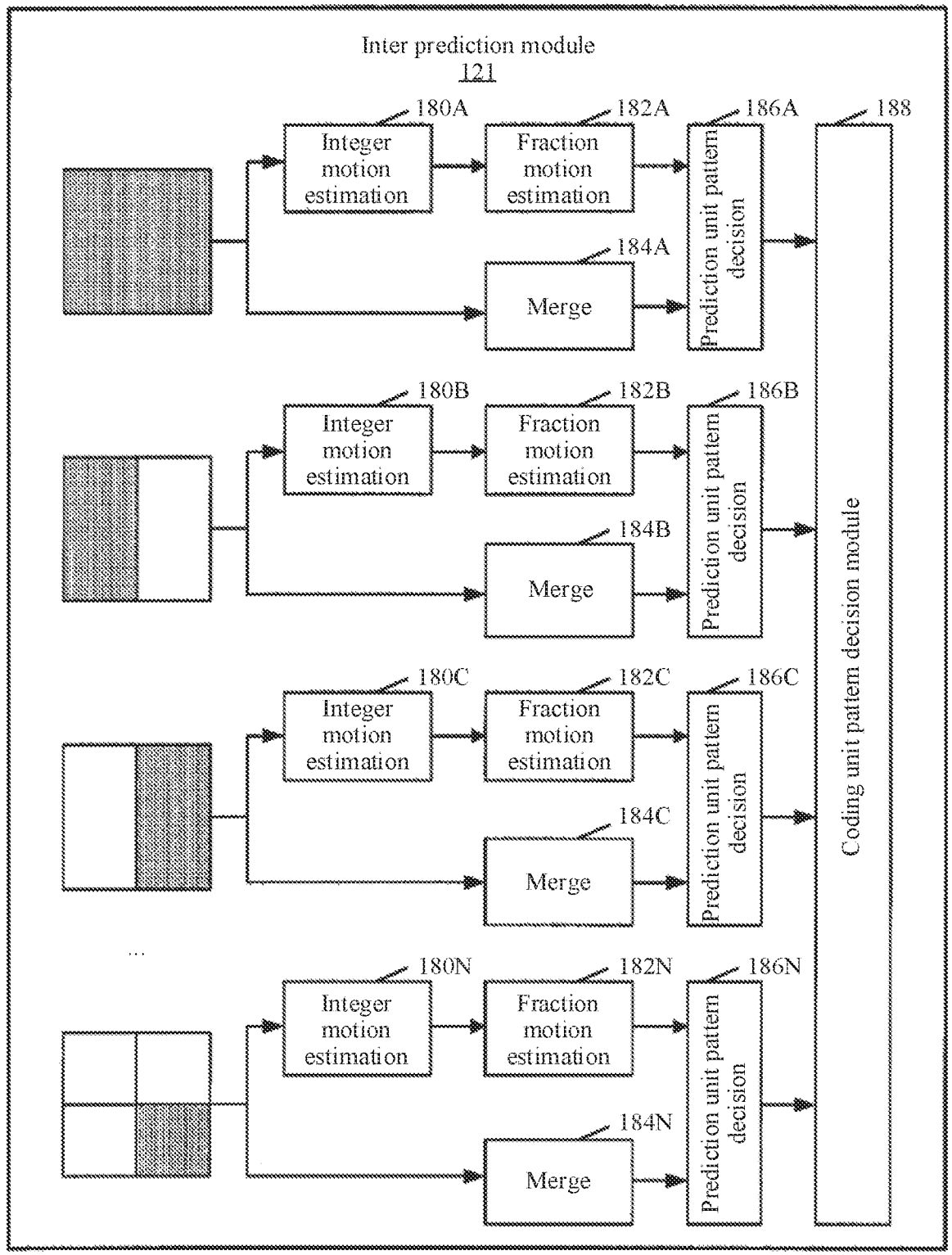
FIG. 4 is a block diagram of an example of an inter prediction module that may be configured for use in an embodiment of this application.

FIG. 4 is a schematic block diagram of an inter prediction module according to an embodiment of this application. An inter prediction module 121, for example, may include a motion estimation unit 42 and a motion compensation unit 44. A relationship between a PU and a CU is different in different video compression coding standards. The inter prediction module 121 may partition a current CU into PUs in a plurality of partitioning patterns. For example, the inter prediction module 121 may partition the current CU into PUs in partition patterns: 2N×2N, 2N×N, N×2N, and N×N. In other embodiments, the current CU is a current PU, and this is not limited.

The inter prediction module 121 may perform integer motion estimation (Integer Motion Estimation, IME) and then perform fraction motion estimation (Fraction Motion Estimation, FME) on each of the PUs. When the inter prediction module 121 performs IME on the PU, the inter prediction module 121 may search one or more reference pictures for a reference block for the PU. After finding the reference block for the PU, the inter prediction module 121 may generate a motion vector that indicates, with integer precision, spatial displacement between the PU and the reference block for the PU. When the inter prediction module 121 performs FME on the PU, the inter prediction module 121 may improve a motion vector generated by performing IME on the PU. The motion vector generated by performing FME on the PU may have sub-integer precision (for example, one-half sample precision or one-quarter sample precision). After generating the motion vector for the PU, the inter prediction module 121 may generate a prediction picture block for the PU by using the motion vector for the PU.

In some feasible implementations in which the inter prediction module 121 signals the motion information for the PU to a decoder side in an AMVP mode, the inter prediction module 121 may generate a candidate predictive motion vector list for the PU. The candidate predictive motion vector list may include one or more original candidate predictive motion vectors and one or more additional candidate predictive motion vectors derived from the one or more original candidate predictive motion vectors. After generating the candidate predictive motion vector list for the PU, the inter prediction module 121 may select a candidate predictive motion vector from the candidate predictive motion vector list and generate a motion vector difference (MVD) for the PU. The MVD for the PU may indicate a difference between a motion vector indicated by the selected candidate predictive motion vector and the motion vector generated, by performing IME and FME, for the PU. In these feasible implementations, the inter prediction module 121 may output a candidate predictive motion vector index identifying a position of the selected candidate predictive motion vector in the candidate predictive motion vector list. The inter prediction module 121 may further output the MVD for the PU. The following describes a feasible implementation of the advanced motion vector prediction (AMVP) mode in FIG. 6 in detail in this embodiment of this application.

In addition to generating, by performing IME and FME on the PU, the motion information for the PU, the inter prediction module 121 may further perform a merge (Merge) operation on each of the PUs. When the inter prediction module 121 performs the merge operation on the PU, the inter prediction module 121 may generate a candidate predictive motion vector list for the PU. The candidate predictive motion vector list for the PU may include one or more original candidate predictive motion vectors and one or more additional candidate predictive motion vectors derived from the one or more original candidate predictive motion vectors. The original candidate predictive motion vectors in the candidate predictive motion vector list may include one or more spatial candidate predictive motion vectors and one or more temporal candidate predictive motion vectors. The spatial candidate predictive motion vector may indicate motion information for another PU in a current picture. The temporal candidate predictive motion vector may be based on motion information for a corresponding PU in a picture different from the current picture. The temporal candidate predictive motion vector may also be referred to as temporal motion vector prediction (TMVP).

Figure 5:
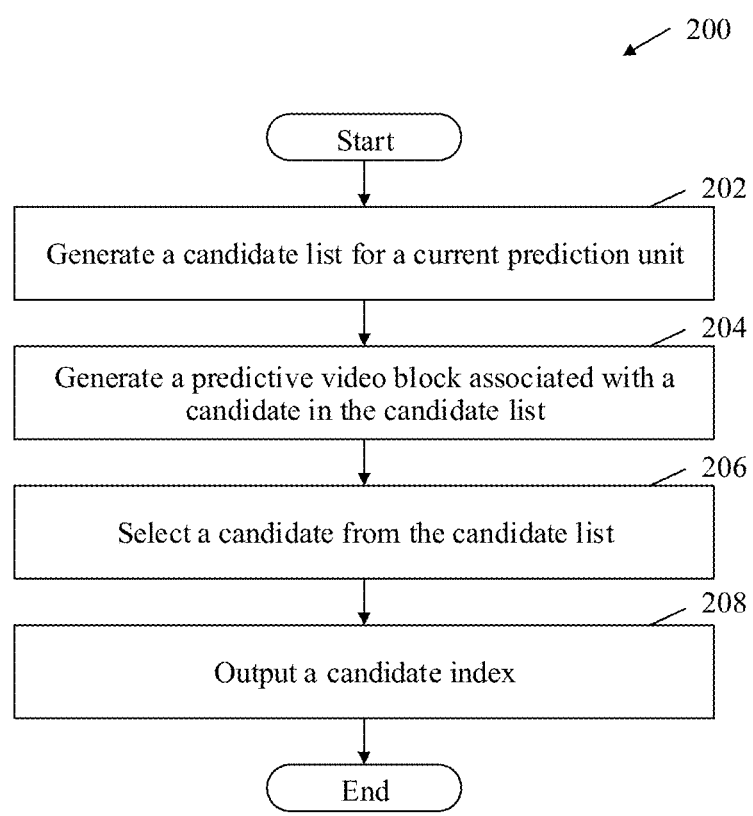
FIG. 5 is a flowchart of example implementation of a merge prediction mode.

After generating the candidate predictive motion vector list, the inter prediction module 121 may select one candidate predictive motion vector from the candidate predictive motion vector list. Then, the inter prediction module 121 may generate, based on the reference block indicated by the motion information for the PU, a prediction picture block for the PU. In the merge mode, the motion information for the PU may be the same as motion information indicated by the selected candidate predictive motion vector. FIG. 5 described below is a flowchart of an example of the merge mode.

After generating, based on the IME and the FME, the prediction picture block for the PU and generating, based on the merge operation, the prediction picture block for the PU, the inter prediction module 121 may select the prediction picture block generated by performing the FME operation or the prediction picture block generated by performing the merge operation. In some feasible implementations, the inter prediction module 121 may select, based on bit rate-distortion cost analysis for the prediction picture block generated by performing the FME operation and the prediction picture block generated by performing the merge operation, the prediction picture block for the PU.

After the inter prediction module 121 has selected the prediction picture block for the PU generated by partitioning the current CU in each of partitioning patterns (in some implementations, after a coding tree unit CTU is partitioned into CUs, the CU is not further partitioned into smaller PUs, and in this case, the PU is equivalent to the CU), the inter prediction module 121 may select a partitioning pattern for the current CU. In some implementations, the inter prediction module 121 may select, based on bit rate-distortion cost analysis for the selected prediction picture block for the PU generated by partitioning the current CU in each of the partitioning patterns, a partition pattern for the current CU. The inter prediction module 121 may output, to a residual generation module 102, a prediction picture block associated with a PU that belongs to the selected partition pattern. The inter prediction module 121 may output, to an entropy coding module 116, a syntax element of motion information for the PU that belongs to the selected partition pattern.

In the schematic diagram of FIG. 4, the inter prediction module 121 includes IME modules 180A to 180N (collectively referred to as "IME module 180"), FME modules 182A to 182N (collectively referred to as "FME module 182"), merge modules 184A to 184N (collectively referred to as "merge module 184"), PU pattern decision modules 186A to 186N (collectively referred to as "PU pattern decision module 186"), and a CU pattern decision module 188 (where the CU pattern decision module 188 may be configured to perform a pattern decision process of dividing a CTU into CUs).

The IME module 180, the FME module 182, and the merge module 184 may respectively perform an IME operation, an FME operation, and a merge operation on the PU of the current CU. It is described in the schematic diagram of FIG. 4 that the inter prediction module 121 includes a separate IME module 180, a separate FME module 182, and a separate merge module 184 for each PU in each partition pattern of the CU. In other feasible implementations, the inter prediction module 121 does not include a separate IME module 180, a separate FME module 182, and a separate merge module 184 for each PU in each partition pattern of the CU.

As illustrated in the schematic diagram of FIG. 4, the IME module 180A, the FME module 182A, and the merge module 184A may respectively perform an IME operation, an FME operation, and a merge operation on a PU generated by partitioning a CU in a 2N×2N partition pattern. The PU pattern decision module 186A may select one of prediction picture blocks generated by the IME module 180A, the FME module 182A, and the merge module 184A.

The IME module 180B, the FME module 182B, and the merge module 184B may respectively perform an IME operation, an FME operation, and a merge operation on a left PU generated by partitioning a CU in an N×2N partition pattern. The PU pattern decision module 186B may select one of prediction picture blocks generated by the IME module 180B, the FME module 182B, and the merge module 184B.

The IME module 180C, the FME module 182C, and the merge module 184C may respectively perform an IME operation, an FME operation, and a merge operation on a right PU generated by partitioning a CU in an N×2N partition pattern. The PU pattern decision module 186C may select one of prediction picture blocks generated by the IME module 180C, the FME module 182C, and the merge module 184C.

The IME module 180N, the FME module 182N, and the merge module 184 may respectively perform an IME operation, an FME operation, and a merge operation on a lower right PU generated by partitioning a CU in an N×N partition pattern. The PU pattern decision module 186N may select one of prediction picture blocks generated by the IME module 180N, the FME module 182N, and the merge module 184N.

The PU pattern decision module 186 may select a prediction picture block based on bit rate-distortion cost analysis for a plurality of possible prediction picture blocks and select a prediction picture block that provides a minimum bit rate-distortion cost in a given decoding scenario. For example, in an application with limited bandwidth, the PU pattern decision module 186 may prefer to select a prediction picture block for which a compression ratio is increased, and in another application, the PU pattern decision module 186 may prefer to select a prediction picture block for which quality of a reconstructed video is increased. After the PU pattern decision module 186 selects the prediction picture block for the PU of the current CU, the CU pattern decision module 188 selects a partition pattern for the current CU and outputs the prediction picture block and motion information for the PU in the selected partition pattern.

FIG. 5 is a flowchart of an example of a merge mode according to an embodiment of this application. A video encoder (for example, the video encoder 20) may perform a merge operation 200. In another feasible implementation, the video encoder may perform a merge operation different from the merge operation 200. For example, in another feasible implementation, the video encoder may perform a merge operation, and the video encoder performs steps more or fewer than steps of the merge operation 200 or steps different from the steps of the merge operation 200. In another feasible implementation, the video encoder may perform the steps of the merge operation 200 in different orders or in parallel. The encoder may further perform the merge operation 200 on a PU encoded in a skip (skip) mode.

After the video encoder starts the merge operation 200, the video encoder may generate a candidate predictive motion vector list for a current PU (202). The video encoder may generate the candidate predictive motion vector list for the current PU in various manners. For example, the video encoder may generate the candidate predictive motion vector list for the current PU according to one of example technologies described below in FIG. 8 to FIG. 12.

As described above, the candidate predictive motion vector list for the current PU may include a temporal candidate predictive motion vector. The temporal candidate predictive motion vector may indicate motion information for a temporal co-located (co-located) PU. The co-located PU may be spatially located at a same position as the current PU in a picture frame in a reference picture instead of a current picture. In this application, the reference picture that includes the temporal co-located PU may be referred to as a related reference picture. In this application, a reference picture index of the related reference picture may be referred to as a related reference picture index. As described above, the current picture may be associated with one or more reference picture lists (for example, a list 0 and a list 1). The reference picture index may indicate the reference picture by indicating a position of the reference picture in a reference picture list. In some feasible implementations, the current picture may be associated with a combined reference picture list.

In some video encoders, the related reference picture index is a reference picture index, of a PU, that covers a reference index source position associated with the current PU. In these video encoders, the reference index source position associated with the current PU is adjacent to the left of the current PU or adjacent to the top of the current PU. In this application, if a picture block associated with the PU includes a specified position, the PU may "cover" the specified position. These video encoders may use a reference picture index 0 if the reference index source position is unavailable.

However, there may be the following example: The reference index source position associated with the current PU is within a current CU. In these examples, if the PU is at the top or on the left of the current CU, it may be considered that a PU that covers the reference index source position associated with the current PU is available. However, the video encoder may need to access motion information for another PU of the current CU to determine the reference picture including the co-located PU. Therefore, these video encoders may use motion information (for example, a reference picture index) for a PU belonging to the current CU to generate a temporal candidate predictive motion vector for the current PU. In other words, these video encoders may use the motion information for the PU belonging to the current CU to generate the temporal candidate predictive motion vector. Therefore, the video encoder may be incapable of generating, in parallel, candidate predictive motion vector lists for the current PU and the PU that covers the reference index source position associated with the current PU.

According to the technologies in this application, the video encoder may explicitly set the related reference picture index without referring to a reference picture index of any other PU. In this way, the video encoder can generate, in parallel, candidate predictive motion vector lists for the current PU and another PU of the current CU. Because the video encoder explicitly sets the related reference picture index, the related reference picture index is not based on motion information for any other PU of the current CU. In some feasible implementations in which the video encoder explicitly sets the related reference picture index, the video encoder may always set the related reference picture index to a fixed predefined preset reference picture index (for example, 0). In this way, the video encoder may generate a temporal candidate predictive motion vector based on motion information for a co-located PU in a reference frame indicated by the preset reference picture index, where the temporal candidate predictive motion vector may be included in a candidate predictive motion vector list of the current CU.

In a feasible implementation in which the video encoder explicitly sets the related reference picture index, the video encoder may explicitly signal the related reference picture index in a syntax structure (for example, a picture header, a slice header, an APS, or another syntax structure). In this feasible implementation, the video encoder may signal, to a decoder side, a related reference picture index for each LCU (namely, a CTU), a CU, a PU, a TU, or another type of sub-block. For example, the video encoder may signal that the related reference picture index for each PU of the CU is equal to "1".

In some feasible implementations, the related reference picture index may be set implicitly rather than explicitly. In these feasible implementations, the video encoder may generate, by using motion information for a PU in a reference picture indicated by a reference picture index of a PU that covers positions outside the current CU, each temporal candidate predictive motion vector in the candidate predictive motion vector list for the PU of the current CU, even if these positions are not strictly adjacent to the current PU.

After generating the candidate predictive motion vector list for the current PU, the video encoder may generate a prediction picture block associated with a candidate predictive motion vector in the candidate predictive motion vector list (204). The video encoder may determine motion information for the current PU based on motion information of the indicated candidate predictive motion vector and then generate a prediction picture block based on one or more reference blocks indicated by the motion information for the current PU, to generate the prediction picture block associated with the candidate predictive motion vector. The video encoder may then select one candidate predictive motion vector from the candidate predictive motion vector list (206). The video encoder may select the candidate predictive motion vector in various manners. For example, the video encoder may select one candidate predictive motion vector based on bit rate-distortion cost analysis for each of prediction picture blocks associated with candidate predictive motion vectors.

After selecting the candidate predictive motion vector, the video encoder may output a candidate predictive motion vector index (208). The candidate predictive motion vector index may indicate a position of the selected candidate predictive motion vector in the candidate predictive motion vector list. In some feasible implementations, the candidate predictive motion vector index may be represented as "merge_idx".

Figure 6:
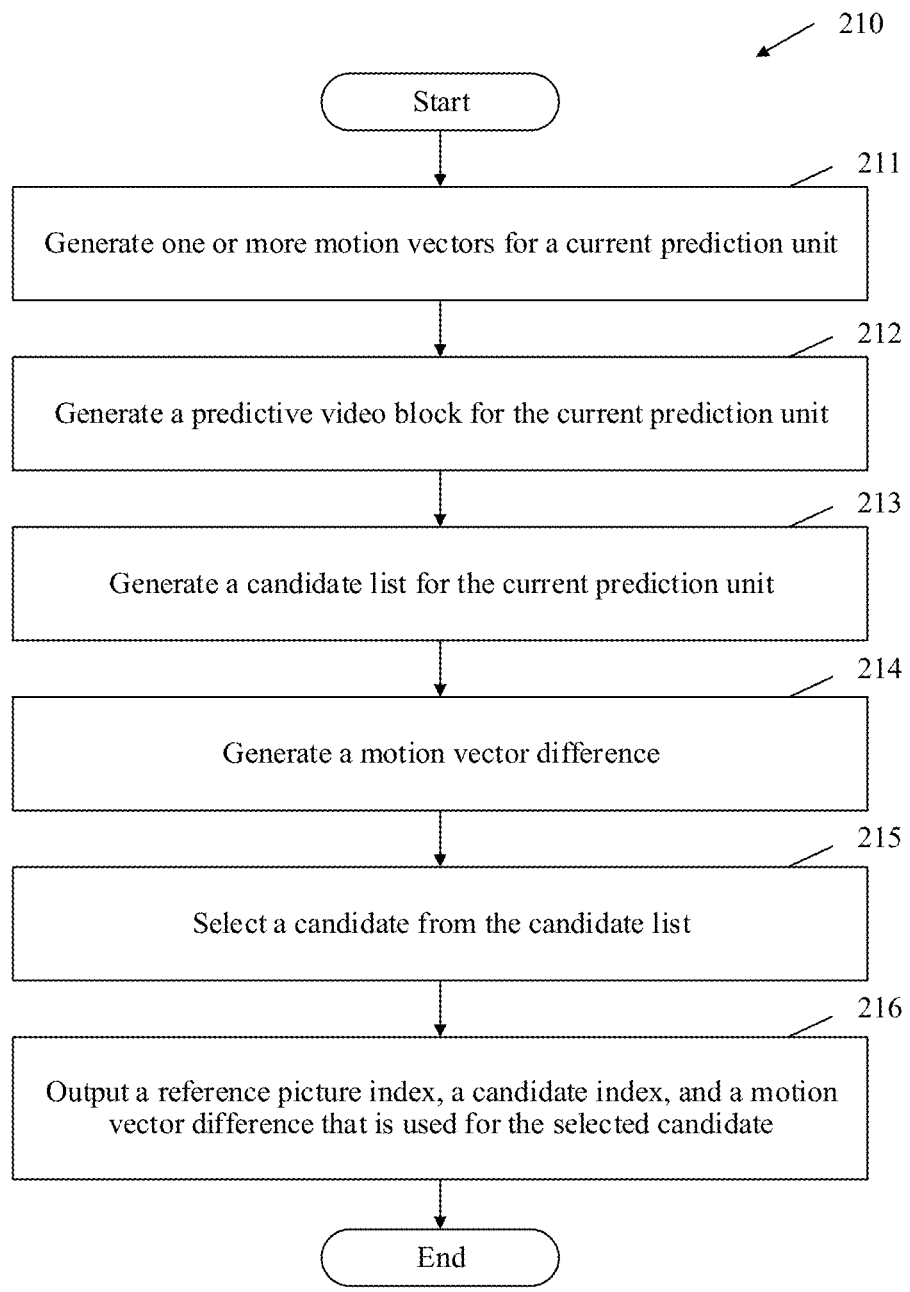
FIG. 6 is a flowchart of example implementation of an advanced motion vector prediction mode.

FIG. 6 is a flowchart of an example of an advanced motion vector prediction (AMVP) mode according to an embodiment of this application. A video encoder (for example, the video encoder 20) may perform an AMVP operation 210.

After the video encoder starts the AMVP operation 210, the video encoder may generate one or more motion vectors for a current PU (211). The video encoder may perform integer motion estimation and fraction motion estimation, to generate the motion vector for the current PU. As described above, a current picture may be associated with two reference picture lists (for example, a list 0 and a list 1). If unidirectional prediction is performed on the current PU, the video encoder may generate a list-0 motion vector or a list-1 motion vector for the current PU. The list-0 motion vector may indicate spatial displacement between a picture block of the current PU and a reference block in a reference picture in the list 0. The list-1 motion vector may indicate spatial displacement between a picture block of the current PU and a reference block in a reference picture in the list 1. If bidirectional prediction is performed on the current PU, the video encoder may generate a list-0 motion vector and a list-1 motion vector for the current PU.

After generating the one or more motion vectors for the current PU, the video encoder may generate a prediction picture block for the current PU (212). The video encoder may generate, based on one or more reference blocks indicated by the one or more motion vectors for the current PU, the prediction picture block for the current PU.

In addition, the video encoder may generate a candidate predictive motion vector list for the current PU (213). A video decoder may generate a candidate predictive motion vector list for the current PU in various manners. For example, the video encoder may generate the candidate predictive motion vector list for the current PU according to one or more of feasible implementations described below in FIG. 8 to FIG. 12. In some feasible implementations, when the video encoder generates the candidate predictive motion vector list in the AMVP operation 210, the candidate predictive motion vector list may include two candidate predictive motion vectors. In contrast, when the video encoder generates the candidate predictive motion vector list in a merge operation, the candidate predictive motion vector list may include more candidate predictive motion vectors (for example, five candidate predictive motion vectors).

After generating the candidate predictive motion vector list for the current PU, the video encoder may generate one or more motion vector differences (MVD) for each candidate predictive motion vector in the candidate predictive motion vector list (214). The video encoder may determine a difference between a motion vector indicated by the candidate predictive motion vector and a corresponding motion vector for the current PU, to generate a motion vector difference for the candidate predictive motion vector.

If unidirectional prediction is performed on the current PU, the video encoder may generate a single MVD for each candidate predictive motion vector. If bidirectional prediction is performed on the current PU, the video encoder may generate two MVDs for each candidate predictive motion vector. A first MVD may indicate a difference between a motion vector indicated by the candidate predictive motion vector and a list-0 motion vector for the current PU. A second MVD may indicate a difference between the motion vector indicated by the candidate predictive motion vector and a list-1 motion vector for the current PU.

The video encoder may select one or more candidate predictive motion vectors from the candidate predictive motion vector list (215). The video encoder may select the one or more candidate predictive motion vectors in various manners. For example, the video encoder may select a candidate predictive motion vector of an associated motion vector that matches a to-be-encoded motion vector with a minimum error, and this can reduce a quantity of bits required for representing a motion vector difference for the candidate predictive motion vector.

After selecting the one or more candidate predictive motion vectors, the video encoder may output one or more reference picture indexes for the current PU, one or more candidate predictive motion vector indexes for the current PU, and one or more motion vector differences for the one or more selected candidate predictive motion vectors (216).

In an example in which the current picture is associated with the two reference picture lists (the list 0 and the list 1) and unidirectional prediction is performed on the current PU, the video encoder may output a reference picture index ("ref_idx_l0") for the list 0 or a reference picture index ("ref_idx_l1") for the list 1. The video encoder may further output a candidate predictive motion vector index ("mvp_l0_flag") indicating a position of the selected candidate predictive motion vector for the list-0 motion vector for the current PU in the candidate predictive motion vector list. The video encoder may alternatively output a candidate predictive motion vector index ("mvp_l1_flag") indicating a position of the selected candidate predictive motion vector for the list-1 motion vector for the current PU in the candidate predictive motion vector list. The video encoder may further output an MVD for the list-0 motion vector or the list-1 motion vector for the current PU.

In an example in which the current picture is associated with the two reference picture lists (the list 0 and the list 1) and bidirectional prediction is performed on the current PU, the video encoder may output a reference picture index ("ref_idx_l0") for the list 0 and a reference picture index ("ref_idx_l1") for the list 1. The video encoder may further output a candidate predictive motion vector index ("mvp_l0_flag") indicating a position of the selected candidate predictive motion vector for the list-0 motion vector for the current PU in the candidate predictive motion vector list. In addition, the video encoder may output a candidate predictive motion vector index ("mvp_l1_flag") indicating a position of the selected candidate predictive motion vector of the list-1 motion vector for the current PU in the candidate predictive motion vector list. The video encoder may further output an MVD for the list-0 motion vector for the current PU and an MVD for the list-1 motion vector for the current PU.

Figure 7:
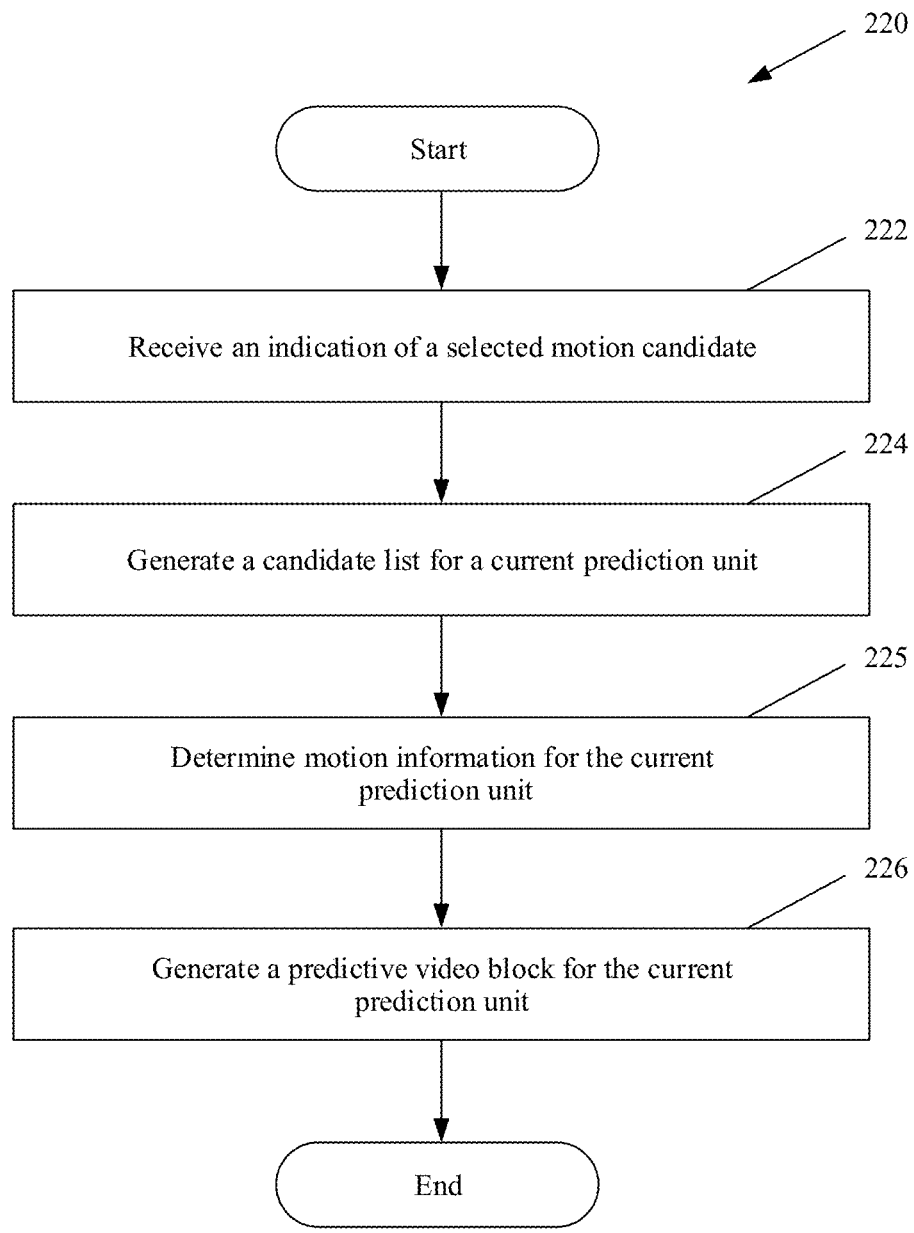
FIG. 7 is a flowchart of example implementation of motion compensation by a video decoder that may be configured for use in an embodiment of this application.

FIG. 7 is a flowchart of an example of motion compensation performed by a video decoder (for example, the video decoder 30) according to an embodiment of this application.

When the video decoder performs a motion compensation operation 220, the video decoder may receive an indication of a selected candidate predictive motion vector for a current PU (222). For example, the video decoder may receive a candidate predictive motion vector index indicating a position of the selected candidate predictive motion vector in a candidate predictive motion vector list for the current PU.

If motion information for the current PU is encoded in an AMVP mode and bidirectional prediction is performed on the current PU, the video decoder may receive a first candidate predictive motion vector index and a second candidate predictive motion vector index. The first candidate predictive motion vector index indicates a position of a selected candidate predictive motion vector of a list-0 motion vector for the current PU in the candidate predictive motion vector list. The second candidate predictive motion vector index indicates a position of a selected candidate predictive motion vector of a list-1 motion vector for the current PU in the candidate predictive motion vector list. In some feasible implementations, a single syntax element may be used to identify the two candidate predictive motion vector indexes.

In addition, the video decoder may generate the candidate predictive motion vector list for the current PU (224). The video decoder may generate the candidate predictive motion vector list for the current PU in various manners. For example, the video decoder may generate the candidate predictive motion vector list for the current PU according to technologies described below in FIG. 8 to FIG. 12. When the video decoder generates a temporal candidate predictive motion vector for the candidate predictive motion vector list, the video decoder may explicitly or implicitly set a reference picture index identifying a reference picture including a co-located PU, as described above in FIG. 5.

After generating the candidate predictive motion vector list for the current PU, the video decoder may determine the motion information for the PU based on motion information indicated by one or more selected candidate predictive motion vectors in the candidate predictive motion vector list for the current PU (225). For example, if the motion information for the current PU is encoded in a merge mode, the motion information for the current PU may be the same as the motion information indicated by the selected candidate predictive motion vector. If the motion information for the current PU is encoded in the AMVP mode, the video decoder may reconstruct one or more motion vectors of the current PU by using one or more motion vectors indicated by the selected candidate predictive motion vector and one or more MVDs indicated in a bitstream. A reference picture index and a prediction direction identifier of the current PU may be the same as a reference picture index and a prediction direction identifier of the one or more selected candidate predictive motion vectors. After determining the motion information for the current PU, the video decoder may generate, based on one or more reference blocks indicated by the motion information for the current PU, a prediction picture block for the current PU (226).

Figure 8:
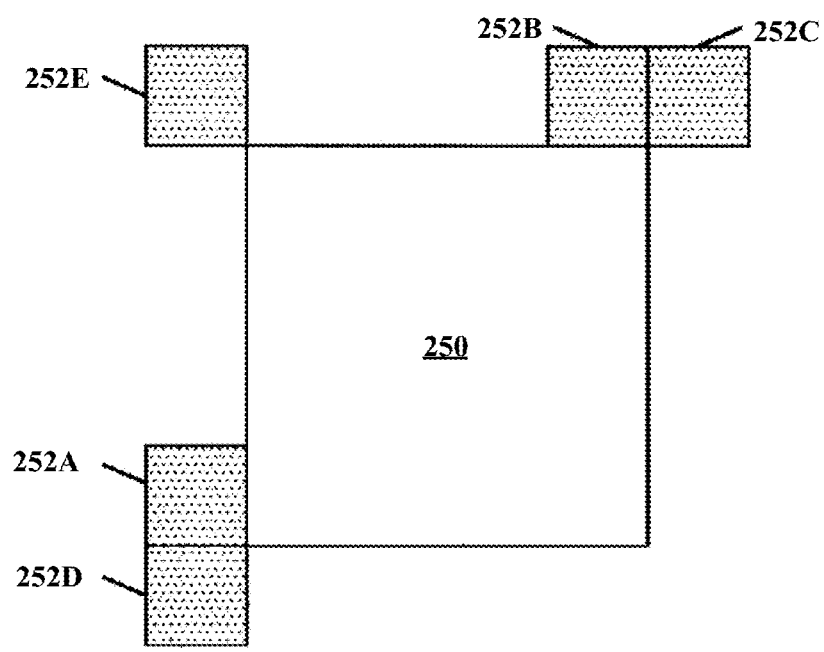
FIG. 8 is a schematic diagram of an example of a coding unit and adjacent picture blocks associated with the coding unit.

FIG. 8 is a schematic diagram of an example of a coding unit (CU) and adjacent picture blocks associated with the coding unit according to an embodiment of this application and is a schematic diagram for illustrating a CU 250 and candidate predictive motion vector positions 252A to 252E associated with the CU 250. In this application, the candidate predictive motion vector positions 252A to 252E may be collectively referred to as a candidate predictive motion vector position 252. The candidate predictive motion vector position 252 represents a spatial candidate predictive motion vector in a same picture as the CU 250. The candidate predictive motion vector position 252A is located on the left of the CU 250. The candidate predictive motion vector position 252B is located above the CU 250. The candidate predictive motion vector position 252C is located on the upper right of the CU 250. The candidate predictive motion vector position 252D is located on the lower left of the CU 250. The candidate predictive motion vector position 252E is located on the upper left of the CU 250. FIG. 8 shows an illustrative implementation providing a manner in which the inter prediction module 121 and the motion compensation module 162 may generate a candidate predictive motion vector list. The following explains the implementation based on the inter prediction module 121, but it should be understood that the motion compensation module 162 may implement a same technology and therefore, generate the same candidate predictive motion vector list.

Figure 9:
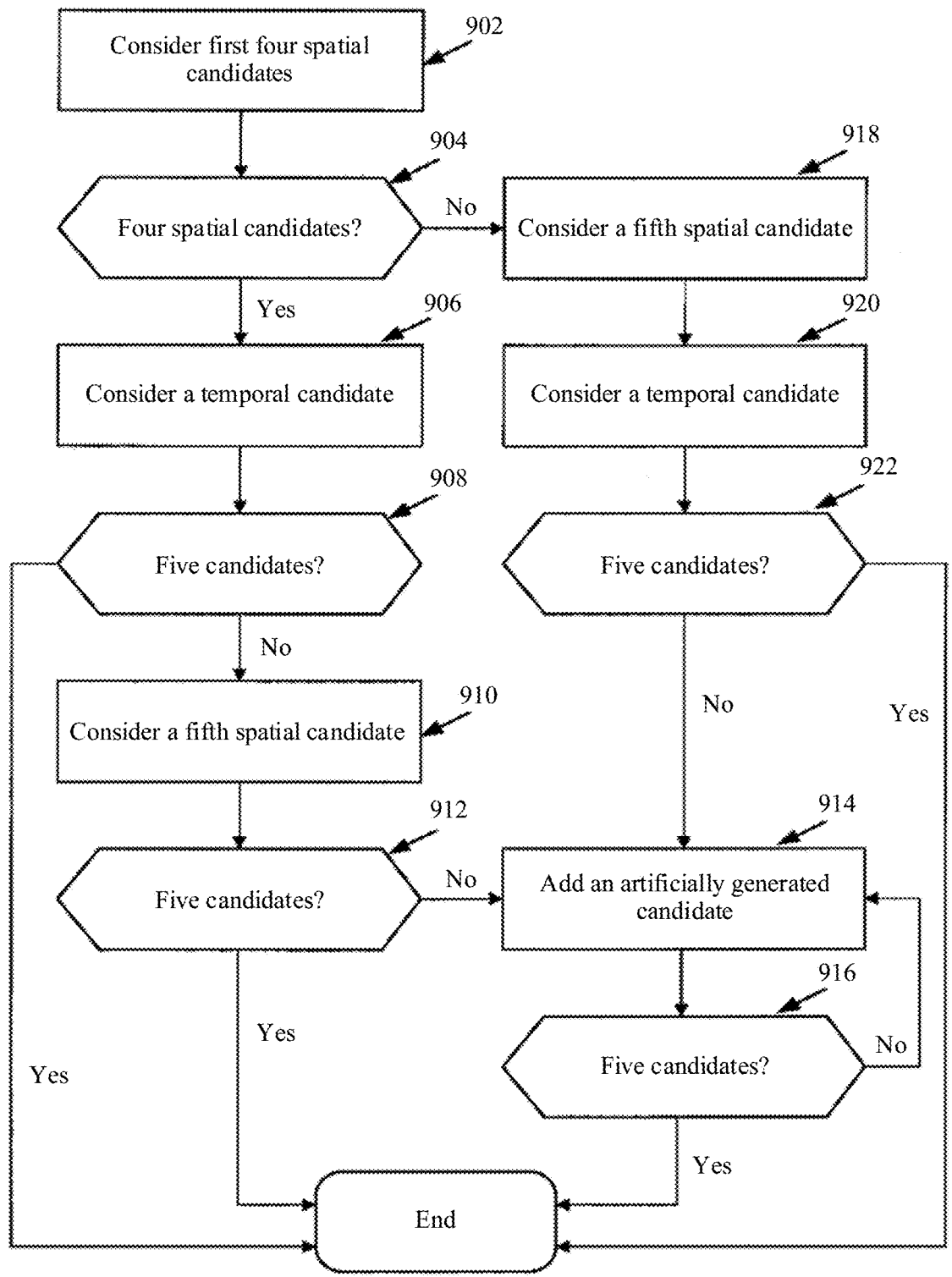
FIG. 9 is a flowchart of example implementation of constructing a candidate predictive motion vector list.

FIG. 9 is a flowchart of an example of constructing a candidate predictive motion vector list according to an embodiment of this application. A technology in FIG. 9 is to be described based on a list including five candidate predictive motion vectors, but the technology described herein may alternatively be used with a list of another size. The five candidate predictive motion vectors each may have an index (for example, 0 to 4). The technology in FIG. 9 is to be described based on a general video decoder. The general video decoder may be, for example, a video encoder (for example, the video encoder 20) or a video decoder (for example, the video decoder 30).

To reconstruct the candidate predictive motion vector list according to the implementation of FIG. 9, the video decoder first considers four spatial candidate predictive motion vectors (902). The four spatial candidate predictive motion vectors may include candidate predictive motion vector positions 252A, 252B, 252 C, and 252D. The four spatial candidate predictive motion vectors correspond to motion information for four PUs that are located in a same picture as a current CU (for example, a CU 250). The video decoder may consider the four spatial candidate predictive motion vectors in the list in a specific order. For example, the candidate predictive motion vector position 252A may be first considered. If the candidate predictive motion vector position 252A is available, the candidate predictive motion vector position 252A may be assigned to the index 0. If the candidate predictive motion vector position 252A is unavailable, the video decoder may not add the candidate predictive motion vector position 252A to the candidate predictive motion vector list. A candidate predictive motion vector position may be unavailable for various reasons. For example, if a candidate predictive motion vector position is not located within a current picture, the candidate predictive motion vector position may be unavailable. In another feasible implementation, if a candidate predictive motion vector position is intra predicted, the candidate predictive motion vector position may be unavailable. In another feasible implementation, if a candidate predictive motion vector position is located in a slice different from a slice in which the current CU is located, the candidate predictive motion vector position may be unavailable.

After considering the candidate predictive motion vector position 252A, the video decoder may then consider the candidate predictive motion vector position 252B. If the candidate predictive motion vector position 252B is available and is different from the candidate predictive motion vector position 252A, the video decoder may add the candidate predictive motion vector position 252B to the candidate predictive motion vector list. In this specific context, the term "same" or "different" means that motion information associated with candidate predictive motion vector positions is the same or different from each other. Therefore, if two candidate predictive motion vector positions have same motion information, the two candidate predictive motion vector positions are considered to be the same; or if two candidate predictive motion vector positions have different motion information, the two candidate predictive motion vector positions are considered to be different from each other. If the candidate predictive motion vector position 252A is unavailable, the video decoder may assign the candidate predictive motion vector position 252B to the index 0. If the candidate predictive motion vector position 252A is available, the video decoder may assign the candidate predictive motion vector position 252 to the index 1. If the candidate predictive motion vector position 252B is unavailable or is the same as the candidate predictive motion vector position 252A, the video decoder skips adding the candidate predictive motion vector position 252B to the candidate predictive motion vector list.

Similarly, the video decoder considers the candidate predictive motion vector position 252C and adds the candidate predictive motion vector position 252C to the list. If the candidate predictive motion vector position 252C is available and is different from the candidate predictive motion vector positions 252B and 252A, the video decoder may assign the candidate predictive motion vector position 252C to a next available index. If the candidate predictive motion vector position 252C is unavailable or is the same as at least one of the candidate predictive motion vector positions 252A and 252B, the video decoder does not add the candidate predictive motion vector position 252C to the candidate predictive motion vector list. Next, the video decoder considers the candidate predictive motion vector position 252D. If the candidate predictive motion vector position 252D is available and is different from the candidate predictive motion vector positions 252A, 252B, and 252C, the video decoder may assign the candidate predictive motion vector position 252D to a next available index. If the candidate predictive motion vector position 252D is unavailable or is the same as at least one of the candidate predictive motion vector positions 252A, 252B, and 252C, the video decoder does not add the candidate predictive motion vector position 252D to the candidate predictive motion vector list. The foregoing implementations generally describe an example in which the candidate predictive motion vectors 252A to 252D are considered to be added to the candidate predictive motion vector list. However, in some implementations, all the candidate predictive motion vectors 252A to 252D may be first added to the candidate predictive motion vector list, and then a repeated candidate predictive motion vector is removed from the candidate predictive motion vector list.

After the video decoder considers the first four spatial candidate predictive motion vectors, the candidate predictive motion vector list may include four spatial candidate predictive motion vectors, or the list may include less than four spatial candidate predictive motion vectors. If the list includes the four spatial candidate predictive motion vectors (904, yes), the video decoder considers a temporal candidate predictive motion vector (906). The temporal candidate predictive motion vector may correspond to motion information of a co-located PU of a picture different from the current picture. If the temporal candidate predictive motion vector is available and is different from the first four spatial candidate predictive motion vectors, the video decoder assigns the temporal candidate predictive motion vector to the index 4. If the temporal candidate predictive motion vector is unavailable or is the same as one of the first four spatial candidate predictive motion vectors, the video decoder does not add the temporal candidate predictive motion vector to the candidate predictive motion vector list. Therefore, after the video decoder considers the temporal candidate predictive motion vector (906), the candidate predictive motion vector list may include five candidate predictive motion vectors (the first four spatial candidate predictive motion vectors considered in the block 902 and the temporal candidate predictive motion vector considered in the block 904) or may include four candidate predictive motion vectors (the first four spatial candidate predictive motion vectors considered in the block 902). If the candidate predictive motion vector list includes five candidate predictive motion vectors (908, yes), the video decoder completes constructing the list.

If the candidate predictive motion vector list includes four spatial candidate predictive motion vectors (908, no), the video decoder may consider a fifth spatial candidate predictive motion vector (910). The fifth spatial candidate predictive motion vector may (for example) correspond to a candidate predictive motion vector position 252E. If a candidate predictive motion vector in the position 252E is available and is different from the candidate predictive motion vectors in the positions 252A, 252B, 252C, and 252D, the video decoder may add the fifth spatial candidate predictive motion vector to the candidate predictive motion vector list, and assign the fifth spatial candidate predictive motion vector to the index 4. If the candidate predictive motion vector in the position 252E is unavailable or is the same as the candidate predictive motion vectors in the positions 252A, 252B, 252C, and 252D, the video decoder may not add the candidate predictive motion vector in the position 252 to the candidate predictive motion vector list. Therefore, after the fifth spatial candidate predictive motion vector is considered (910), the list may include five candidate predictive motion vectors (the first four spatial candidate predictive motion vectors considered in the block 902 and the fifth spatial candidate predictive motion vector considered in the block 910) or may include four candidate predictive motion vectors (the first four spatial candidate predictive motion vectors considered in the block 902).

If the candidate predictive motion vector list includes five candidate predictive motion vectors (912, yes), the video decoder completes generating the candidate predictive motion vector list. If the candidate predictive motion vector list includes four candidate predictive motion vectors (912, no), the video decoder adds an artificially generated candidate predictive motion vector (914) to the list until the list includes five candidate predictive motion vectors (916, yes).

If the list includes less than four spatial candidate predictive motion vectors (904, no) after the video decoder considers the first four spatial candidate predictive motion vectors, the video decoder may consider a fifth spatial candidate predictive motion vector (918). The fifth spatial candidate predictive motion vector may (for example) correspond to the candidate predictive motion vector position 252E. If the candidate predictive motion vector in the position 252E is available and is different from the candidate predictive motion vectors included in the candidate predictive motion vector list, the video decoder may add the fifth spatial candidate predictive motion vector to the candidate predictive motion vector list, and assign the fifth spatial candidate predictive motion vector to a next available index. If the candidate predictive motion vector in the position 252E is unavailable or is the same as one of the candidate predictive motion vectors included in the candidate predictive motion vector list, the video decoder may not add the candidate predictive motion vector in the position 252E to the candidate predictive motion vector list. The video decoder may then consider a temporal candidate predictive motion vector (920). If the temporal candidate predictive motion vector is available and is different from the candidate predictive motion vectors included in the candidate predictive motion vector list, the video decoder may add the temporal candidate predictive motion vector to the candidate predictive motion vector list, and assign the temporal candidate predictive motion vector to a next available index. If the temporal candidate predictive motion vector is unavailable or is the same as one of the candidate predictive motion vectors included in the candidate predictive motion vector list, the video decoder may not add the temporal candidate predictive motion vector to the candidate predictive motion vector list.

If the candidate predictive motion vector list includes five candidate predictive motion vectors (922, yes) after the fifth spatial candidate predictive motion vector (in the block 918) and the temporal candidate predictive motion vector (in the block 920) are considered, the video decoder completes generating the candidate predictive motion vector list. If the candidate predictive motion vector list includes less than five candidate predictive motion vectors (922, no), the video decoder adds the artificially generated candidate predictive motion vector to the list (914) until the list includes five candidate predictive motion vectors (916, yes).

According to the technologies in this application, an additional merge candidate predictive motion vector may be artificially generated after the spatial candidate predictive motion vector and the temporal candidate predictive motion vector, so that a size of a merge candidate predictive motion vector list is fixed to a specified quantity (for example, five in the feasible implementation of FIG. 9 above) of merge candidate predictive motion vectors. The additional merge candidate predictive motion vector may include examples of a merge candidate predictive motion vector (a candidate predictive motion vector 1) obtained through combined bidirectional prediction, a merge candidate predictive motion vector (a candidate predictive motion vector 2) obtained through scaled bidirectional prediction, and a zero-vector merge/AMVP candidate predictive motion vector (a candidate predictive motion vector 3).

Figure 10:
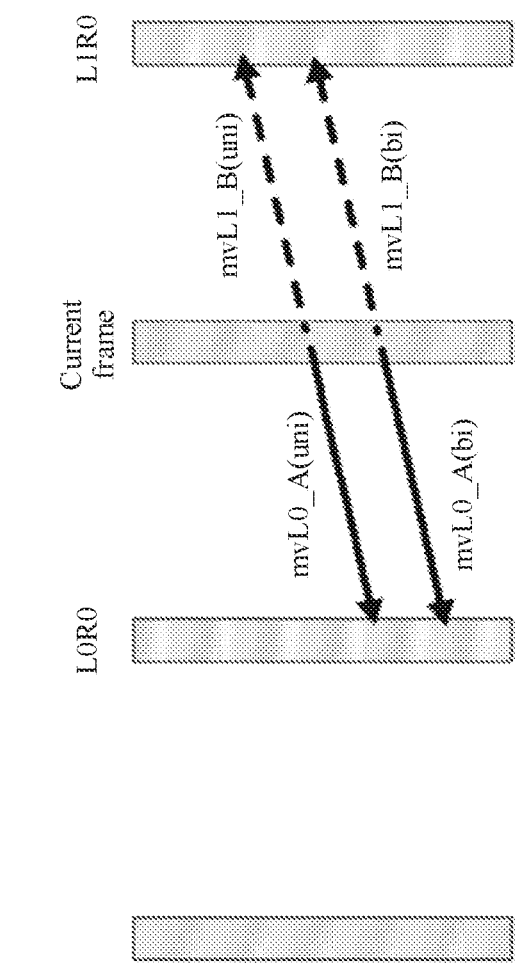
FIG. 10 is a schematic diagram of example implementation of adding a combined candidate motion vector to a merge candidate predictive motion vector list according to an embodiment of this application.

FIG. 10 is a schematic diagram of an example of adding a combined candidate motion vector to a merge candidate predictive motion vector list according to an embodiment of this application. A bidirectional predictive merge candidate predictive motion vector obtained through combination may be generated by combining original merge candidate predictive motion vectors. Two candidate predictive motion vectors (which have mvL0 and refIdxL0 or have mvL1 and refIdxL1) in the original candidate predictive motion vectors may be used to generate the bidirectional predictive merge candidate predictive motion vector. In FIG. 10, two candidate predictive motion vectors are included in an original merge candidate predictive motion vector list. A prediction type of one candidate predictive motion vector is list-0 unidirectional prediction, and a prediction type of the other candidate predictive motion vector is list-1 unidirectional prediction. In this feasible implementation, mvL0_A and ref0 are taken from a list 0, and mvL1_B and ref0 are taken from a list 1. Then, a bidirectional predictive merge candidate predictive motion vector (which has mvL0_A and ref0 in the list 0 and mvL1_B and ref0 in the list 1) may be generated, and whether the bidirectional predictive merge candidate predictive motion vector is different from a candidate predictive motion vector in the candidate predictive motion vector list is checked. If the bidirectional predictive merge candidate predictive motion vector is different from the candidate predictive motion vector, the video decoder may add the bidirectional predictive merge candidate predictive motion vector to the candidate predictive motion vector list.

Figure 11:
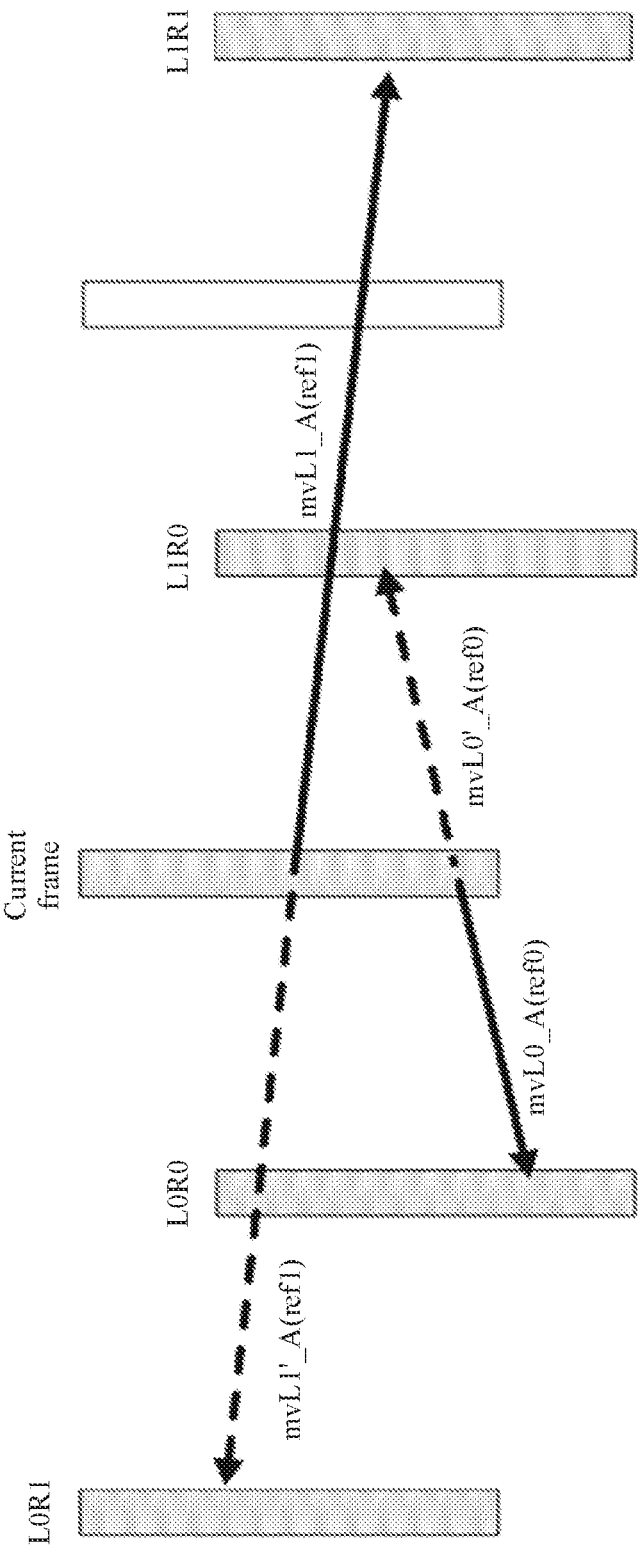
FIG. 11 is a schematic diagram of example implementation of adding a scaled candidate motion vector to a merge candidate predictive motion vector list according to an embodiment of this application.

FIG. 11 is a schematic diagram of an example of adding a scaled candidate motion vector to a merge candidate predictive motion vector list according to an embodiment of this application. A bidirectional predictive merge candidate predictive motion vector obtained through scaling may be generated by scaling original merge candidate predictive motion vectors. One candidate predictive motion vector (which may have mvLX and refIdxLX) in the original candidate predictive motion vectors may be used to generate the bidirectional predictive merge candidate predictive motion vector. In a feasible implementation of FIG. 11, two candidate predictive motion vectors are included in an original merge candidate predictive motion vector list. A prediction type of one candidate predictive motion vector is list-0 unidirectional prediction, and a prediction type of the other candidate predictive motion vector is list-1 unidirectional prediction. In this feasible implementation, mvL0_A and ref0 may be taken from a list 0, and ref0 may be copied to a reference index ref0' in a list 1. Then, mvL0' A may be calculated by scaling mvL0_A with ref0 and ref0'. The scaling may depend on a POC (Picture Order Count) distance. Then, a bidirectional predictive merge candidate predictive motion vector (which has mvL0_A and ref0 in the list 0 and mvL0' A and ref0' in the list 1) may be generated and whether the bidirectional predictive merge candidate predictive motion vector is repeated is checked. If the bidirectional predictive merge candidate predictive motion vector is not repeated, the bidirectional predictive merge candidate predictive motion vector may be added to the merge candidate predictive motion vector list.

Figure 12:
FIG. 12 is a schematic diagram of example implementation of adding a zero motion vector to a merge candidate predictive motion vector list according to an embodiment of this application.

FIG. 12 is a schematic diagram of an example of adding a zero motion vector to a merge candidate predictive motion vector list according to an embodiment of this application. A zero-vector merge candidate predictive motion vector may be generated by combining a zero vector and a reference index that can be referenced. If a zero-vector candidate predictive motion vector is not repeated, the zero-vector candidate predictive motion vector may be added to the merge candidate predictive motion vector list. For each generated merge candidate predictive motion vector, motion information may be compared with motion information of a previous candidate predictive motion vector in the list.

In a feasible implementation, if a newly generated candidate predictive motion vector is different from a candidate predictive motion vector included in the candidate predictive motion vector list, the generated candidate predictive motion vector is added to the merge candidate predictive motion vector list. A process of determining whether a candidate predictive motion vector is different from a candidate predictive motion vector included in the candidate predictive motion vector list is sometimes referred to as pruning (pruning). Each newly generated candidate predictive motion vector may be compared with an existing candidate predictive motion vector in the list through pruning. In some feasible implementations, a pruning operation may include: comparing one or more newly generated candidate predictive motion vectors with a candidate predictive motion vector in the candidate predictive motion vector list and skipping adding a newly generated candidate predictive motion vector that is the same as the candidate predictive motion vector in the candidate predictive motion vector list. In some other feasible implementations, the pruning operation may include: adding one or more newly generated candidate predictive motion vectors to the candidate predictive motion vector list and then removing a repeated candidate predictive motion vector from the list.

In a feasible implementation of this application, during inter prediction, a method for predicting motion information of a to-be-processed picture block includes: obtaining motion information of at least one determined motion vector picture block in a picture in which the to-be-processed picture block is located, where the at least one determined motion vector picture block includes a determined motion vector picture block that is not adjacent to the to-be-processed picture block; obtaining first identification information, where the first identification information is used to determine target motion information from the motion information of the at least one determined motion vector picture block; and predicting motion information of the to-be-processed picture block based on the target motion information.

Figure 13:
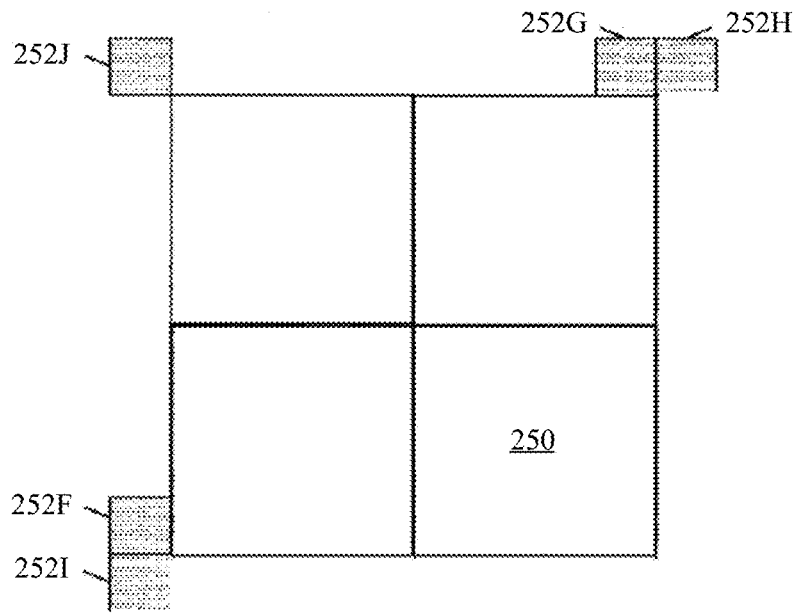
FIG. 13 is a schematic diagram of an example of another coding unit and adjacent picture blocks associated with the another coding unit.

In the foregoing feasible implementations in FIG. 5 to FIG. 7 and FIG. 9 to FIG. 12, in a spatial candidate prediction mode, for example, the five positions 252A to 252E shown in FIG. 8, namely, positions adjacent to the to-be-processed picture block are selected as candidates. Based on the foregoing feasible implementations in FIG. 5 to FIG. 7 and FIG. 9 to FIG. 12, in some feasible implementations, for example, in the spatial candidate prediction mode, a position that is within a preset distance away from the to-be-processed picture block but that is not adjacent to the to-be-processed picture block may further be included. For example, this type of positions may be shown by 252F to 252J in FIG. 13. It should be understood that FIG. 13 is a schematic diagram of an example of a coding unit and adjacent picture blocks associated with the coding unit according to an embodiment of this application. A position of a picture block that is located in a same picture frame as the to-be-processed picture block, that has been reconstructed when the to-be-processed picture block is processed, and that is not adjacent to the to-be-processed picture block falls within a scope of this type of positions.

It may be assumed that this type of positions are referred to as spatially non-adjacent picture blocks, and that a first spatially non-adjacent picture block, a second spatially non-adjacent picture block, and a third spatially non-adjacent picture block are available. For a physical meaning of "available", refer to the foregoing description. Details are not described again. In addition, it may be assumed that, when the spatial candidate prediction mode is selected from prediction modes of the positions shown in FIG. 8, a candidate prediction motion mode list is checked and constructed in the following sequence. It should be understood that the checking process includes the foregoing checking process for "availability" and the pruning process. Details are not described again. The candidate prediction mode list includes: a motion vector of a picture block in the position 252A, a motion vector of a picture block in the position 252B, a motion vector of a picture block in the position 252C, a motion vector of a picture block in the position 252D, a motion vector obtained by using an alternative temporal motion vector prediction (ATMVP) technology, a motion vector of a picture block in the position 252E, and a motion vector obtained by using a spatial-temporal motion vector prediction (STMVP) technology. The ATMVP technology and the STMVP technology are specified in detail in clauses 2.3.1.1 and 2.3.1.2 of JVET-G1001-v1, and JVET-G1001-v1 is incorporated herein in this specification. Details are not described. It should be understood that, for example, the candidate prediction mode list includes the foregoing seven predictive motion vectors. According to different specific implementations, there may be less than seven predictive motion vectors included in the candidate prediction mode list. For example, the first five predictive motion vectors are selected to constitute the candidate prediction mode list, and the motion vectors constructed in the feasible implementations in FIG. 10 to FIG. 12 described above may further be added to the candidate prediction mode list, so that the candidate prediction mode list includes more predictive motion vectors. In a feasible implementation, the first spatially non-adjacent picture block, the second spatially non-adjacent picture block, and the third spatially non-adjacent picture block may be added to the candidate prediction mode list, and are used as predictive motion vectors of the to-be-processed picture block. Further, it may be assumed that the motion vector of the picture block in the position 252A, the motion vector of the picture block in the position 252B, the motion vector of the picture block in the position 252C, the motion vector of the picture block in the position 252D, the motion vector obtained by using the ATMVP technology, the motion vector of the picture block in the position 252E, and the motion vector obtained by using the STMVP technology are respectively MVL, MVU, MVUR, MVDL, MVA, MVUL, and MVS. It is assumed that motion vectors of the first spatially non-adjacent picture block, the second spatially non-adjacent picture block, and the third spatially non-adjacent picture block are respectively MV0, MV1, and MV2, and a candidate predictive motion vector list may be checked and constructed in the following sequence.

Example 1: MVL, MVU, MVUR, MVDL, MV0, MV1, MV2, MVA, MVUL, and MVS.

Example 2: MVL, MVU, MVUR, MVDL, MVA, MV0, MV1, MV2, MVUL, and MVS.

Example 3: MVL, MVU, MVUR, MVDL, MVA, MVUL, MV0, MV1, MV2, and MVS.

Example 4: MVL, MVU, MVUR, MVDL, MVA, MVUL, MVS, MV0, MV1, and MV2.

Example 5: MVL, MVU, MVUR, MVDL, MVA, MV0, MVUL, MV1, MVS, and MV2.

Example 6: MVL, MVU, MVUR, MVDL, MVA, MV0, MVUL, MV1, MV2, and MVS.

Example 7: MVL, MVU, MVUR, MVDL, MVA, MVUL, MV0, MV1, MV2, and MVS.

It should be understood that the candidate predictive motion vector list may be used in the merge mode or the AMVP mode described above or in another prediction mode for obtaining a predictive motion vector of a to-be-processed picture block, and may be used for an encoder side or may be used for a decoder side corresponding to the encoder side. This is not limited. In addition, a quantity of candidate predictive motion vectors in the candidate predictive motion vector list is also preset, and the quantity on the encoder side and the quantity on the decoder side are consistent. A specific quantity is not limited.

It should be understood that, Example 1 to Example 7 provide several feasible combinations in the candidate predictive motion vector list. Based on a motion vector of a spatially non-adjacent picture block, there may be another combination of the candidate predictive motion vector list and another arrangement of candidate predictive motion vectors in the list. This is not limited.

An embodiment of this application provides another method for constructing a candidate predictive motion vector list. In comparison with the method for constructing a candidate predictive motion vector list in Example 1 to Example 7, in this embodiment, a new candidate predictive motion vector is generated based on a candidate predictive motion vector determined in another embodiment and a preset vector difference. This overcomes a disadvantage that a predictive motion vector has low prediction precision, and improves coding efficiency.

Figure 14:
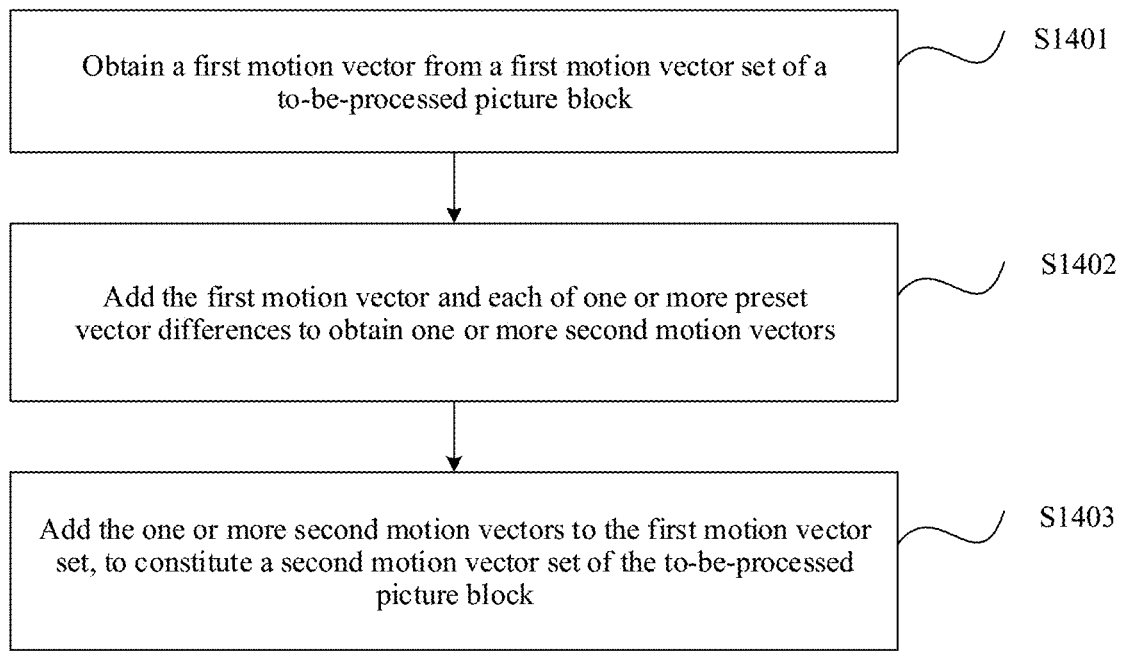
FIG. 14 is a flowchart of an example of a method for constructing a candidate motion vector set.

FIG. 14 is a schematic flowchart of a method for constructing a candidate motion vector set according to an embodiment of this application. It should be understood that this embodiment of this application is not limited to be used for processing a predictive motion vector, this embodiment of this application can also be used for constructing a motion vector set with another attribute. In addition, a plurality of candidate motion vectors (or predictive motion vectors) are not limited to existing in a list form, and may be used for a combination, a set, or a subset of a set of other motion vectors.

S1401: Obtain a first motion vector from a first motion vector set of a to-be-processed picture block.

The first motion vector in this step may be from a spatial-domain correlation block and/or a temporal-domain correlation block of the to-be-processed picture block. Further, the first motion vector may be a motion vector obtained based on a motion vector of a reference block having spatial-domain correlation with the to-be-processed picture block, a motion vector obtained based on a motion vector of a reference block having a temporal-domain correlation with the to-be-processed picture block, or a motion vector obtained based on a motion vector of a reference block having spatial-domain correlation with the corresponding block having temporal-domain correlation with the to-be-processed picture block.

For example, a candidate predictive motion vector list that is used in a merge prediction mode and that is specified in the HEVC standard, a candidate predictive motion vector list used in an AMVP prediction mode, and a candidate predictive motion vector list used in technologies including ATMVP and STMVP all are feasible implementations of the first motion vector set. For a specific manner of constructing the first motion vector set, refer to FIG. 5, FIG. 6 and FIG. 9 to FIG. 13, and descriptions of related solution implementations. Details are not described again. Corresponding to the foregoing embodiments, the first motion vector may be a motion vector of a picture block that is spatially adjacent to the to-be-processed picture block or a motion vector that has a preset spatial-domain position relationship with the to-be-processed picture block; may be a motion vector of a picture block that is temporally adjacent to the to-be-processed picture block or a motion vector that has a preset temporal-domain position relationship with the to-be-processed picture block; may be a motion vector obtained through weighting calculation performed on another first motion vector or obtained through recombination; may be a zero motion vector; may be a block-level motion vector; or may be a sub-block-level motion vector (for a difference between a block level and a sub-block level, refer to descriptions in clause 2.3.1 in JVET-G1001-v1). This is not limited.

S1402: Add the first motion vector and each of one or more preset vector differences to obtain one or more second motion vectors.

The first motion vector is unequal to the second motion vector, that is, the preset vector difference is not 0.

There may be one or more preset vector differences, and the preset vector differences may have different sample precision, for example, one-eight sample precision, one-quarter sample precision, half sample precision, integer sample precision, or double sample precision. This is not limited.

Figure 15:
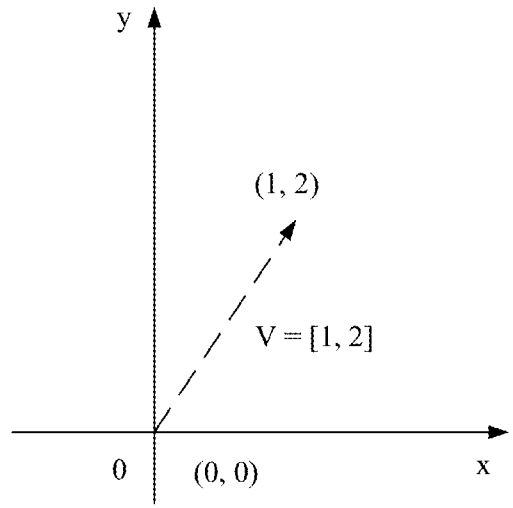
FIG. 15 is a schematic diagram of example representation of a motion vector in a two-dimensional rectangular coordinate system.

In an embodiment, the first motion vector is represented as [1, 2]. To be specific, as shown in FIG. 15, in a two-dimensional rectangular coordinate system, the first motion vector [1, 2] is a two-dimensional vector pointing from a point (0, 0) to a point (1, 2).

In an embodiment, the preset vector differences include [−1, 0], [1, 0], [0, −1], and [0, 1]. Correspondingly, the first motion vector and each of the one or more preset vector differences are added, to obtain one or more second motion vectors. The second motion vectors are [0, 2], [2, 2], [1, 1], and [1, 3].

In another embodiment, the preset vector differences include [−0.5, 0], [0.25, 0], [0, 0.5], and [0, 2]. Correspondingly, the first motion vector and each of the preset one or more vector differences are added, to obtain one or more second motion vectors. The second motion vectors are [0.5, 2], [1.25, 2], [1, 2.5], and [1, 4].

When the motion vector is a fractional sample motion vector, for example, [0.5, 2], generally, interpolation (interpolation) is first performed on a reference frame or a part of a reference frame region to perform fractional sample motion estimation and fractional sample motion compensation. The fractional sample motion estimation is described above, and details are not described again.

S1403: Add the one or more second motion vectors to the first motion vector set, to constitute a second motion vector set of the to-be-processed picture block.

It should be understood that, because both the second motion vector and the first motion vector are motion vectors in the second motion vector set, when the second motion vector is the same as the first motion vector, there are repeated motion vectors in the second motion vector set.

To avoid this case, in a feasible implementation, the preset vector difference is not 0, to ensure that a first motion vector used for generating a second motion vector is not the same as the generated second motion vector.

It should be further understood that, in some feasible implementations, a quantity of motion vectors that can be accommodated in the second motion vector set may be preset, and when the quantity of motion vectors reaches a threshold, another second motion vector is no longer added to the first motion vector set.

In another feasible implementation, the one or more second motion vectors include a third motion vector, and the adding the one or more second motion vectors to the first motion vector set includes: when the third motion vector is different from any motion vector in the first motion vector set, adding the third motion vector to the first motion vector set. In other words, for any generated second motion vector (which is denoted as the third motion vector in this implementation), before the first motion vector is added, it is first determined whether the generated second motion vector is the same as a motion vector in the first motion vector set, where motion vectors in the first motion vector set include the first motion vector, and also include the second motion vector that has been added to the first motion vector set. The third motion vector is added to the first motion vector set only when there is no motion vector that is the same as the third motion vector in the first motion vector set. A first motion vector set obtained through the foregoing processing is the second motion vector set.

In the embodiment corresponding to FIG. 14, it should be understood that the obtaining a first motion vector from a first motion vector set of a to-be-processed picture block includes: obtaining one first motion vector from the first motion vector set of the to-be-processed picture block; or includes: obtaining a plurality of first motion vectors from the first motion vector set of the to-be-processed picture block, and performing operations of S1402 and S1403 on each obtained first motion vector. Correspondingly, the second motion vector set may include a second motion vector generated based on the one first motion vector, or may include second motion vectors generated based on the plurality of first motion vectors. This is not limited.

Figure 16:
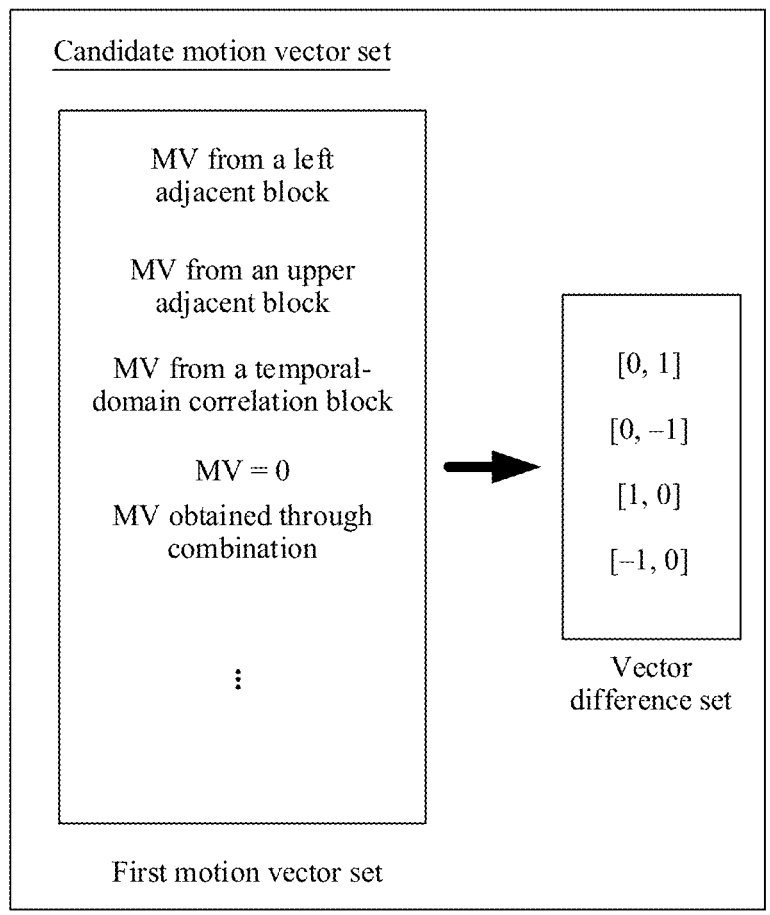
FIG. 16 is a schematic diagram of an example of a method for constructing a candidate motion vector set.

In another embodiment, as shown in FIG. 16, the candidate predictive motion vector list of the to-be-processed picture block includes two sublists: a first motion vector set and a vector difference set.

The first motion vector set and the first motion vector set in the embodiment corresponding to FIG. 14 have same elements. The vector difference set includes one or more preset vector differences.

In some feasible implementations, each vector difference in the vector difference set and an original target motion vector that is determined from the first motion vector set are added, and motion vectors obtained by adding each vector difference and the original target motion vector constitute a new motion vector set.

The first motion vector set and the vector difference set, and the foregoing new set generated based on the vector difference set are used together, to select a target motion vector. A specific using manner is described in detail in subsequent video encoding or video decoding embodiments. Details are not described herein.

There is a bidirectional prediction mode in inter prediction modes, and bidirectional prediction is prediction performed based on different reference frame lists. Bidirectional prediction is described in detail above, and details are not described again. It should be understood that the embodiment corresponding to FIG. 14 may also be implemented in the bidirectional prediction mode. Steps S1401 to S1403 may be applied to a process of obtaining a unidirectional prediction value based on each reference frame list in bidirectional prediction.

It is assumed that, when the method is used for bidirectional prediction, the first motion vector includes a first-directional first motion vector and a second-directional first motion vector, the second motion vector includes a first-directional second motion vector and a second-directional second motion vector, and the preset vector difference includes a first-directional preset vector difference and a second-directional preset vector difference. In some feasible implementations, both the first-directional preset vector difference and the second-directional preset vector difference are preset values. In some other feasible implementations, the first-directional preset vector difference is a preset value, and the second-directional preset vector difference is derived based on the first-directional preset vector difference and a preset derivation relationship; or the second-directional preset vector difference is a preset value, the first-directional preset vector difference is derived based on the second-directional preset vector difference and a preset derivation relationship.

Correspondingly, in a process of constructing the second motion vector set in the embodiment corresponding to FIG. 14, the first-directional first motion vector and the first-directional preset vector difference are added, to obtain the first-directional second motion vector; and the second-directional first motion vector and the second-directional preset vector difference are added, to obtain the second-directional second motion vector. For a manner of obtaining the first-directional second motion vector and the second-directional second motion vector, for example, refer to the processing manner in step S1402. Details are not described again.

It should be understood that, when first directional prediction (sometimes referred to as forward prediction) based on a reference frame list 0 (list0) and second directional prediction (sometimes referred to as backward prediction) based on a reference frame list 1 (list1) in bidirectional prediction satisfy a specific scenario, prediction efficiency can be improved by using the first-directional preset vector difference and the second-directional preset vector difference that have a specific relationship. The second-directional preset vector difference may be directly obtained based on the first-directional preset vector difference and the specific relationship corresponding to the scenario. This saves resources for obtaining the second-directional preset vector difference, saves identification information selected for identifying the second-directional preset vector difference, and improves coding efficiency.

It is assumed that, the first display offset vector is a vector pointing from a display position of a picture frame in which the to-be-processed picture block is located to a display position of a first reference frame; the second display offset vector is a vector pointing from the display position of the picture frame in which the to-be-processed picture block is located to a display position of a second reference frame; the first reference frame is a reference frame to which the first-directional first motion vector points; and the second reference frame is a reference frame to which the second-directional first motion vector points. The display position of the picture frame in which the to-be-processed picture block is located may be represented by a POC value of a current frame (CurrPOC), the display position of the first reference frame may be represented by a POC value of the first reference frame (Ref0POC), the display position of the second reference frame may be represented by a POC value of the second reference frame (Ref1POC), the first display offset vector is a one-dimensional vector (CurrPOC-Ref0POC), and the second display offset vector is a one-dimensional vector (CurrPOC-Ref1POC).

In a feasible implementation, when a vector sum of the first display offset vector and the second display offset vector is zero, a vector sum of the first-directional preset vector difference and the second-directional preset vector difference is zero. In other words, when the first display offset vector and the second display offset vector have a same magnitude but opposite directions, the first-directional preset vector difference and the second-directional preset vector difference have a same value but opposite directions. Further, when the first-directional preset vector difference is known, the direction of the first-directional vector difference is made to be opposite, to obtain the second-directional vector difference.

It should be understood that, in this embodiment of this application, a magnitude of a vector is an absolute value of a projection length of the vector on an X axis and an absolute value of a projection length of the vector on a Y axis in a two-dimensional rectangular coordinate system. Correspondingly, that two vectors have a same magnitude means that absolute values of projection lengths of two vectors on the X axis are equal and absolute values of projection lengths of two vectors on the Y axis are equal in the two-dimensional rectangular coordinate system. Correspondingly, that a proportional relationship between a magnitude of a vector A and a magnitude of a vector B is equal to a proportional relationship between a magnitude of a vector C and a magnitude of a vector D means that a ratio of an absolute value of a projection length of the vector A to an absolute value of a projection length of the vector B on the X axis in the two-dimensional rectangular coordinate system is equal to a ratio of an absolute value of a projection length of the vector C to an absolute value of a projection length of the vector D on the X axis in the two-dimensional rectangular coordinate system, and that a ratio of an absolute value of a projection length of the vector A to an absolute value of a projection length of the vector B on the Y axis in the two-dimensional rectangular coordinate system is equal to a ratio of an absolute value of a projection length of the vector C to an absolute value of a projection length of the vector D on the Y axis in the two-dimensional rectangular coordinate system.

In a feasible implementation, when a vector sum of the first display offset vector and the second display offset vector is zero, a vector sum of the first-directional preset vector difference and the second-directional preset vector difference is zero. In other words, when the first display offset vector and the second display offset vector have a same magnitude but opposite directions, the first-directional preset vector difference and the second-directional preset vector difference have a same value but opposite directions. Further, when the first-directional preset vector difference is known, the direction of the first-directional vector difference is made to be opposite, to obtain the second-directional vector difference.

In another feasible implementation, when the first display offset vector is the same as the second display offset vector, the first-directional preset vector difference is the same as the second-directional preset vector difference. In other words, when the first display offset vector and the second display offset vector have a same magnitude and a same direction, the first-directional preset vector difference and the second-directional preset vector difference have a same value and a same direction. Further, when the first-directional preset vector difference is known, the first-directional vector difference may be used as the second-directional vector difference.

In another feasible implementation, a ratio of a value of the first-directional preset vector difference to a value of the second-directional preset vector difference is equal to a ratio of a magnitude of the first display offset vector to a magnitude of the second display offset vector, that is, a ratio of the value of the first-directional preset vector difference to the value of the second-directional preset vector difference is equal to a ratio of the magnitude of the first display offset vector to the magnitude of the second display offset vector. Further, when the first-directional preset vector difference is known, the value of the second-directional preset vector difference may be obtained by multiplying the value of the first-directional preset vector difference by the magnitude of the second display offset vector and then dividing a product of the multiplication by the magnitude of the first display offset vector; or the first-directional preset vector difference and the second-directional preset vector difference have a same value.

In another feasible implementation, when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions. Further, when the first-directional preset vector difference is known, the direction of the second-directional preset vector difference may be obtained based on the direction of the first-directional preset vector difference. A direction relationship between the first-directional preset vector difference and the second-directional preset vector difference is the same as a direction relationship between the first display offset vector and the second display offset vector.

Figure 17:
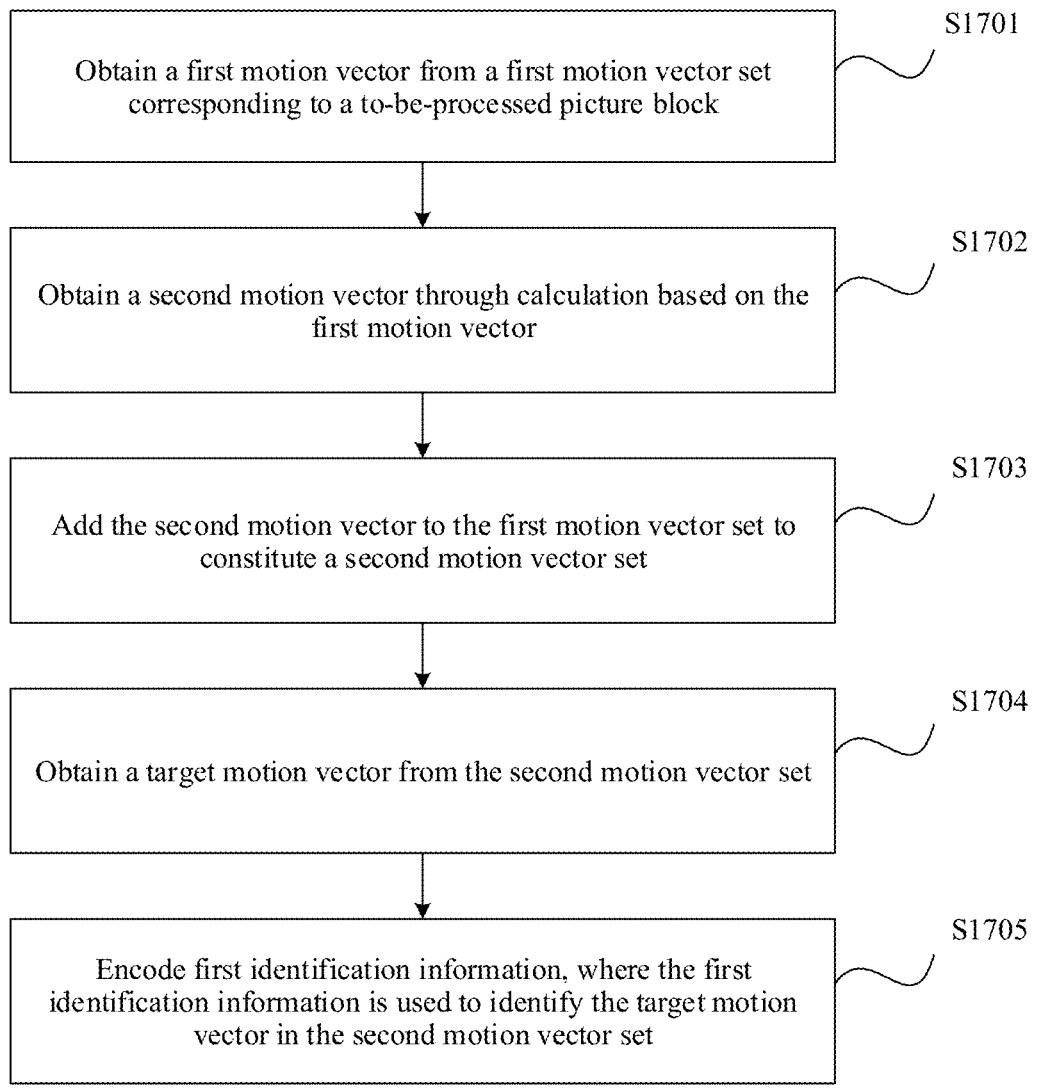
FIG. 17 is a schematic flowchart of applying a method for constructing a candidate motion vector set to video encoding according to an embodiment of this application.

For example, FIG. 17 is a flowchart of applying the method for constructing a candidate motion vector set to video encoding according to an embodiment of this application.

S1701: Obtain a first motion vector from a first motion vector set corresponding to a to-be-processed picture block.

In a feasible implementation, a motion vector in the first motion vector set includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

S1702: Obtain a second motion vector through calculation based on the first motion vector.

There is a preset vector difference between the first motion vector and the second motion vector, and the first motion vector and the second motion vector are different.

In a feasible implementation, the first motion vector and the preset vector difference may be added to obtain the second motion vector.

In a feasible implementation, when the method is used for bidirectional prediction, the first motion vector includes a first-directional first motion vector and a second-directional first motion vector, the second motion vector includes a first-directional second motion vector and a second-directional second motion vector, and the preset vector difference includes a first-directional preset vector difference and a second-directional preset vector difference; and correspondingly, that the first motion vector and the preset vector difference are added to obtain the second motion vector includes: the first-directional first motion vector and the first-directional preset vector difference are added to obtain the first-directional second motion vector, and the second-directional first motion vector and the second-directional preset vector difference are added to obtain the second-directional second motion vector.

Based on the foregoing implementations, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero; or when the first display offset vector and the second display offset vector are the same, the first-directional preset vector difference and the second-directional preset vector difference are the same.

Based on the foregoing implementations, a ratio of a value of the first-directional preset vector difference to a value of the second-directional preset vector difference is equal to a ratio of a magnitude of the first display offset vector to a magnitude of the second display offset vector, or the first-directional preset vector difference and the second-directional preset vector difference have a same value.

Based on the foregoing implementations, when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

In a feasible implementation, there are a plurality of vector differences different from each other; correspondingly, that the first motion vector and the preset vector difference are added to obtain the second motion vector includes: the first motion vector and each of the plurality of preset vector differences are added to obtain the plurality of second motion vectors; and correspondingly, that the second motion vector is added to the first motion vector set to constitute a second motion vector set includes: the plurality of obtained second motion vectors are added to the first motion vector set to constitute the second motion vector set.

S1703: Add the second motion vector to the first motion vector set to constitute the second motion vector set.

It should be understood that the foregoing steps S1701 to S1703 are a process of constructing the second motion vector set. For specific implementation details, refer to FIG. 14 and related implementations, for example, refer to steps S1401 to S1403. Details are not described again.

S1704: Obtain a target motion vector from the second motion vector set.

In a feasible implementation, a motion vector with a minimum coding cost is selected from the second motion vector set according to a rate-distortion criterion as the target motion vector.

The rate-distortion criterion means that a sample difference (also referred to as a distortion value) between a reconstructed block of the to-be-processed block and an original block of the to-be-processed block and a quantity of bits (also referred to as a bit rate) used for encoding the to-be-processed block are separately obtained, to obtain a coding cost of the to-be-processed block according to a formula $D+\lambda \times R$, where D represents the distortion value, $\lambda$ represents a preset constant, and R represents the bit rate.

For each motion vector in the second motion vector set obtained in the foregoing step, a coding cost value of each motion vector is calculated according to the rate-distortion criterion, and a motion vector with a minimum coding cost value is selected as the target motion vector.

It should be understood that, in addition to the rate-distortion criterion, a cost value of each second motion vector may alternatively be calculated according to another criterion. For example, a distortion value of a reconstructed block corresponding to each motion vector is used as a coding cost value; or a distortion value of a prediction block corresponding to each motion vector is used as a coding cost value; or a bit rate corresponding to each motion vector is used as a coding cost value; or Hadamard (Hadamard) transform is performed on a sample difference value corresponding to each motion vector, and a transform coefficient value obtained through transform is used as a coding cost value. This is not limited.

In some feasible implementations, identification information of the target motion vector is encoded on an encoder side, for decoding use. For example, refer to the following steps.

S1705: Encode first identification information, where the first identification information is used to identify the target motion vector in the second motion vector set. A codeword of the first identification information is generally related to a quantity of all motion vectors in the second motion vector set. Each motion vector in the second motion vector set corresponds to a unique codeword, for distinguishing from another motion vector. During decoding, a motion vector corresponding to the first identification information, that is, the target motion vector, may be uniquely determined by decoding an encoded codeword. A variable-length code or a fixed-length code may be used to encode the codeword of the first identification information. This is not limited.

It should be understood that, when the variable-length code is used to encode the first identification information, a motion vector with a high coding probability corresponds to a codeword with a low bit rate, so that coding efficiency can be improved. Therefore, in some feasible embodiments, a comparatively long codeword is used to encode the second motion vector.

Figure 18:
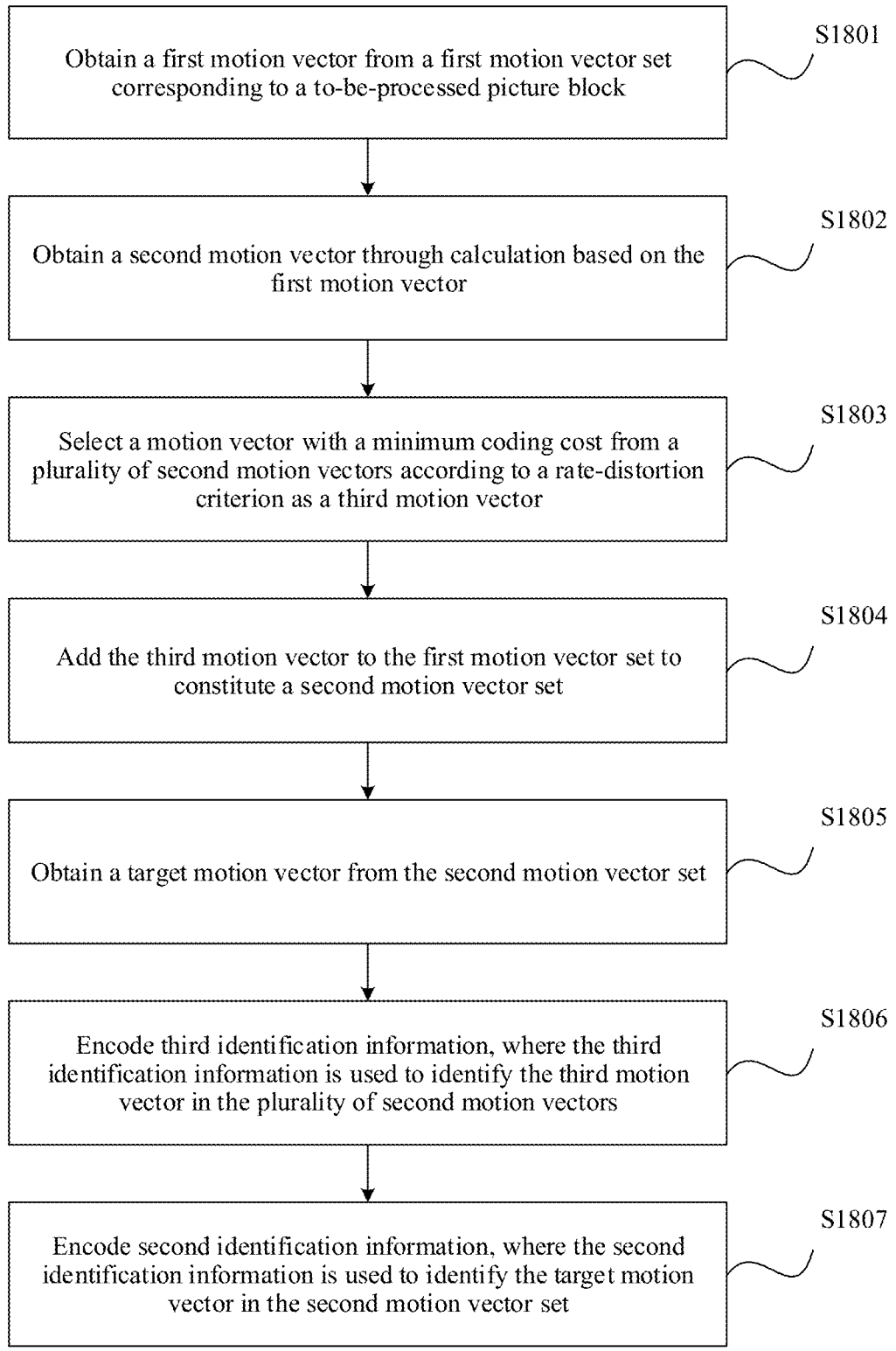
FIG. 18 is another schematic flowchart of applying a method for constructing a candidate motion vector set to video encoding according to an embodiment of this application.

For example, FIG. 18 is another flowchart of applying the method for constructing a candidate motion vector set to video encoding according to an embodiment of this application.

S1801: Obtain a first motion vector from a first motion vector set corresponding to a to-be-processed picture block.

For a specific implementation of this step, refer to the implementation of S1701. Details are not described again.

S1802: Obtain a second motion vector through calculation based on the first motion vector.

There is a preset vector difference between the first motion vector and the second motion vector, and the first motion vector and the second motion vector are different.

In a feasible implementation, there are a plurality of vector differences different from each other, and the first motion vector and each of the plurality of preset vector differences may be added to obtain a plurality of second motion vectors.

S1803: Select a motion vector with a minimum coding cost from the plurality of second motion vectors according to a rate-distortion criterion as a third motion vector.

Likewise, in addition to the rate-distortion criterion, another criterion described in step S1704 may alternatively be used to obtain the third motion vector. This is not limited.

S1804: Add the third motion vector to the first motion vector set to constitute the second motion vector set.

S1805: Obtain a target motion vector from the second motion vector set.

In a feasible implementation, a motion vector with a minimum coding cost is selected from the second motion vector set according to a rate-distortion criterion as the target motion vector.

Likewise, in addition to the rate-distortion criterion, another criterion described in step S1704 may alternatively be used to obtain the target motion vector. This is not limited.

S1806: Encode third identification information, where the third identification information is used to identify the third motion vector in the plurality of second motion vectors.

S1807: Encode second identification information, where the second identification information is used to identify the target motion vector in the second motion vector set.

It should be understood that a specific implementation of encoding the third identification information and the second identification information in step S1806 and step 1807 is similar to a specific implementation of encoding the first identification information in step S1705. Details are not described again.

It should be further understood that step S1806 may be performed after the third motion vector is determined in step S1803; and step S1807 may be performed after the target motion vector is determined in step S1805. Therefore, an execution sequence of steps S1806 and S1807 is not limited to a procedure manner corresponding to FIG. 18.

Figure 19:
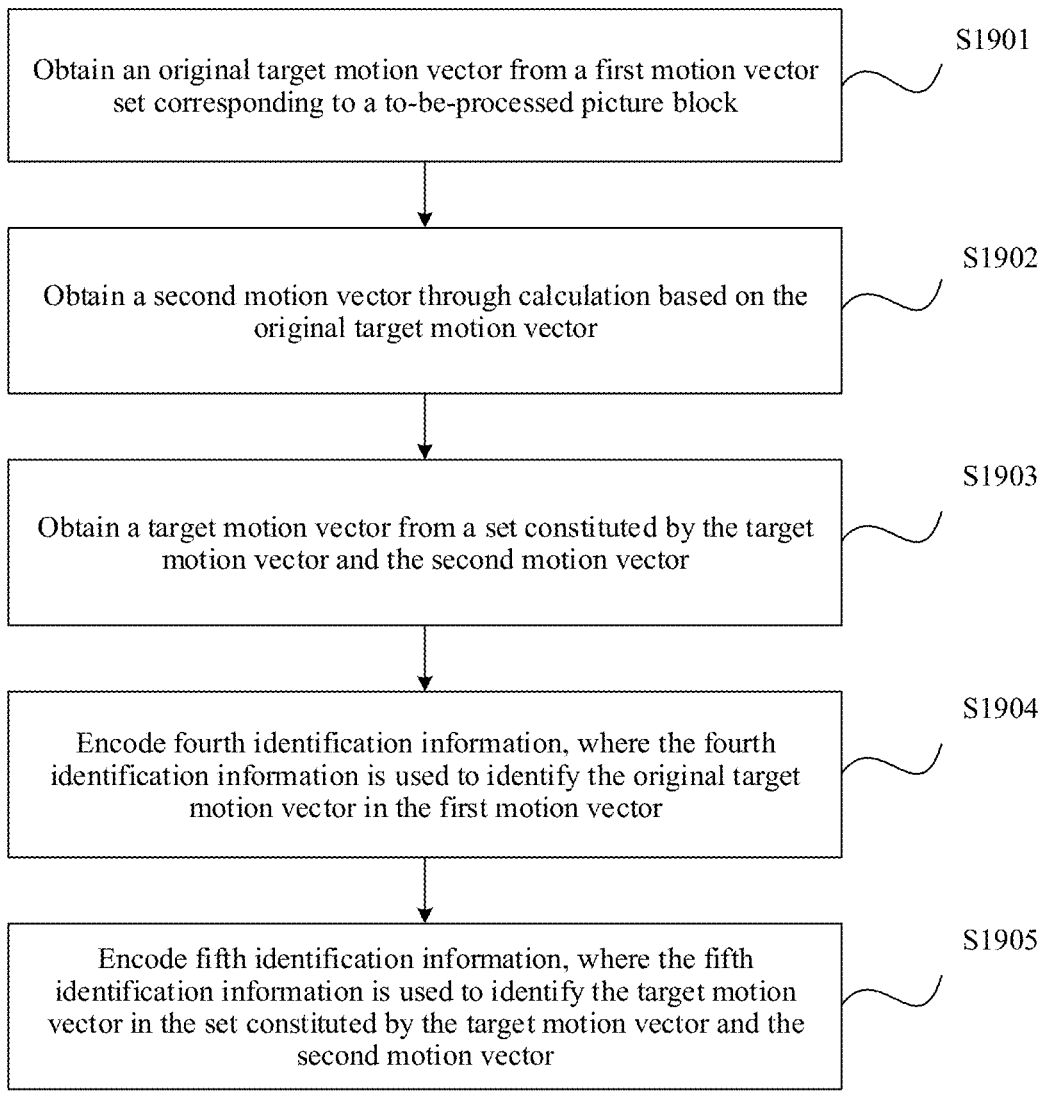
FIG. 19 is still another schematic flowchart of applying a method for constructing a candidate motion vector set to video encoding according to an embodiment of this application.

For example, FIG. 19 is still another flowchart of applying the method for constructing a candidate motion vector set to video encoding according to an embodiment of this application.

S1901: Obtain an original target motion vector from a first motion vector set corresponding to a to-be-processed picture block.

It should be understood that, in this step and an existing standard, specific implementations of obtaining a predictive motion vector from a merge or AMVP candidate prediction list are similar. For details, refer to the foregoing description. Details are not described again.

S1902: Obtain a second motion vector through calculation based on the original target motion vector.

There is a preset vector difference between the original target motion vector and the second motion vector, and the original target motion vector and the second motion vector are different.

In a feasible implementation, the target motion vector and the preset vector difference may be added to obtain the second motion vector.

S1903: Obtain a target motion vector from a set constituted by the target motion vector and the second motion vector.

In a feasible implementation, a motion vector with a minimum coding cost is selected from the set constituted by the target motion vector and the second motion vector according to a rate-distortion criterion as the target motion vector.

S1904: Encode fourth identification information, where the fourth identification information is used to identify the original target motion vector in the first motion vector.

S1905: Encode fifth identification information, where the fifth identification information is used to identify the target motion vector in the set constituted by the target motion vector and the second motion vector.

Likewise, it should be understood that a specific implementation of encoding the fourth identification information and the fifth identification information in step S1904 and step 1905 is similar to a specific implementation of encoding the first identification information in step S1705. Details are not described again.

It should be further understood that step S1904 may be performed after the original target motion vector is determined in step S1901, and step S1905 may be performed after the target motion vector is determined in step S1903. Therefore, an execution sequence of steps S1904 and S1905 is not limited to a procedure manner corresponding to FIG. 19.

In conclusion, it may be understood that the coding method in the embodiment of this application corresponding to FIG. 17 corresponds to the manner of constructing a motion vector set corresponding to FIG. 14, and the coding methods in the embodiments of this application corresponding to FIG. 18 and FIG. 19 correspond to the manner of constructing a motion vector set corresponding to FIG. 16.

The following describes the embodiments of this application by using specific implementations as examples.

It may be assumed that a left adjacent block, an upper adjacent block, and a temporal co-located block of a to-be-processed block are obtained as reference blocks of the to-be-processed block, and a motion vector [0, 1] of the left adjacent block, a motion vector [−5, 2] of the upper adjacent block, a motion vector [2, 3] of the temporal co-located block, and a combined motion vector [0, 3] constitute a first motion vector set {[0, 1], [−5, 2], [2, 3], [0, 3]}.

Embodiment 1

A preset vector difference is [0, 2].

T1.1: Obtain a first motion vector [−5, 2] from the first motion vector set.

T1.2: Obtain a second motion vector [x, y]=[−5, 2]+[0, 2], that is, [−5, 4], based on the first motion vector and the preset vector difference.

T1.3: Add the second motion vector to the first motion vector set, to obtain a second motion vector set {[0, 1], [−5, 2], [2, 3], [0, 3], [−5, 4]}, and ensure that the motion vector [−5, 4] is different from any motion vector in the first motion vector set.

T1.4: Select the motion vector [0, 3] with a minimum coding cost from the second motion vector set according to a rate-distortion criterion as a target motion vector.

T1.5: Encode an index value of the target motion vector [0, 3] in the second motion vector set.

Embodiment 2

A preset vector difference is [0, 2], and a preset quantity of motion vectors in a second motion vector set is 6.

T2.1: Obtain all first motion vectors [0, 1], [−5, 2], [2, 3], and [0, 3] from the first motion vector set.

T2.2: Add each of the plurality of first motion vectors and the preset vector difference, to obtain a plurality of second motion vectors [0, 3], [−5, 4], [2, 5], and [0, 5].

T2.3: Add the second motion vectors to the first motion vector set, to obtain a second motion vector set {[0, 1], [−5, 2], [2, 3], [0, 3], [−5, 4], and [2, 5]}, where the second motion vector [0, 3] that is the same as the original motion vector [0, 3] in the first motion vector set is removed, and the motion vector [0, 5] in the second motion vector set is also removed because the preset quantity of motion vectors is exceeded.

T2.4: Select the motion vector [0, 3] with a minimum coding cost from the second motion vector set according to a rate-distortion criterion as a target motion vector.

T2.5: Encode an index value of the target motion vector [0, 3] in the second motion vector set.

Embodiment 3

Preset vector differences are [0, 2], [−1, 0], and [0.5, 3], and a preset quantity of motion vectors in a second motion vector set is 6.

T3.1: Obtain a first motion vector [−5, 2] from the first motion vector set.

T3.2: Add the first motion vector and each of the plurality of the preset vector differences, to obtain a plurality of second motion vectors [−5, 4], [−6, 2], and [−4.5, 5].

T3.3: Add the second motion vectors to the first motion vector set, to obtain a second motion vector set {[0, 1], [−5, 2], [2, 3], [0, 3], [−5, 4], [−6, 2]}, and ensure that [−5, 4], [−6, 2], and [−4.5, 5] are different from any motion vector in the first motion vector set, where the motion vector [−4.5, 5] is removed because the preset quantity of motion vectors in the second motion vector set is exceeded.

T3.4: Select the motion vector [−6, 2] with a minimum coding cost from the second motion vector set according to a rate-distortion criterion as a target motion vector.

T3.5: Encode an index value of the target motion vector [−6, 2] in the second motion vector set.

Embodiment 4

Preset vector differences are [0, 2], [−1, 0], and [0.5, 3].

T4.1: Obtain a first motion vector [−5, 2] from the first motion vector set.

T4.2: Add the first motion vector and each of the plurality of the preset vector differences, to obtain a plurality of second motion vectors [−5, 4], [−6, 2], and [−4.5, 5].

T4.3: Select the motion vector [−6, 2] with a minimum coding cost from the plurality of second motion vectors according to a rate-distortion criterion as a third motion vector.

T4.4: Add the third motion vector to the first motion vector set, to obtain a second motion vector set {[0, 1], [−5, 2], [2, 3], [0, 3], [−6, 2]}, and ensure that the motion vector [−6, 2] is different from any motion vector in the first motion vector set.

T4.5: Select the motion vector [0, 3] with a minimum coding cost from the second motion vector set according to the rate-distortion criterion as a target motion vector.

T4.6: Encode index values of the third motion vector [−6, 2] in the plurality of second motion vectors [−5, 4], [−6, 2], [−4.5, 5].

T4.7: Encode an index value of the target motion vector [0, 3] in the second motion vector set.

Embodiment 5

Preset vector differences are [0, 2], [−1, 0], and [0.5, 3].

T5.1: Select a motion vector [2, 3] with a minimum coding cost from the first motion vector set according to a rate-distortion criterion as an original target motion vector.

T5.2: Add the original target motion vector and each of the plurality of the preset vector differences, to obtain a plurality of second motion vectors [2, 5], [1, 3], and [2.5, 6].

T5.3: Select the motion vector [2.5, 6] with a minimum coding cost from the plurality of second motion vectors and the original target motion vector according to the rate-distortion criterion as a target motion vector.

T5.4: Encode an index value of the original target motion vector [2, 3] in the first motion vector set.

T5.5: Encode an index value of the target motion vector [2.5, 6] in a set constituted by the plurality of the second motion vectors and the original target motion vector.

Embodiment 6

Preset vector differences include preset first-level vector differences and preset second-level vector differences, where the first-level vector differences are [1, 0], [−1, 0], [0, 1], and [0, −1], and the second-level vector differences are [0.5, 0], [−0.5, 0], [0, 0.5], and [0, −0.5]. T6.1: Select a motion vector [2, 3] with a minimum coding cost from the first motion vector set according to a rate-distortion criterion as an original target motion vector.

T6.2: Add the original target motion vector and each of the plurality of the preset first-level vector differences, to obtain a plurality of second motion vectors [3, 0], [1, 3], [2, 4], and [2, 2].

T6.3: Select the motion vector [2, 4] with a minimum coding cost from the plurality of second motion vectors and the original target motion vector according to a rate-distortion criterion as a temporary target motion vector.

T6.4: Add the temporary target motion vector and each of the plurality of preset second-level vector differences, to obtain a plurality of third motion vectors [2.5, 4], [1.5, 4], [2, 4.5], and [2, 3.5].

T6.5: Select the motion vector [1.5, 4] with a minimum coding cost from the plurality of the third motion vectors and the temporary target motion vector according to the rate-distortion criterion as a target motion vector.

T6.6: Encode an index value of the original target motion vector [2, 3] in the first motion vector set.

T6.7: Encode an index value of the temporary target motion vector [2, 4] in a set constituted by the plurality of the second motion vectors and the original target motion vector.

T6.8: Encode an index value of the target motion vector [1.5, 4] in a set constituted by the plurality of the third motion vectors and the temporary target motion vector.

Embodiment 7

Preset vector differences include preset first-level vector differences and preset second-level vector differences, where the first-level vector differences are [1, 0], [−1, 0], [0, 1], and [0, −1], and the second-level vector differences are [0.5, 0], [−0.5, 0], [0, 0.5], and [0, −0.5].

T7.1: Obtain a first motion vector [−5, 2] from the first motion vector set.

T7.2: Add the first motion vector and each of the plurality of the preset first-level vector differences, to obtain a plurality of second motion vectors [−4, 2], [−6, 2], [−5, 3], and [−5, 1].

T7.3: Add the plurality of second motion vector to the first motion vector set, to obtain a second motion vector set {[0, 1], [−5, 2], [2, 3], [0, 3], [−4, 2], [−6, 2], [−5, 3], [−5, 1]}, and ensure that [−4, 2], [−6, 2], [−5, 3], and [−5, 1] are different from any motion vector in the first motion vector set.

T7.3: Select the motion vector [−4, 2] with a minimum coding cost from the second motion vector set according to a rate-distortion criterion as a temporary target motion vector.

T7.4: Add the temporary target motion vector and each of the plurality of preset second-level vector differences, to obtain a plurality of third motion vectors [−3.5, 2], [−4.5, 2], [−4, 2.5], and [−4, 1.5].

T7.5: Select the motion vector [−4, 2] with a minimum coding cost from the plurality of the third motion vectors and the temporary target motion vector according to the rate-distortion criterion as a target motion vector.

T7.6: Encode an index value of the temporary target motion vector [−4, 2] in the second motion vector set.

T7.7: Encode an index value of the target motion vector [−4, 2] in a set constituted by the plurality of the third motion vectors and the temporary target motion vector.

In some feasible embodiments, the preset vector difference may be pre-agreed on by an encoder side and a decoder side according to a protocol, or may be transmitted to the decoder side through encoding, for example, the preset vector difference is encoded in a bitstream structure such as a sequence parameter set (sps), a picture parameter set (pps), or a slice header (slice header). A vector value may be directly encoded, or a representation value, of a preset vector value, that is set according to a preset rule may be encoded. For example, a code "1" represents that preset vector values are [0, 0.5], [0, −0.5], [0.5, 0], and [−0.5, 0], a code "2" represents that preset vector values are [0, 0.25], [0, −0.25], [0.25, 0], [−0.25, 0], and the like. This is not limited.

Each directional prediction in bidirectional prediction, that is, a prediction based on any reference frame list, is consistent with unidirectional prediction. No more examples are provided for description.

It should be understood that, in bidirectional prediction, when it is set that a first-directional preset vector difference and a second-directional preset vector difference satisfy a specific relationship, for example, a relationship described in the foregoing several feasible implementations, coding performance is improved.

It should be further understood that, in bidirectional prediction, in some feasible implementations, the second-directional preset vector difference may be derived based on the first-directional preset vector difference, for example, derivation described in the foregoing several feasible implementations. Therefore, depending on different embodiments, only a preset vector difference for unidirectional prediction needs to be stored on the decoder, or only the preset vector difference for unidirectional prediction needs to be transmitted, so that storage space can be saved or coding efficiency can be improved.

Figure 20:
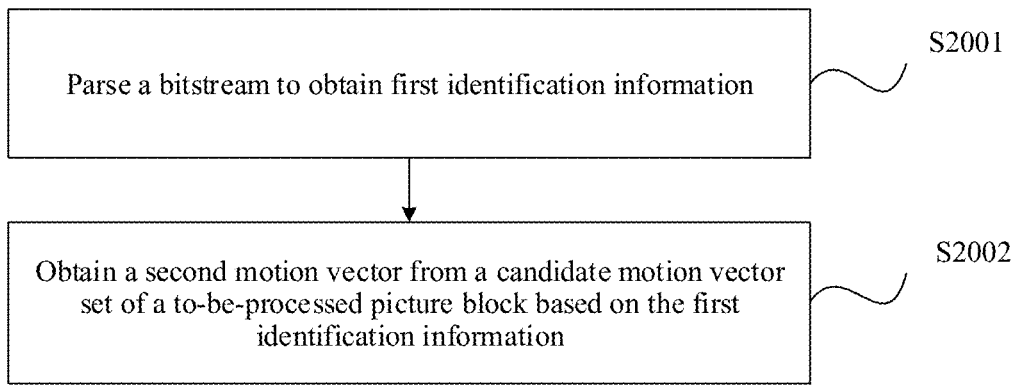
FIG. 20 is a schematic flowchart of applying a method for constructing a candidate motion vector set to video decoding according to an embodiment of this application.

For example, FIG. 20 is a flowchart of applying the method for constructing a candidate motion vector set to video decoding according to an embodiment of this application.

S2001: Parse a bitstream to obtain first identification information.

S2002: Obtain a second motion vector from a candidate motion vector set of a to-be-processed picture block based on the first identification information.

The candidate motion vector set includes a first motion vector and the second motion vector, and the second motion vector is obtained by adding the first motion vector and a preset vector difference.

In a feasible implementation, the first motion vector includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

In a feasible implementation, when the method is used for bidirectional prediction, the first motion vector includes a first-directional first motion vector and a second-directional first motion vector, the second motion vector includes a first-directional second motion vector and a second-directional second motion vector, and the preset vector difference includes a first-directional preset vector difference and a second-directional preset vector difference; and correspondingly, that the second motion vector is obtained by adding the first motion vector and a preset vector difference includes: the first-directional second motion vector is obtained by adding the first-directional first motion vector and the first-directional preset vector difference, and the second-directional second motion vector is obtained by adding the second-directional first motion vector and the second-directional preset vector difference.

In a feasible implementation, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero; or when the first display offset vector and the second display offset vector are the same, the first-directional preset vector difference and the second-directional preset vector difference are the same.

In a feasible implementation, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and a proportional relationship between the first-directional preset vector difference and the second-directional preset vector difference is the same as a proportional relationship between a magnitude of the first display offset vector and a magnitude of the second display offset vector, or the first-directional preset vector difference is equal to the second-directional preset vector difference.

In a feasible implementation, when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

Corresponding to an encoder side, a candidate motion vector set may be adaptively constructed on a decoder side. For a specific implementation, refer to FIG. 14 and a corresponding specific implementation. Details are not described again.

In a feasible implementation, the decoder side may first construct a complete candidate motion vector set, where a construction process and a construction result of the set are completely consistent with a construction process and a construction result of the set on the encoder side. Then, the decoder side determines the corresponding second motion vector from the candidate motion vector set based on the first identification information (for example, the first identification information may be index information of a target motion vector) obtained from the bitstream.

In another feasible implementation, the decoder side may determine a construction process of the candidate motion vector set based on the first identification information, to be specific, sequentially determine motion vectors in the candidate motion vector set until a motion vector indicated by the first identification information, that is, the second motion vector, is determined. The decoder side does not need to establish a complete candidate motion vector set as the encoder side. Then, the decoder side determines the second motion vector.

It should be understood that, in comparison with the prior art, beneficial technical effects of the implementation corresponding to FIG. 20 are achieved based on composition of the candidate motion vector set. Because the candidate motion vector set includes both a prior-art motion vector, that is, the first motion vector, and a second motion vector obtained by adding the first motion vector and a preset vector difference, it is likely to improve coding efficiency. In addition, due to a different composition of the candidate motion vector, the first identification information may be decoded differently and codewords of identification information corresponding to all candidate motion vectors are also set differently.

The following describes this embodiment of this application by using specific implementations as examples.

It may be assumed that a left adjacent block, an upper adjacent block, and a temporal co-located block of a to-be-processed block are obtained as reference blocks of the to-be-processed block, and a motion vector [0, 1] of the left adjacent block, a motion vector [−5, 2] of the upper adjacent block, a motion vector [2, 3] of the temporal co-located block, and a combined motion vector [0, 3] constitute a first motion vector set {[0, 1], [−5, 2], [2, 3], [0, 3]}.

Embodiment 8

A preset vector difference is [0, 2].

T8.1: Construct a candidate motion vector set {[0, 1], [−5, 2], [2, 3], [0, 3], [−5, 4], [2, 5], [0, 5]} based on the first motion vector set and the preset vector difference.

T8.2: Parse a bitstream to obtain first identification information, where the first identification information specifies that a motion vector whose index value is 5 in the candidate motion vector set is a second motion vector.

T8.3: Determine the motion vector [2, 5] as the second motion vector.

Embodiment 9

A preset vector difference is [0, 2].

T9.1: Parse a bitstream to obtain first identification information, where the first identification information specifies that a motion vector whose index value is 5 in a candidate motion vector set is a second motion vector.

T9.2: Construct a part of the candidate motion vector set {[0, 1], [−5, 2], [2, 3], [0, 3], [−5, 4], [2, 5]} based on the first identification information, where the candidate motion vector set is no longer constructed after the motion vector whose index value is 5 is constructed.

T9.3: Determine the motion vector [2, 5] as the second motion vector.

Figure 21:
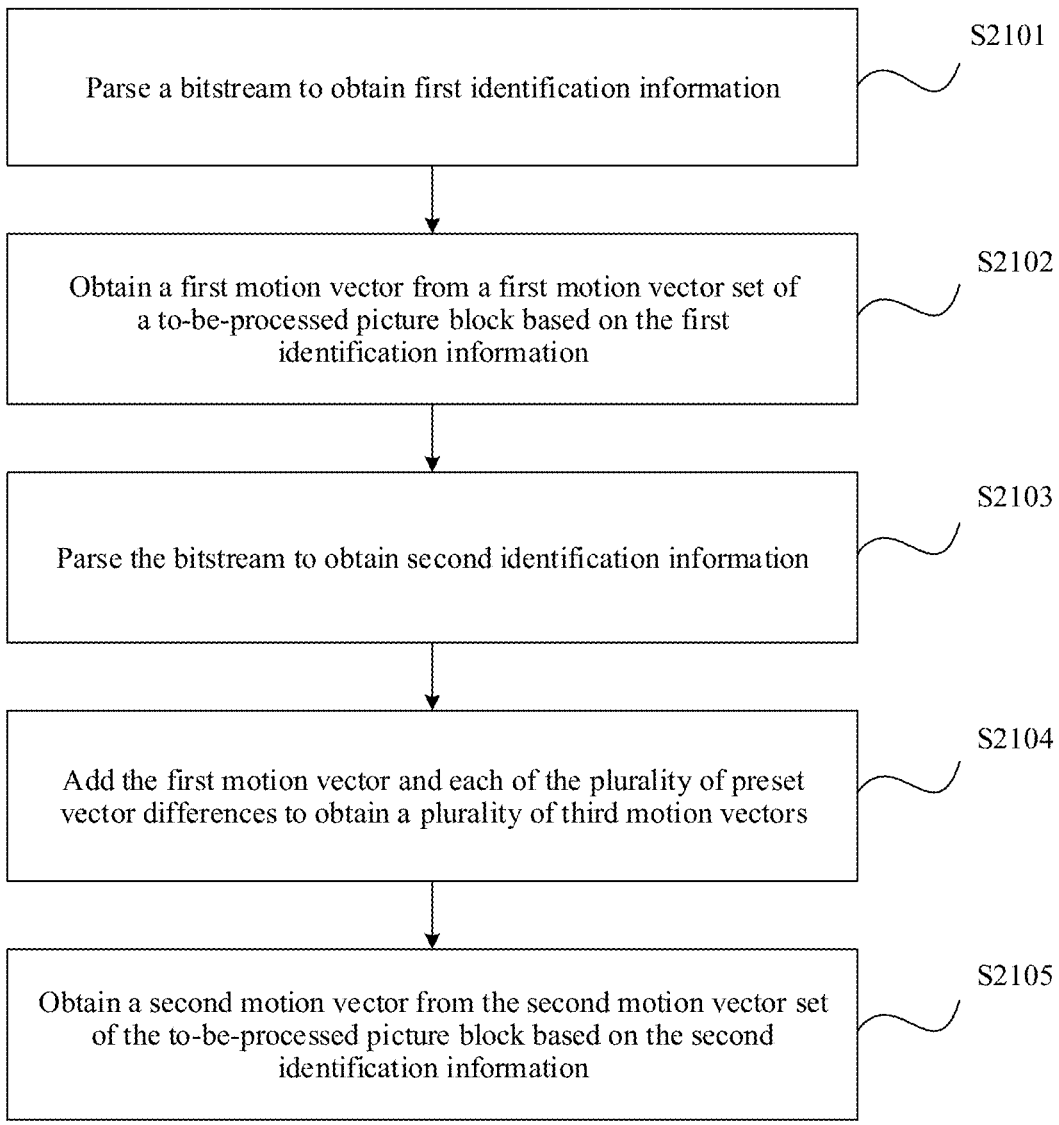
FIG. 21 is another schematic flowchart of applying a method for constructing a candidate motion vector set to video decoding according to an embodiment of this application.

For example, FIG. 21 is another flowchart of applying the method for constructing a candidate motion vector set to video decoding according to an embodiment of this application.

S2101: Parse a bitstream to obtain first identification information.

S2102: Obtain a first motion vector from a first motion vector set of a to-be-processed picture block based on the first identification information.

Corresponding to an encoder side, the first motion vector set may be adaptively constructed on a decoder side. For a specific implementation, refer to FIG. 16 and a corresponding specific implementation. Details are not described again.

It should be understood that in this step, a temporary target motion vector, namely, the first motion vector in this embodiment, is determined from an original candidate motion vector set (for example, a candidate prediction vector list used in a merge mode, or a candidate motion vector determined by adding the first motion vector and a first-level preset vector difference when preset vector differences include a plurality of levels of preset vector differences) based on the first identification information.

S2103: Parse the bitstream to obtain second identification information.

S2104: Add the first motion vector and each of the plurality of preset vector differences to obtain a plurality of third motion vectors.

The plurality of third motion vectors constitute the second motion vector set.

It should be understood that, in a feasible implementation, the preset vector difference may be 0, that is, the first motion vector is added to the second motion vector set.

S2105: Obtain a second motion vector from the second motion vector set of the to-be-processed picture block based on the second identification information.

The second motion vector set is determined based on the first motion vector, and there are a plurality of different preset vector differences between the first motion vector and the second motion vector.

It should be understood that, in some feasible implementations, there is no sequence between parsing of the bitstream and constructing of the first motion vector set or the second motion vector set are not sequential, and parsing of the bitstream and constructing of the first motion vector set or the second motion vector set may be performed in parallel. Therefore, a sequence for performing S2103 and S2104 is not limited.

In a feasible implementation, the first motion vector includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

In a feasible implementation, when the method is used for bidirectional prediction, the first motion vector includes a first-directional first motion vector and a second-directional first motion vector, the second motion vector includes a first-directional second motion vector and a second-directional second motion vector, and the preset vector difference includes a first-directional preset vector difference and a second-directional preset vector difference; and correspondingly, that there is a preset vector difference between the first motion vector and the second motion vector includes: there is the first-directional preset vector difference between the first-directional first motion vector and the first-directional second motion vector; and there is the second-directional preset vector difference between the second-directional first motion vector and the second-directional second motion vector.

In a feasible implementation, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero; or when the first display offset vector and the second display offset vector are the same, the first-directional preset vector difference and the second-directional preset vector difference are the same.

In a feasible implementation, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and a proportional relationship between the first-directional preset vector difference and the second-directional preset vector difference is the same as a proportional relationship between a magnitude of the first display offset vector and a magnitude of the second display offset vector, or the first-directional preset vector difference is equal to the second-directional preset vector difference.

In a feasible implementation, when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

The following describes this embodiment of this application by using specific implementations as examples.

It may be assumed that a left adjacent block, an upper adjacent block, and a temporal co-located block of a to-be-processed block are obtained as reference blocks of the to-be-processed block, and a motion vector [0, 1] of the left adjacent block, a motion vector [−5, 2] of the upper adjacent block, a motion vector [2, 3] of the temporal co-located block, and a combined motion vector [0, 3] constitute a first motion vector set {[0, 1], [−5, 2], [2, 3], [0, 3]}.

Embodiment 10

Preset vector differences are [0, 1], [0, −1], [1, 0], [−1, 0], and [0, 0].

T10.1: Parse a bitstream to obtain first identification information, where the first identification information specifies that a motion vector whose index value is 2 in the first motion vector set is a first motion vector, and determine the first motion vector [2, 3] from the constructed first motion vector set (or a part of the first motion vector set).

T10.2: Add the first motion vector and each of the plurality of the preset vector differences, to obtain a plurality of third motion vectors [2, 4], [2, 2], [3, 3], [1, 3], and [2, 3].

T10.3: Parse the bitstream to obtain second identification information, where the second identification information specifies that a motion vector whose index is 3, in the second motion vector set, that is, in the plurality of third motion vectors, is a second motion vector.

T10.4: Obtain the second motion vector [1, 3] from the second motion vector set based on the second identification information.

In a feasible implementation, there may be a plurality of levels of preset vector differences, and the preset vector differences includes a preset first-level vector difference and a preset second-level vector difference. In this case, examples are as follows.

Embodiment 11

Preset first-level vector differences are [0, 1], [0, −1], [1, 0], [−1, 0], and [0, 0], and preset second-level vector differences are [0, 0.5], [0, −0.5], [0.5, 0], [−0.5, 0], and [0, 0].

T11.1: Parse a bitstream to obtain first identification information, where the first identification information specifies that a motion vector whose index value is 2 in the first motion vector set is a first motion vector, and determine the first motion vector [2, 3] from the constructed first motion vector set (or a part of the first motion vector set).

T11.2: Add the first motion vector and each of the plurality of preset first-level vector differences, to obtain a plurality of third motion vectors [2, 4], [2, 2], [3, 3], [1, 3], and [2, 3].

T11.3: Parse the bitstream to obtain second identification information, where the second identification information specifies that a motion vector whose index is 3, in a second motion vector set, that is, in the plurality of third motion vectors, is a second motion vector.

T11.4: Obtain the second motion vector [1, 3] from the second motion vector set based on the second identification information.

T11.5: Add the second motion vector and each of the plurality of the preset second-level vector differences, to obtain a plurality of fourth motion vectors [1, 3.5], [1, 2.5], [1.5, 3], [0.5, 3], and [1, 3].

T11.6: Parse the bitstream to obtain third identification information, where the third identification information specifies that a motion vector whose index value is 0 in a third motion vector set, that is, in the plurality of fourth motion vectors, is a target motion vector.

T11.4: Obtain the target motion vector [1, 3.5] from the third motion vector set based on the third identification information.

For bidirectional prediction, detailed descriptions are provided in the embodiments corresponding to the encoder side. Corresponding to the encoder side, an implementation for bidirectional prediction is similar to an implementation for unidirectional prediction on the decoder side in the embodiments of this application. Details are not described again.

In conclusion, in the embodiments of this application, the method for constructing various motion vector sets by using the second motion vector (where there is a preset vector difference between the second motion vector and the first motion vector) is applied to video encoding or video decoding, to construct a new motion vector. This improves prediction precision and coding efficiency.

The following describes a feasible implementation of the embodiments of this application based on an H.266 test model.

Embodiment 12

In an existing JEM test model, a possible candidate set in a merge prediction mode includes a spatial neighborhood candidate, an ATMVP candidate, a temporal candidate, and a derived candidate.

It should be understood that "candidate" herein may refer to a candidate predictive motion vector, or may refer to a source of a candidate predictive motion vector, for example, a reference block. This is not limited.

In this embodiment, more candidates may be obtained through extension based on existing candidates in the JEM test model and an MV offset, in other words, there is a preset vector difference (the MV offset) between a derived motion vector and an existing motion vector.

A quantity of candidate motion vectors in a merge candidate predictive motion vector list is determined based on a natural number NumMrgCands. It may be assumed that the preset vector difference is an offset of an MV by one luma sample in a horizontal direction and a vertical direction. When ATMVP is disabled, NumMrgCands is 9; or when the ATMVP is enabled, NumMrgCands is 11.

If a candidate motion vector derived based on a vector difference is considered as an optimal candidate motion vector, based on the optimal candidate motion vector, a new candidate motion vector is further derived by using a half luma sample as an offset, and an optimal candidate motion vector needs to be further selected. Correspondingly, more identification information is transferred to a decoder side to identify the selected optimal candidate motion vector with higher precision. For a specific implementation, refer to the implementation for a plurality of levels of preset vector differences in Embodiment 7.

Figure 22:
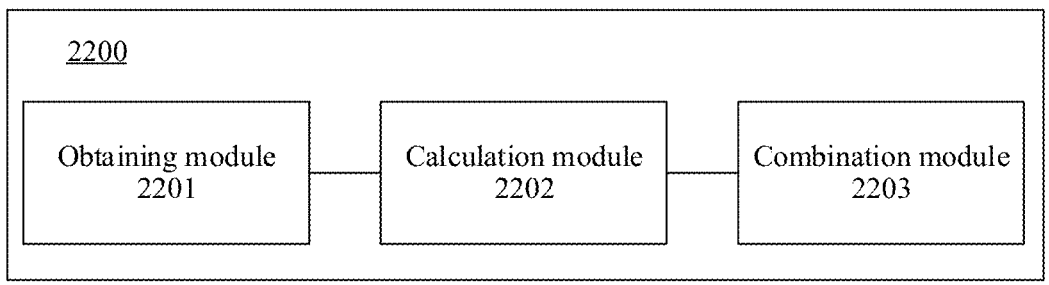
FIG. 22 is a schematic block diagram of an apparatus for constructing a candidate motion vector set according to an embodiment of this application.

For example, FIG. 22 is a schematic block diagram of an apparatus for constructing a candidate motion vector set according to an embodiment of this application.

An apparatus 2200 for constructing a motion vector set is provided. The apparatus is used for video encoding or video decoding, and includes:

an obtaining module 2201, configured to obtain a first motion vector from a first motion vector set of a to-be-processed picture block;

a calculation module 2202, configured to add the first motion vector and each of one or more preset vector differences to obtain one or more second motion vectors, where the first motion vector is unequal to the second motion vector; and a combination module 2203, configured to add the one or more second motion vectors to the first motion vector set, to constitute a second motion vector set of the to-be-processed picture block.

In a feasible implementation, the first motion vector includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

In a feasible implementation, the combination module 2203 is further configured to:

when the third motion vector is different from any motion vector in the first motion vector set, add the third motion vector to the first motion vector set; or when the third motion vector is the same as any motion vector in the first motion vector set, skip adding the third motion vector to the first motion vector set.

Figure 23:
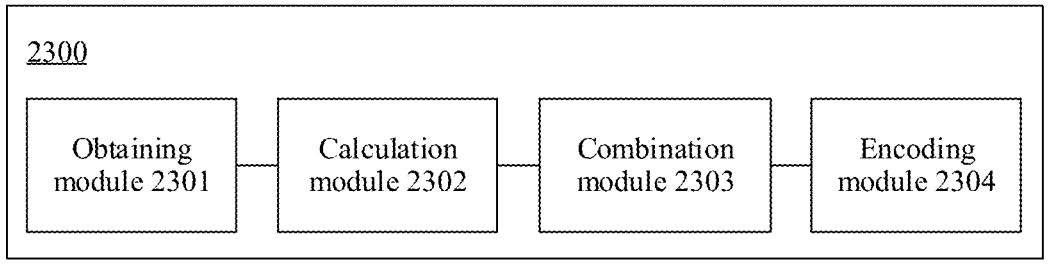
FIG. 23 is a schematic block diagram of an apparatus, used for video encoding, for obtaining a motion vector according to an embodiment of this application.

For example, FIG. 23 is a schematic block diagram of an apparatus for obtaining a motion vector according to an embodiment of this application. The obtaining apparatus is used for video encoding.

An apparatus 2300 for obtaining a motion vector includes:
an obtaining module 2301, configured to obtain a first motion vector from a first motion vector set corresponding to a to-be-processed picture block;

a calculation module 2302, configured to obtain a second motion vector through calculation based on the first motion vector, where there is a preset vector difference between the first motion vector and the second motion vector, and the first motion vector and the second motion vector are different; and a combination module 2303, configured to add the second motion vector to the first motion vector set to constitute a second motion vector set; where the obtaining module 2301 is further configured to obtain a target motion vector from the second motion vector set.

In a feasible implementation, the calculation module 2302 is configured to add the first motion vector and the preset vector difference to obtain the second motion vector.

In a feasible implementation, when the apparatus is used for bidirectional prediction, the first motion vector includes a first-directional first motion vector and a second-directional first motion vector, the second motion vector includes a first-directional second motion vector and a second-directional second motion vector, and the preset vector difference includes a first-directional preset vector difference and a second-directional preset vector difference; and the calculation module 2302 is configured to: add the first-directional first motion vector and the first-directional preset vector difference to obtain the first-directional second motion vector, and add the second-directional first motion vector and the second-directional preset vector difference to obtain the second-directional second motion vector.

In a feasible implementation, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero; or when the first display offset vector and the second display offset vector are the same, the first-directional preset vector difference and the second-directional preset vector difference are the same.

In a feasible implementation, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and a proportional relationship between the first-directional preset vector difference and the second-directional preset vector difference is the same as a proportional relationship between a magnitude of the first display offset vector and a magnitude of the second display offset vector, or the first-directional preset vector difference is equal to the second-directional preset vector difference.

In a feasible implementation, when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

In a feasible implementation, the obtaining module 2301 is configured to select a motion vector with a minimum coding cost from the second motion vector set according to a rate-distortion criterion as the target motion vector.

In a feasible implementation, there are a plurality of vector differences different from each other; and the calculation module 2302 is configured to add the first motion vector and each of the plurality of preset vector differences to obtain a plurality of second motion vectors; and the combination module 2303 is configured to add the plurality of obtained second motion vectors to the first motion vector set to constitute the second motion vector set.

In a feasible implementation, after the obtaining module 2301 adds the first motion vector and each of the plurality of preset vector differences to obtain the plurality of second motion vectors, the obtaining module 2301 is further configured to select a motion vector with a minimum coding cost from the plurality of second motion vectors according to a rate-distortion criterion as a third motion vector. The combination module 2303 is configured to add the third motion vector to the first motion vector set to constitute the second motion vector set.

In a feasible implementation, the apparatus further includes:

an encoding unit 2304, configured to encode first identification information, where the first identification information is used to identify the target motion vector in the second motion vector set.

In a feasible implementation, the encoding unit 2304 is further configured to encode second identification information, where the second identification information is used to identify the target motion vector in the second motion vector set.

In a feasible implementation, the encoding unit 2304 is further configured to encode third identification information, where the third identification information is used to identify the third motion vector in the plurality of second motion vectors.

In a feasible implementation, a motion vector in the first motion vector set includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

Figure 24:
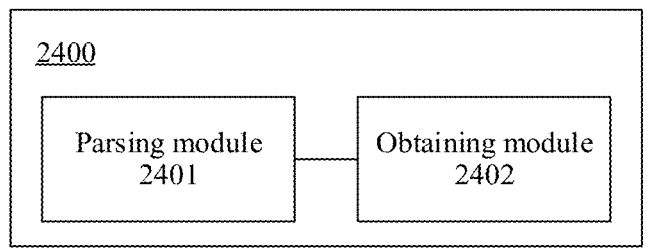
FIG. 24 is a schematic block diagram of an apparatus, used for video decoding, for obtaining a motion vector according to an embodiment of this application.

For example, FIG. 24 is a schematic block diagram of an apparatus for obtaining a motion vector according to an embodiment of this application. The obtaining apparatus is used for video decoding.

An apparatus 2400 for obtaining a motion vector includes:

a parsing module 2401, configured to parse a bitstream to obtain first identification information; and an obtaining module 2402, configured to obtain a second motion vector from a candidate motion vector set of a to-be-processed picture block based on the first identification information, where the candidate motion vector set includes a first motion vector and the second motion vector, and the second motion vector is obtained by adding the first motion vector and a preset vector difference.

In a feasible implementation, the first motion vector includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

In a feasible implementation, when the method is used for bidirectional prediction, the first motion vector includes a first-directional first motion vector and a second-directional first motion vector, the second motion vector includes a first-directional second motion vector and a second-directional second motion vector, and the preset vector difference includes a first-directional preset vector difference and a second-directional preset vector difference; and correspondingly, that the second motion vector is obtained by adding the first motion vector and a preset vector difference includes: the first-directional second motion vector is obtained by adding the first-directional first motion vector and the first-directional preset vector difference, and the second-directional second motion vector is obtained by adding the second-directional first motion vector and the second-directional preset vector difference.

In a feasible implementation, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero; or when the first display offset vector and the second display offset vector are the same, the first-directional preset vector difference and the second-directional preset vector difference are the same.

In a feasible implementation, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and a proportional relationship between the first-directional preset vector difference and the second-directional preset vector difference is the same as a proportional relationship between a magnitude of the first display offset vector and a magnitude of the second display offset vector, or the first-directional preset vector difference is equal to the second-directional preset vector difference.

In a feasible implementation, when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

Figure 25:
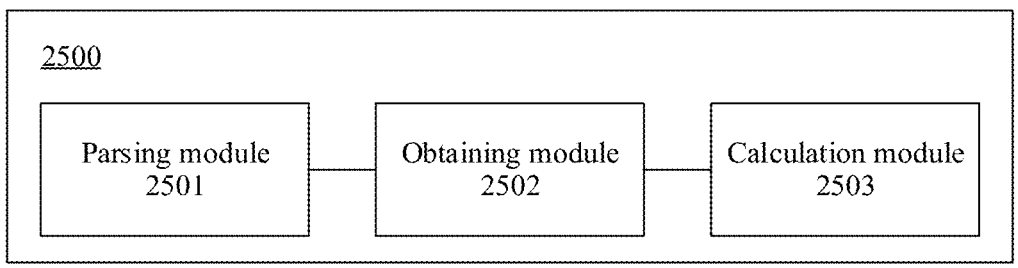
FIG. 25 is another schematic block diagram of an apparatus, used for video decoding, for obtaining a motion vector according to an embodiment of this application.

For example, FIG. 25 is a schematic block diagram of another apparatus for obtaining a motion vector according to an embodiment of this application. The obtaining apparatus 2500 is used for video decoding The apparatus 2500 for obtaining a motion vector includes:

a parsing module 2501, configured to parse a bitstream to obtain first identification information; and an obtaining module 2502, configured to obtain a first motion vector from a first motion vector set of a to-be-processed picture block based on the first identification information; where the parsing module 2501 is further configured to parse the bitstream to obtain second identification information; and the obtaining module 2502 is further configured to obtain a second motion vector from a second motion vector set of the to-be-processed picture block based on the second identification information, where the second motion vector set is determined based on the first motion vector, and there are a plurality of different preset vector differences between the first motion vector and the second motion vector.

In a feasible implementation, the first motion vector includes at least one of the following motion vectors: a motion vector obtained based on a motion vector of a reference block having spatial-domain correlation with the to-be-processed picture block; a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

In a feasible implementation, when the method is used for bidirectional prediction, the first motion vector includes a first-directional first motion vector and a second-directional first motion vector, the second motion vector includes a first-directional second motion vector and a second-directional second motion vector, and the preset vector difference includes a first-directional preset vector difference and a second-directional preset vector difference; and correspondingly, that there is a preset vector difference between the first motion vector and the second motion vector includes: there is the first-directional preset vector difference between the first-directional first motion vector and the first-directional second motion vector; and there is the second-directional preset vector difference between the second-directional first motion vector and the second-directional second motion vector.

In a feasible implementation, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero; or when the first display offset vector and the second display offset vector are the same, the first-directional preset vector difference and the second-directional preset vector difference are the same.

In a feasible implementation, a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and a proportional relationship between the first-directional preset vector difference and the second-directional preset vector difference is the same as a proportional relationship between a magnitude of the first display offset vector and a magnitude of the second display offset vector, or the first-directional preset vector difference is equal to the second-directional preset vector difference.

In a feasible implementation, when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

In a feasible implementation, the apparatus further includes a calculation module 2503. Before the obtaining module 2502 obtains the second motion vector from the second motion vector set of the to-be-processed picture block based on the second identification information, the calculation module 2503 is configured to add the first motion vector and each of the plurality of preset vector differences to obtain a plurality of third motion vectors, where the plurality of third motion vectors constitute the second motion vector set.

In a feasible implementation, the preset vector differences include a zero vector difference.

Figure 26:
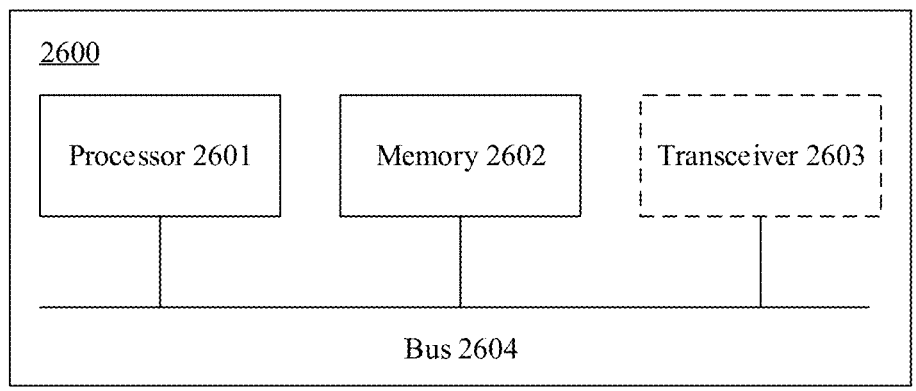
FIG. 26 is a schematic block diagram of a video coding apparatus according to an embodiment of this application.

For example, FIG. 26 is a schematic block diagram of a video coding apparatus according to an embodiment of this application. The apparatus 2600 may be applied to an encoder side or a decoder side. The apparatus 2600 includes a processor 2601 and a memory 2602. The processor 2601 and the memory 2602 are connected to each other (for example, connected to each other through a bus 2604). In a possible implementation, the device 2600 may further include a transceiver 2603, and the transceiver 2603 is connected to the processor 2601 and the memory 2602, and is configured to receive/send data.

The memory 2602 includes but is not limited to a random access memory (random access memory, RAM), a read-only memory (read-only memory, ROM), an erasable programmable read only memory (erasable programmable read only memory, EPROM), or a compact disc read-only memory (compact disc read-only memory, CD-ROM). The memory 2602 is configured to store related program code and video data.

The processor 2601 may be one or more central processing units (central processing unit, CPU). When the processor 2601 is one CPU, the CPU may be a single-core CPU or a multi-core CPU.

The processor 2601 is configured to read the program code stored in the memory 2602, and perform operations in any implementation solution and various feasible implementations corresponding to FIG. 14 to FIG. 21.

For example, an embodiment of this application further provides a computer-readable storage medium. The computer-readable storage medium stores an instruction, and when the instruction is run on a computer, the computer is enabled to perform operations in any implementation solution and various feasible implementations corresponding to FIG. 14 to FIG. 21.

For example, an embodiment of this application further provides a computer program product including an instruction, and when the computer program product runs on a computer, the computer is enabled to perform operations in any implementation solution and various feasible implementations corresponding to FIG. 14 to FIG. 21.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on specified applications and design constraint conditions of the technical solutions. A person skilled in the art may use different methods to implement the described functions for each specified application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

All or some of the foregoing embodiments may be implemented by software, hardware, firmware, or any combination thereof. When software is used to implement the embodiments, the embodiments may be all or partially implemented in a form of a computer program product. The computer program product includes one or more computer instructions. When the computer program instruction is loaded and executed on a computer, all or some of the procedures or functions are generated according to the embodiments of the present disclosure. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

In the foregoing embodiments, the descriptions in each embodiment have respective focuses. For a part that is not described in detail in an embodiment, refer to related descriptions in other embodiments.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for obtaining a motion vector, wherein the method is used for video encoding, and comprises:
   obtaining a first motion vector from a first motion vector set corresponding to a to-be-processed picture block;
   obtaining a second motion vector through calculation based on the first motion vector, wherein there is a preset vector difference between the first motion vector and the second motion vector, and wherein the preset vector difference comprises a first-directional preset vector difference and a second-directional preset vector difference, and wherein the second-directional preset vector difference is derived based on the first-directional preset vector difference and a preset derivation relationship or the first-directional preset vector difference is derived based on the second-directional preset vector difference and a preset derivation relationship;
   adding the second motion vector to the first motion vector set to constitute a second motion vector set; and
   obtaining a target motion vector from the second motion vector set.

2. The method according to claim 1, wherein the obtaining a second motion vector through calculation based on the first motion vector comprises:
   adding the first motion vector and the preset vector difference to obtain the second motion vector.

3. The method according to claim 2, wherein when the method is used for bidirectional prediction, the first motion vector comprises a first-directional first motion vector and a second-directional first motion vector, the second motion vector comprises a first-directional second motion vector and a second-directional second motion vector; and
   correspondingly, the adding the first motion vector and the preset vector difference to obtain the second motion vector comprises:
   adding the first-directional first motion vector and the first-directional preset vector difference to obtain the first-directional second motion vector; and
   adding the second-directional first motion vector and the second-directional preset vector difference to obtain the second-directional second motion vector.

4. The method according to claim 3, wherein a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero, or when the first display offset vector and the second display offset vector are the same, the first-directional preset vector difference and the second-directional preset vector difference are the same.

5. The method according to claim 3, wherein a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and a proportional relationship between the first-directional preset vector difference and the second-directional preset vector difference is the same as a proportional relationship between a magnitude of the first display offset vector and a magnitude of the second display offset vector.

6. The method according to claim 3, wherein the first-directional preset vector difference is equal to the second-directional preset vector difference.

7. The method according to claim 5, wherein when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

8. A method for obtaining a motion vector, wherein the method is used for video decoding, and comprises:
   parsing a bitstream to obtain first identification information; and
   obtaining a second motion vector from a candidate motion vector set of a to-be-processed picture block based on the first identification information, wherein the candidate motion vector set comprises a first motion vector and the second motion vector, and the second motion vector is obtained by adding the first motion vector and a preset vector difference, wherein the preset vector difference comprises a first-directional preset vector difference and a second-directional preset vector difference, and wherein the second-directional preset vector difference is derived based on the first-directional preset vector difference and a preset derivation relationship or the first-directional preset vector difference is derived based on the second-directional preset vector difference and a preset derivation relationship.

9. The method according to claim 8, wherein the first motion vector comprises at least one of the following motion vectors:
   a motion vector obtained based on a motion vector of a reference block having spatial-domain correlation with the to-be-processed picture block;
   a motion vector obtained based on a motion vector of a reference block having a temporal-domain correlation with the to-be-processed picture block; or a motion vector obtained based on a motion vector of a reference block having spatial-domain correlation with the corresponding block having temporal-domain correlation with the to-be-processed picture block.

10. The method according to claim 8, wherein when the method is used for bidirectional prediction, the first motion vector comprises a first-directional first motion vector and a second-directional first motion vector, the second motion vector comprises a first-directional second motion vector and a second-directional second motion vector; and
correspondingly, that the second motion vector is obtained by adding the first motion vector and a preset vector difference comprises:
the first-directional second motion vector is obtained by adding the first-directional first motion vector and the first-directional preset vector difference; and
the second-directional second motion vector is obtained by adding the second-directional first motion vector and the second-directional preset vector difference.

11. The method according to claim 10, wherein a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and when a vector sum of the first display offset vector and the second display offset vector is zero, a vector sum of the first-directional preset vector difference and the second-directional preset vector difference is zero, or when the first display offset vector and the second display offset vector are the same, the first-directional preset vector difference and the second-directional preset vector difference are the same.

12. The method according to claim 10, wherein a first display offset vector is a vector pointing from a display position of a picture frame in which the to-be-processed picture block is located to a display position of a first reference frame; a second display offset vector is a vector pointing from the display position of the picture frame in which the to-be-processed picture block is located to a display position of a second reference frame; the first reference frame is a reference frame to which the first-directional first motion vector points; the second reference frame is a reference frame to which the second-directional first motion vector points; and a proportional relationship between the first-directional preset vector difference and the second-directional preset vector difference is the same as a proportional relationship between a magnitude of the first display offset vector and a magnitude of the second display offset vector.

13. The method according to claim 10, wherein the first-directional preset vector difference is equal to the second-directional preset vector difference.

14. The method according to claim 13, wherein when the first display offset vector and the second display offset vector are in a same direction, the first-directional preset vector difference and the second-directional preset vector difference are in a same direction; or when the first display offset vector and the second display offset vector are in opposite directions, the first-directional preset vector difference and the second-directional preset vector difference are in opposite directions.

15. A method for obtaining a motion vector, wherein the method is used for video decoding, and comprises:
parsing a bitstream to obtain first identification information;
obtaining a first motion vector from a first motion vector set of a to-be-processed picture block based on the first identification information;
parsing the bitstream to obtain second identification information; and
obtaining a second motion vector from a second motion vector set of the to-be-processed picture block based on the second identification information, wherein the second motion vector set is determined based on the first motion vector, and there are a plurality of different preset vector differences between the first motion vector and the second motion vector, wherein the preset vector differences comprises first-directional preset vector differences and second-directional preset vector differences, and wherein a second-directional preset vector difference is derived based on a first-directional preset vector difference and a preset derivation relationship; or a first-directional preset vector difference is derived based on a second-directional preset vector difference and a preset derivation relationship.

16. The method according to claim 15, wherein the first motion vector comprises at least one of the following motion vectors:
a motion vector obtained based on a motion vector of a reference block having spatial-domain correlation with the to-be-processed picture block;
a motion vector obtained based on a motion vector of a reference block having a temporal-domain correlation with the to-be-processed picture block; or
a motion vector obtained based on a motion vector of a reference block having spatial-domain correlation with the corresponding block having temporal-domain correlation with the to-be-processed picture block.

17. A device for obtaining a motion vector, wherein the device is used for video encoding or video decoding, and comprises:
a processor and a memory, wherein the processor and the memory are connected to each other;
the memory is configured to store program code and video data; and
the processor is configured to read the program code stored in the memory, to perform the method according to claim 1.

18. A device for obtaining a motion vector, wherein the device is used for video encoding or video decoding, and comprises:
a processor and a memory, wherein the processor and the memory are connected to each other;
the memory is configured to store program code and video data; and
the processor is configured to read the program code stored in the memory, to perform the method according to claim 8.

19. A device for obtaining a motion vector, wherein the device is used for video encoding or video decoding, and comprises:
a processor and a memory, wherein the processor and the memory are connected to each other;
the memory is configured to store program code and video data; and
the processor is configured to read the program code stored in the memory, to perform the method according to claim 15.

20. A non-transitory computer-readable storage medium, wherein the computer-readable storage medium stores an instruction, and when the instruction is run on a computer, the instruction enables the computer to perform the method according to claim 1.

* * * * *